(12) United States Patent
Oh

(10) Patent No.: US 7,878,914 B2
(45) Date of Patent: Feb. 1, 2011

(54) CONSTANT VELOCITY JOINT OF TRIPOD TYPE

(75) Inventor: Seung Tark Oh, Farmington Hills, MI (US)

(73) Assignee: Hyundai Wia Corporation (KR)

( * ) Notice: Subject to any disclaimer, the term of this patent is extended or adjusted under 35 U.S.C. 154(b) by 704 days.

(21) Appl. No.: 11/840,194

(22) Filed: Aug. 16, 2007

(65) Prior Publication Data

US 2008/0287202 A1 Nov. 20, 2008

Related U.S. Application Data

(63) Continuation-in-part of application No. 11/750,138, filed on May 17, 2007.

(51) Int. Cl.
F16D 3/26 (2006.01)
(52) U.S. Cl. ...................... 464/111; 464/905
(58) Field of Classification Search .............. 464/111, 464/123, 124, 905
See application file for complete search history.

(56) References Cited

U.S. PATENT DOCUMENTS

| | | | | |
|---|---|---|---|---|
| 4,747,803 A | * | 5/1988 | Kimata et al. | 464/111 |
| 4,854,917 A | * | 8/1989 | Mizukoshi | 464/111 |
| 4,886,479 A | * | 12/1989 | Richtmeyer et al. | 464/111 |
| 5,203,741 A | | 4/1993 | Turner et al. | |
| 5,256,107 A | * | 10/1993 | Matsumoto et al. | 464/111 |
| 6,435,972 B1 | * | 8/2002 | Kita et al. | 464/111 |
| 6,454,655 B1 | * | 9/2002 | Kudo et al. | 464/111 |
| 6,497,621 B2 | * | 12/2002 | Kudo et al. | 464/111 |
| 6,533,668 B2 | | 3/2003 | Mizukoshi et al. | |
| 6,682,434 B2 | * | 1/2004 | Kawakatsu et al. | 464/111 |
| 6,699,134 B2 | | 3/2004 | Sams et al. | |
| 6,726,570 B2 | | 4/2004 | Sugiyama et al. | |
| 6,752,721 B2 | * | 6/2004 | Kawakatsu et al. | 464/111 |
| 6,776,719 B2 | | 8/2004 | Perrow | |
| 7,083,522 B2 | | 8/2006 | Bongartz | |
| 7,121,950 B2 | | 10/2006 | Izumino et al. | |
| 7,682,253 B2 | * | 3/2010 | Ishijima et al. | 464/111 |
| 2002/0128077 A1 | * | 9/2002 | Kawakatsu et al. | 464/111 |
| 2002/0128078 A1 | * | 9/2002 | Kawakatsu et al. | 464/111 |
| 2004/0157667 A1 | * | 8/2004 | Ishijima et al. | 464/111 |
| 2006/0030413 A1 | | 2/2006 | Izumino et al. | |

(Continued)

FOREIGN PATENT DOCUMENTS

KR 10-2004-0071382 A 8/2004

(Continued)

*Primary Examiner*—Aaron Dunwoody
(74) *Attorney, Agent, or Firm*—Park & Associates IP Law LLC

(57) ABSTRACT

A constant velocity joint includes: a hollow housing fixed to a first rotating shaft, an inner face of the housing including a plurality of guide grooves; and a tripod disposed at an end of a second rotating shaft, having a plurality of trunnions each positioned in a corresponding guide groove; and an inner roller mounted to each trunnion, an outer roller mounted on each inner roller. Each trunnion includes an a spherical surface in a circumferential area subjecting to the load, and a cylindrical protrusion protruded from the spherical surface of the trunnion, the cylindrical protrusion having an spherical contact surface at its distal end with a gap between the trunnion and the the respective inner roller, and the inner face of each inner roller includes a pair of guide grooves for receiving the cylindrical protrusions.

14 Claims, 45 Drawing Sheets

U.S. PATENT DOCUMENTS

| | | |
|---|---|---|
| 2006/0217205 A1* | 9/2006 | Izumino et al. ............. 464/111 |
| 2007/0004522 A1* | 1/2007 | Ishijima et al. ............. 464/111 |
| 2007/0066405 A1 | 3/2007 | Ando et al. |
| 2007/0093302 A1 | 4/2007 | Perrow et al. |
| 2007/0149296 A1* | 6/2007 | Yoon ........................ 464/111 |
| 2008/0161116 A1* | 7/2008 | Ishijima et al. ............. 464/111 |

FOREIGN PATENT DOCUMENTS

WO 90/07067 A1 6/1990

* cited by examiner

CONSTANT VELOCITY JOINT OF TRIPOD TYPE

REFERENCE TO RELATED APPLICATION

The present application is a continuation-in-part of U.S. patent application Ser. No. 11/750,138, entitled "CONSTANT VELOCITY JOINT OF TRIPOD TYPE" and filed on May 17, 2007, which was filed by the same applicant and assigned to the same assignee as the present application, the content of which is incorporated herein by reference in its entirety.

FIELD OF THE INVENTION

The present invention relates to a constant velocity joint of tripod type, which is disposed between a drive shaft and a driven shaft coupled to each other and typically used in a drive axle of, for example, an automobile for transmitting rotational torque between the rotating shafts.

BACKGROUND OF THE INVENTION

Tripod type constant velocity joints are well known in the automobile industry as one type of constant velocity joints used in the drive system of automobiles to transfer a uniform torque and a constant speed, while operating with a wide range of joint angle. For instance, one example of the tripod type constant velocity joint was illustrated in Japanese Patent Application, S62-233522 as shown in FIGS. 1-2. This tripod type constant velocity joint typically includes tripod 15 fixed to an end of the second rotating shaft, which functions as a driven member, and hollow cylindrical housing 13 fixed to an end of the first rotating shaft 12 which functions as a drive member. Grooves 16 are formed at three locations on the inner face of the housing 13 at equal spacing in the circumferential direction and extend in the shaft direction of the housing 13.

The tripod 15 comprises a boss 17 connected to the second rotating shaft 14, and trunnions 18 each having a cylindrical shape and extending radially from three locations at equal spacing around the boss 17. Each trunnion 18 has a roller 19 fixed at a distal end of the trunnion and with needle rollers 20 engaged therein. In this arrangement, each roller 19 can freely rotate about the trunnion 18 while also be displaced in the axial direction of the trunnion 18. The constant velocity movement between the first and second rotating shafts is ensured with the rollers 19 rotatably and displaceably engaging in the grooves 16 disposed along the inner face of the housing 13. In order to facilitate the sliding movement, a pair of side faces 16a are formed in circular recesses on each side of the respective grooves 16, and each roller 19 is supported rotatably and pivotally along the side faces 16a of the grooves.

As the first rotating shaft 12 rotates, its rotational force is transmitted from housing 13, through roller 19, needle rollers 20, trunnions 18, and to the boss 17 of the tripod 15. This makes the boss 17 rotate, and which also causes rotation of the second rotating shaft 14. When the joint angle of the two rotating shafts 12 and 14 is not zero, a central axis of the first rotating shaft 12 is not aligned with that of the second rotating shaft 14, and each of the trunnion 18 displaces relative to the side face 16a of the guide grooves 16 to move around the tripod 15, as shown in FIG. 1 and FIG. 2. As a result, the rollers 19 supported at the ends of the trunnions 18 move along the axial directions of the trunnions 18, respectively, while rolling on the side faces 16a of the guide grooves 16. Such movement ensures that a constant velocity between the first and second rotating shaft is achieved.

When the first and second shafts rotate with a joint angle present, each roller 19 moves with complexity. For example, each roller 19 moves in the axial direction of the housing 13 along each of the side faces 16a of the respective guide grooves 16, while the rollers 19 change in orientation and further displace in the axial direction of the trunnion 18. Such movement of the rollers 19 cannot cause a relative movement between a peripheral outside face of each of the rollers 19 and each of the side faces 16a to be smoothly made. Thus, a relatively large friction occurs between the faces. As a result, this tripod type constant velocity joint produces three-directional axial forces as the shafts rotate. In the application of a tripod joint to the vehicles, it is known that the axial forces may cause a transverse vibration typically referred to as "shudder", if a large torque is transmitted with a relatively large joint angle present.

In order to restrain such a shudder problem from occurring, FR 275280 discloses a structure as shown in FIG. 3, and U.S. Pat. No. 6,533,668 B2 discloses a structure as shown in FIG. 4. In the structure shown in FIG. 3(a), roller 19a is guided parallel to the housing groove and spherical trunnion 18 can swing and pivot around an inner spherical roller surface of inner roller 19b. In this case, the contact area between the inner spherical surface of the inner roller 19b and the trunnion 18, when receiving torque for a load, is of an elliptical shape as shown in FIG. 3(b). It has a longer contact diameter "a" and a shorter contact diameter "b", because a radius "r" of a longitudinal cross-sectional shape of the spherical trunnion 18 is smaller than a radius "r3" of the trunnion 18.

The trunnion and roller structure shown in FIG. 4 has a structure similar to that shown in FIG. 3, however, with certain modifications thereof. The trunnion 18' has an elliptical shape in the cross sectional view taken normal to the trunnion axis, which comprises a shorter diameter "B" in the length not receiving a load, and a longer diameter "A" in the length for receiving a load. This is to make a contact pattern between the inner spherical surface of the inner roller 19b and the trunnion 18' closer to a circle, when receiving a torque for a load. As a result, a longer contact diameter a' in FIG. 4 becomes smaller than the longer contact diameter a in FIG. 3 due to the elliptical shape of the trunnion 18'. However, it still has an elliptical contact pattern even though the degree of ellipse becomes less than that shown in FIG. 3 because a curvature of a longitudinal cross-section of the trunnion 18' formed by radius r2 and R is not equal to a curvature of an axial cross-section of the trunnion 18 formed by an ellipse 18a defined as a longer diameter A and a shorter diameter B.

Moreover, for manufacturing the constant velocity joint of FIG. 4, there are considerable difficulties not only to machine a complex spherical surface defined by a curvature of a longitudinal cross-section of the trunnion 18' formed by radius r2 and R and the ellipse shape 18' defined as a longer diameter A and a shorter diameter B, but also to measure the trunnion 18' having a complex three dimensional profile, in terms of both inspection and quality control. These difficulties cause the contact pattern mentioned above to be inconsistent in terms of quality, which leads to high costs in manufacturing perspective and also to potential quality control issues.

When these conventional joints rotate with a joint angle present upon receiving loads, as shown in FIG. 3(b) and FIG. 4(b), a pivotal movement of counterclockwise direction of trunnion 18 and 18' causes a pivotal sliding action to take place on the contact ellipse. Then the pivotal sliding action operates as a frictional spinning moment (of a direction indicated by arrows "Ts" in FIG. 3(b)) so as to change a rolling direction of the roller assembly 19, which comprises the inner roller 19b and the outer roller 19a with needle bearings 20 engaged there-between. As a result, direction of the roller assembly 19 changes and it is in contact with inner or outer face of the guide groove 16, and thus, increasing a frictional contact force there-between. Moreover, the roller assembly 19 displaces not to parallel to the guide groove 16. Hence it is difficult for the roller assembly 19 to be smoothly rolled, and causes a significant rolling resistance.

Moreover, in order to provide grease-entry space for better durability and smooth operation, space "s" is provided between the lower end at the inner face of the inner roller 19b and the spherical face of the trunnion 18, as shown in FIG. 3(a). Alternatively, space "s" can also be provided between the upper and lower ends at the inner face of the inner roller 19b and the upper and lower portions of the spherical face of the trunnion 18, as shown in FIG. 4(a). However, sufficient grease cannot permeate into the space of the upper end between the inner roller 19b and the trunnion 18 easily, in the structure shown in FIG. 3 and FIG. 4. In the case shown in FIG. 3, space is not provided to the upper end of the trunnion, even in the axial direction thereof, and space in the circumferential direction is smaller than that in the axial direction, due to an ellipse contact in which a longer contact diameter "a" in the circumferential direction is bigger than a shorter diameter "b" in the axial direction, thereby blocking grease from the contact area by the difference of the longer contact diameter and the shorter diameter, especially in terms of the circumferential direction, in the structures shown both in FIG. 3 and FIG. 4. As such, because the space is too narrow to accommodate sufficient grease in the circumferential and axial direction, it is difficult for the grease to be introduced into the space. This becomes more problematic when the grease is in high density condition, for example, during the initial driving stage of automobile particularly at a cold outside temperature, which causes a significant rolling resistance in the drive system.

A clearance can be provided between the needle roller 20 and the outer roller 19a and the inner roller 19b, all in the radial direction and in the circumferential direction to reduce the rolling resistance. However, the clearance is not sufficient to facilitate the grease to penetrate between the needle roller 20 and the outer roller 19a and the inner roller 19b, because rims 19a1 and 19a2 inwardly protruded at both circumferential ends of the outer roller 19a block the grease from flowing between the needle roller 20, the outer roller 19a and the inner roller 19b. This inadequate greasing condition causes the needle rollers 20 not to be rolled smoothly between the inner roller 19b and the outer roller 19a.

SUMMARY OF THE INVENTION

One object of the present invention is to provide a tripod type constant velocity joint which has a simple and durable structure and also is effective and reliable in operation, in which the joint includes, among other members, plural (e.g., three) trunnions each having a pair of cylindrical protrusions protruded a predetermined distance from the outer surface of the trunnion in a direction generally perpendicular to the axis of the corresponding trunnion. These cylindrical protrusions provide a reduced contact surface between the trunnion and the inner face of the corresponding inner roller, and thus, reducing the frictional spinning force acting on the contact ellipse made between the outer face of the trunnion and the inner face of the inner roller, due to the pivotal sliding movement of the trunnion axis known in the art.

Another object of the present invention is to provide a tripod type constant velocity joint having a sufficient lubrication mechanism between the inner race and the trunnion, and between the outer roller, the needle rollers, and the inner roller, to minimize the rolling resistance when rotating with any joint angle present.

A further object of the present invention is to provide a tripod type constant velocity joint which as a reliable structure and easy to be assembled. The joint includes, among other members, plural trunnions each having a pair of opposing cylindrical protrusions each protruded a predetermined distance from the outer surface of the trunnion in a direction generally perpendicular to the axis of the corresponding trunnion and each having spherical outer surface, and a pair of grooves formed on the bottom portion of the inner roller at two opposing locations corresponding to the pair of cylindrical protrusions to facilitate assembling the trunnion to the inner roller through the grooves. In certain preferred embodiments, each of the two opposing bottom grooves of the inner roller has an elliptical shape which can facilitate assembling the inner roller into the trunnion as the assembly is made with the inner roller tilted to a predetermined degree. This is because the elliptical shape of the two opposing bottom grooves of the inner roller corresponds to the outer surface of the two opposing protrusions of the trunnion when they are tilted with respect to each other as the spherical outer surface of the protrusions is projected to an elliptical shape when viewed from the tilted angle of the inner roller. This particular arrangement can reduce stress-concentrations typically occurring at the edge portions of the bottom grooves of the inner roller during the assembly process, and thus, can also prevent a potential plastic deformation of the inner roller during the assembly process of pressing the trunnion into the inner roller. As a result, an extra manufacturing or tooling cost, typically required for the assembly, can be reduced.

To solve the above described problems and other problems to be recognized by following disclosure, a tripod type constant velocity joint is provided for a drive system, the drive system including first and second rotating shafts coupled with the constant velocity joint, in which the constant velocity joint comprises: a hollow housing having an opening at one end, and a closing at its opposite end fixed to an end of the first rotating shaft, an inner face of the housing including a plurality of guide grooves extending in an axial direction of the housing and spaced equally apart in a circumferential direction of the housing, each groove having a pair of side faces opposing to each other; and a tripod disposed at an end of the second rotating shaft, having a plurality of trunnions each positioned in a corresponding one of the guide grooves and being spaced equally apart in a circumferential direction of and at an angle normal to the second rotating shaft; and, an inner roller mounted to an outer end portion of each of the trunnions, an outer roller mounted on an outer face of each inner roller with needle rollers engaged between the inner and outer rollers, and allowing the outer face of each outer roller to roll and move in the corresponding one of the guide grooves and for transmitting a load between the first and second rotating shafts to drive the driving system.

Each of the trunnions includes an at least partially spherical surface in a circumferential area subjecting to the load, and a cylindrical protrusion disposed at the at least partially spherical surface and protruded to a distance from the at least partially spherical surface in a direction normal to the axis of the respective trunnion, the cylindrical protrusion having an at least partially spherical surface at its distal end for surface-to-surface contact with an at least partially spherical inner face of the respective inner roller while defining a gap around the cylindrical protrusion and between the at least partially spherical surface of the respective trunnion and the at least partially spherical inner face of the respective inner roller, the gap around the cylindrical protrusion of the respective trunnion allowing a lubricant to introduce in the gap for lubrication.

Each of the trunnions preferably includes a flat surface in a circumferential area not subjecting to the load and thereby providing larger space between the flat surface and the at least partially spherical inner face of the respective inner roller, the space allowing a lubricant to introduce therein for lubrication.

Each of the inner rollers preferably includes a pair of grooves each formed on the bottom portion of the respective inner roller facing a boss of the tripod, and further includes another pair of grooves each formed on the top portion of the respective inner roller, wherein the respective inner roller is elastically deformable about the pair of grooves formed on the top portion of the inner roller to expand the inner opening of the inner roller to install the corresponding trunnion in the inner roller.

The cylindrical protrusion has a cross section of circular shape, or alternatively, of elliptical shape. Each of the trunnions may have a central portion recessed or cut out from said cylindrical protrusion for reducing a contact area between the inner rollers and trunnions.

According to another aspect of the invention, a method of assembling a roller assembly of a constant velocity joint on a trunnion of the joint, comprises the steps of:

providing a roller assembly for a constant velocity joint, the roller assembly including: an outer roller with a tapered cylindrical surface formed on the inner face of the outer roller; an inner roller with a tapered cylindrical surface formed on the outer face of the inner roller and with at least partially spherical inner face, the tapered outer cylindrical surface of the inner roller having a same taper angle with the tapered inner cylindrical surface of the outer roller, the inner roller including a pair of grooves formed on a bottom portion of the inner roller facing a boss of the trunnion and in a diametric direction, and another pair of grooves formed on a top portion of the inner roller and in a diametric direction perpendicular to the direction of the pair of grooves formed on the bottom portion; and needle rollers for receiving between the inner and outer rollers;

providing a constant velocity joint having a tripod with at least one trunnion, the trunnion including a pair of cylindrical protrusions protruded normal to the axis of the trunnion to a predetermined height from an outer surface of the trunnion, each of the cylindrical protrusions having a generally spherical end surface for contacting with the at least partially spherical inner face of the inner roller;

mounting the outer roller on a shoulder portion of the tripod disposed below the trunnion, in such a manner that the tapered inner cylindrical surface of the outer roller is converged in a radial direction facing a boss of the tripod, the outer roller having the needle rollers assembled in the tapered inner cylindrical surface of the outer roller;

placing the inner roller in an opening defined by the needle rollers assembled in the outer roller with the pair of cylindrical protrusions received in the pair of grooves on the bottom of the inner roller, in such a manner that a tapered cylindrical surface formed on the outer face of the inner roller are converged in the radial direction facing the boss and the pair of grooves on the top portion of the inner race are positioned in the direction not receiving the load; and applying a gripping force on the upper edges of the inner roller in the direction receiving the load, and forcing the inner opening of the inner roller elastically expanded around the grooves formed on the top portion of the inner roller and in the direction receiving the load, the elastic expansion being within a radial clearance of the roller assembly provided between the tapered cylindrical outer face of the inner roller, the tapered cylindrical inner face of the outer roller, and the needle rollers, and thereby mounting the inner roller to the trunion with the generally spherical end surface of the cylindrical protrusions contacting against the at least partially spherical inner face of the inner roller.

According to another aspect of the invention, a method of assembling a roller assembly of a constant velocity joint on a trunnion of the joint, comprises the steps of:

providing a roller assembly for a constant velocity joint, the roller assembly including: an outer roller with a tapered cylindrical surface formed on the inner face of the outer roller; an inner roller with a tapered cylindrical surface formed on the outer face of the inner roller and with at least partially spherical inner face, the tapered outer cylindrical surface of the inner roller having a same taper angle with the tapered inner cylindrical surface of the outer roller, the inner roller including a pair of grooves formed on a bottom portion of the inner roller facing a boss of the trunnion and in a diametric direction, and another pair of grooves formed on a top portion of the inner roller and in a diametric direction parallel to the direction of the pair of grooves formed on the bottom portion; and needle rollers for receiving between the inner and outer rollers;

providing a constant velocity joint having a tripod with at least one trunnion, the trunnion including a pair of cylindrical protrusions protruded normal to the axis of the trunnion to a predetermined height from an outer surface of the trunnion, each of the cylindrical protrusions having a generally spherical end surface for contacting with the at least partially spherical inner face of the inner roller;

mounting the outer roller on a shoulder portion of the tripod disposed below the trunnion, in such a manner that the tapered inner cylindrical surface of the outer roller is converged in a radial direction facing a boss of the tripod, the outer roller having the needle rollers assembled in the tapered inner cylindrical surface of the outer roller;

placing the inner roller in an opening defined by the needle rollers assembled in the outer roller with the pair of cylindrical protrusions received in the pair of grooves on the bottom of the inner roller, in such a manner that a tapered cylindrical surface formed on the outer face of the inner roller are converged in the radial direction facing the boss and the pair of grooves on the top portion of the inner race are positioned in the direction receiving the load; and applying a gripping force on the upper edges of the inner roller in the direction not receiving the load, and forcing the inner opening of the inner roller elastically expanded around the grooves formed on the top portion of the inner roller and in the direction not receiving the load, the elastic expansion being within a radial clearance of the roller assembly provided between the tapered cylindrical outer face of the inner roller, the tapered cylindrical inner face of the outer roller, and the needle rollers, and thereby mounting the inner roller to the trunion with the generally spherical end surface of the cylindrical protrusions contacting against the at least partially spherical inner face of the inner roller.

According to a further aspect of the invention, a method of assembling a roller assembly of a constant velocity joint on a trunnion of the joint, comprises the steps of:

providing a roller assembly for a constant velocity joint, the roller assembly including: an outer roller with a tapered cylindrical surface formed on the inner face of the outer roller; an inner roller with a tapered cylindrical surface formed on the outer face of the inner roller and with at least partially spherical inner face, the tapered outer cylindrical surface of the inner roller having a same taper angle with the tapered inner cylindrical surface of the outer roller, the inner roller including a pair of grooves formed on a bottom portion of the inner roller facing a boss of the trunnion and in a diametric direction, and two pairs of grooves formed on a top portion of the inner roller both in a diametric direction parallel to and in a diametric direction perpendicular to the direction of the pair of grooves formed on the top portion; and needle rollers for receiving between the inner and outer rollers;

providing a constant velocity joint having a tripod with at least one trunnion, the trunnion including a pair of cylindrical protrusions protruded normal to the axis of the trunnion to a predetermined height from an outer surface of the trunnion, each of the cylindrical protrusions having a generally spherical end surface for contacting with the at least partially spherical inner face of the inner roller;

mounting the outer roller on a shoulder portion of the tripod disposed below the trunnion, in such a manner that the tapered inner cylindrical surface of the outer roller is converged in a radial direction facing a boss of the tripod, the outer roller having the needle rollers assembled in the tapered inner cylindrical surface of the outer roller;

placing the inner roller in an opening defined by the needle rollers assembled in the outer roller with the pair of cylindrical protrusions received in the pair of grooves on the bottom of the inner roller, in such a manner that a tapered cylindrical surface formed on the outer face of the inner roller are converged in the radial direction facing the boss and said one pair of grooves on the top portion of the inner race are positioned in the direction not receiving the load and said the other pair of grooves on the top portion of the inner race are positioned in the direction receiving the load; and pressing the inner roller into the trunnion by a force applied in the axial direction of the trunnion, and forcing the inner opening of the inner roller elastically expanded around said two pairs of grooves formed on the top portion of the inner roller both in the direction receiving the load and in the direction not receiving the load, the elastic expansion being within a radial clearance of the roller assembly provided between the tapered cylindrical outer face of the inner roller, the tapered cylindrical inner face of the outer roller, and the needle rollers, and thereby mounting the inner roller to the trunion with the generally spherical end surface of the cylindrical protrusions contacting against the at least partially spherical inner face of the inner roller.

According to the invention as disclosed, the contact area for transmitting torque is between the inner spherical face of the inner roller and a spherical end surface of the cylindrical protrusions protruded along the axis normal to the axis of the trunnion, and has a circular shape. This circular contact area can significantly reduce fluctuations or shudder problems in the drive system during rotation which can be caused by the frictional spinning moment owing to the elliptical contact area in the conventional constant velocity joint known in the art.

The contact made in transmitting torque between the tapered cylindrical outer face of the inner roller and needle rollers and the tapered cylindrical inner face of the outer roller forces the roller assembly to be pressed to the bottom portion of the groove guides of the housing facing a boss of the trunnion, by an axial component of a load which is acting in the direction of the axis of the trunnion and at the same time facing a boss of the trunnion. Thus it is possible to help the roller assembly to rotate smoothly and without any significant fluctuation during rotation.

More space is provided between the inner face of the inner roller and the trunnion in a circumferential direction as well as in the axial direction, by adopting a cylindrical protrusion having a spherical surface at its end and is positioned to the direction of receiving a load. This configuration enables grease to flow smoothly into and out of the space provided in the circumferential and axial direction which is secured by a height of a cylindrical protrusion projected from the trunnion and by its cross-section.

More clearance is provided between the needle roller and the inner face of the outer roller and the outer face of the inner roller, in the radial and the circumferential direction, by providing a tapered cylindrical face to both the inner face of the outer roller and the outer face of the inner roller, which clearance in a top portion between the needle rollers and the inner roller and the outer roller is bigger than that in a bottom portion facing a boss of the tripod, both in the radial direction and in the circumferential direction. Thus, more clearance in the top portion makes grease flow easily in the joint and facilitates an initial lubrication to the roller assembly. Accordingly, the invention can bring about advantages including a stable rolling of the roller assembly, a smaller rolling resistance, and a lower axial force of the joint.

According to a further aspect of the invention, a tripod type constant velocity joint for a drive system having a first rotating shaft and a second rotating shaft coupled with the constant velocity joint, comprises: a hollow housing having an opening at one end, and a closing at its opposite end fixed to an end of the first rotating shaft, an inner face of the housing including a plurality of guide grooves extending in an axial direction of the housing and spaced equally apart in a circumferential direction of the housing, each groove having a pair of side faces opposing to each other; a tripod disposed at an end of the second rotating shaft, having a plurality of trunnions each positioned in a corresponding one of the guide grooves and being spaced equally apart in a circumferential direction of and at an angle normal to the second rotating shaft; and, an inner roller having a spherical inner face for receiving an outer end portion of each of the trunnions therein, an outer roller mounted on an outer face of each inner roller with needle rollers engaged between the inner and outer rollers, and allowing the outer face of each outer roller to roll and move in the corresponding one of the guide grooves and for transmitting a load between the first and second rotating shafts to drive the driving system; wherein each of the trunnions includes a pair of cylindrical protrusions opposingly disposed and protruded to a distance from an outer surface of the trunnion in a direction normal to the axis of the trunnion, each of the cylindrical protrusions including a spherical surface at its distal end for surface-to-surface contact with the spherical inner face of the inner roller while defining a gap around the cylindrical protrusion and between the surface of the trunnion and the spherical inner face of the inner roller; and wherein each of the inner rollers includes a pair of grooves each formed in a diametric direction and on the bottom portion of the inner roller facing a boss of the tripod, the pair of grooves sized for receiving the pair of cylindrical protrusions of the trunnion while inclining the inner roller to a predetermined degree with respect to the trunnion for assembly.

Each of the pair of grooves formed on the bottom portion of the inner roller preferably has an elliptical groove shape corresponding to an elliptical shape of the pair of cylindrical protrusions when projected from the inner roller inclined to the predetermined degree with respect to the trunnion. The cylindrical protrusions of the trunnions are preferably configured and dimensioned that they can be securely received in the elliptical grooves such that, after assembly, they can not be pulled out of the grooves under a normal operating condition because the cylindrical protrusions have a height larger than the depth of the bottom grooves of the inner roller.

Alternatively, each of the grooves formed on the bottom portion of the inner roller may comprises a central circular groove portion and two peripheral groove portions disposed lateral to the central circular groove portion, in which the central circular groove portion has a radius defined by the elliptically projected surface size of the cylindrical protrusions and the two peripheral groove portions are generally planar with a taper angle tangential to the elliptically projected surface of the cylindrical protrusions.

According to a further aspect of the invention, a method of assembling a roller assembly of a constant velocity joint onto a trunnion of the joint, comprises the steps of:

providing a roller assembly for a constant velocity joint, the roller assembly including: an outer roller with a tapered cylindrical surface formed on the inner face of the outer roller, an inner roller with a tapered cylindrical surface formed on the outer face of the inner roller and with at least partially spherical inner face, the tapered outer cylindrical surface of the inner roller having a same taper angle with the tapered inner cylindrical surface of the outer roller, the inner roller including a pair of grooves diametrically disposed on a bottom portion of the inner face of the inner roller, and needle rollers for receiving between the inner and outer rollers;

providing a constant velocity joint having a tripod with at least one trunnion, the trunnion including a pair of cylindrical protrusions protruded normal to the axis of the trunnion to a predetermined height from an outer surface of the trunnion, each of the cylindrical protrusions having a generally spherical end surface for contacting with the at least partially spherical inner face of the inner roller;

mounting the outer roller on a shoulder portion of the tripod disposed below the trunnion in such a manner that the tapered inner cylindrical surface of the outer roller is converged in a radial direction facing a boss of the tripod, the outer roller having the needle rollers assembled in the tapered inner cylindrical surface of the outer roller;

placing the inner roller onto the trunnion and partially introducing the pair of cylindrical protrusions of the trunnion in the corresponding pair of grooves formed on the bottom portion of the inner roller;

tilting the inner and outer rollers with one side of the outer roller abuts against the shoulder portion of the trunnion such that one of the pair of cylindrical protrusions is thoroughly received in the inner face of the inner roller through a corresponding one of the pair of grooves of the inner roller and the other one of the pair of cylindrical protrusions is still partially introduced in the other one of the pair of grooves of the inner roller, and allowing the inner and outer rollers to be inclined by a predetermined degree with respect to the trunnion; and pushing an upper side of the inclined outer roller down to the shoulder portion of the trunnion until the other one of the pair of cylindrical protrusions is completely received in the inner face of the inner roller through the other one of the pair of grooves of the inner roller.

In one preferred embodiment, said providing the roller assembly step and said providing the constant velocity joint step provide the inner roller having the pair of grooves each with an axial length smaller than a distance from the bottom face of the inner roller to the center line of the inner roller, and also provide the trunnion having the pair of cylindrical protrusions with a distance between the two spherical end surfaces of the pair of cylindrical protrusions larger than an opening size between the pair of grooves and with a distance between the two spherical end surfaces of the pair of cylindrical protrusions, when projected from the axis of the inner roller inclined by said tilting step, still larger than the opening size between the pair of grooves; and wherein said pushing step is performed while applying a force of predetermined amount on the upper side of the inclined outer roller with a lower side of the inclined outer roller abutting against the shoulder portion of the trunnion for allowing an elastic expansion of the inner roller for assembly.

In another preferred embodiment, said providing the roller assembly step and said providing the constant velocity joint step provide the inner roller having the pair of grooves each with an axial length about the same as a distance from the bottom face of the inner roller to the center line of the inner roller, and provide the trunnion having the pair of cylindrical protrusions with a distance between the two spherical end surfaces of the pair of cylindrical protrusions about the same as an opening size between the pair of grooves and with a distance between the two spherical end surfaces of the pair of cylindrical protrusions, when projected from the axis of the inner roller inclined by said tilting step, smaller than the opening size between the pair of grooves; and wherein said pushing step is performed without applying an external force of considerable amount on the upper side of the inclined outer roller with a lower side of the inclined outer roller abutting against the shoulder portion of the trunnion for assembly.

In another preferred embodiment, said providing the roller assembly step and said providing the constant velocity joint step provide the inner roller having the pair of grooves each with an axial length smaller than a distance from the bottom face of the inner roller to the center line of the inner roller, and provide the trunnion having the pair of cylindrical protrusions with a distance between the two spherical end surfaces of the pair of cylindrical protrusions larger than an opening size between the pair of grooves and with a distance between the two spherical end surfaces of the pair of cylindrical protrusions, when projected from the axis of the inner roller inclined by said tilting step, about the same as the opening size between the pair of grooves; and wherein said pushing step is performed without applying an external force of considerable amount on the upper side of the inclined outer roller with a lower side of the inclined outer roller abutting against the shoulder portion of the trunnion for assembly.

BRIEF DESCRIPTION OF THE DRAWINGS

The above described and other objects, features and advantages of the present invention will be more apparent from the presently preferred embodiments of the invention disclosed in the following description and illustrated in the accompanying drawings, in which:

FIGS. 5(a) and 5(b) are cross-sectional views showing the first embodiment of the present invention, in which FIG. 5(a) is a longitudinal cross-sectional view and FIG. 5(b) is a side cross-sectional view.

FIGS. 6(a) and 6(b) are cross-sectional views of the trunnion illustrating the second embodiment of the present invention, in which FIG. 6(a) is a view of an axis of receiving a load, and FIG. 6(a) is a view of an axis of non-receiving a load.

FIGS. 7(a) and 7(b) are cross-sectional views of the trunnion showing the third embodiment of the present invention, in which FIG. 7(a) is a view of an axis of receiving a load, and FIG. 7(b) is a view of an axis of non-receiving a load.

FIGS. 8(a) and 8(b) are cross-sectional views of the trunnion showing the fourth embodiment of the present invention, in which FIG. 8(a) is a view of an axis of receiving a load, and FIG. 8(b) is a view of an axis of non-receiving a load.

FIGS. 9(a)-9(c) are cross-sectional views of the inner roller showing the fifth embodiment of the present invention, in which FIG. 9(a) is a top view, FIG. 9(b) is a side view, and FIG. 9(c) is a bottom view.

FIG. 12 and FIG. 13 are cross-sectional views of the seventh embodiment of the present invention, in which FIG. 12 shows an explanatory view showing an arrangement made between the roller assembly and the trunnion before fitting the roller assembly into the trunnion, and FIG. 13 is an explanatory view showing how to get the roller assembly into the trunnion, based on an arrangement shown in FIG. 12.

FIG. 14 and FIG. 15 are cross-sectional views of the eighth embodiment of the present invention, in which FIG. 14 shows an explanatory view showing an arrangement made between the roller assembly and the trunnion before fitting the roller assembly into the trunnion, and FIG. 15 is an explanatory view showing how to get the roller assembly into the trunnion, based on an arrangement shown in FIG. 14.

FIG. 16 and FIG. 17 are cross-sectional views of the ninth embodiment of the present invention, in which FIG. 16 shows an explanatory view showing an arrangement made between the roller assembly and the trunnion before fitting the roller assembly into the trunnion, and FIG. 17 is an explanatory view showing how to get the roller assembly into the trunnion, based on an arrangement shown in FIG. 16.

FIG. 19 shows the eleventh embodiment; in which

FIGS. 21(a)-21(f) are cross-sectional and explanatory views of the twelfth embodiment of the present invention, in which FIG. 21(a) is a partial cross-sectional view illustrating a spatial relationship between the trunnion and the inner roller with the inner roller inclined by the angle Ω, FIG. 21(b) is a partial view illustrating the elliptical projections of the circular shapes of the cylindrical protrusions when viewed from the angle of the inner roller tilted by the angle Ω, FIG. 21(c) is partial views of the inner roller and trunnion shown from the direction M in FIG. 21(a), FIG. 21(d) is cross sectional views of the inner roller, and FIG. 21(e) is a partial cross-sectional view illustrating the state that the inner roller is assembled into the trunnion, and FIG. 21(f) is partial views of the inner roller and trunnion shown from the direction N in FIG. 21(e) in which the right side figure shows a partial view enlarged from the left side figure for further illustrating the assembled state of the trunnion in the inner roller.

FIGS. 22(a)-22(c) shows the thirteenth embodiment of the present invention, in which FIG. 22(a) is partial views illustrating a spatial relationship between the trunnion axis and the inner roller with the inner roller inclined by the angle Ω (in which the right side figure shows a partial view enlarged from the left side figure), FIG. 22(b) is a partial cross-sectional view of the inner roller, and FIG. 22(c) is partial cross-sectional views showing the state that the inner roller is assembled into the trunnion (in which the right side figure shows a partial view enlarged from the left side figure).

FIGS. 23(a) and 23(b) are cross-sectional views illustrating an assembling method according to the fifteenth embodiment of the present invention, in which FIG. 23(a) is explanatory views illustrating a preliminary arrangement made between the roller assembly and the trunnion before fitting the roller assembly into the trunnion, and FIG. 23(b) is partial cross-sectional views illustrating a method of assembling the roller assembly into the trunnion, performed after the arrangement shown in FIG. 23(a).

FIGS. 24(a) and 24(b) are cross-sectional views illustrating an assembling method according to the sixteenth embodiment of the present invention, in which FIG. 24(a) is explanatory views illustrating a preliminary arrangement made between the roller assembly and the trunnion before fitting the roller assembly into the trunnion, and FIG. 24(b) is partial cross-sectional views illustrating a method of assembling the roller assembly into the trunnion, performed after the arrangement shown in FIG. 24(a).

FIGS. 25(a) and 25(b) are cross-sectional views illustrating an assembling method according to the seventeenth embodiment of the present invention, in which FIG. 25(a) is explanatory views illustrating a preliminary arrangement made between the roller assembly and the trunnion before fitting the roller assembly into the trunnion, and FIG. 25(b) is partial cross-sectional views illustrating a method of assembling the roller assembly into the trunnion, performed after the arrangement shown in FIG. 25(a).

DETAILED DESCRIPTION OF THE INVENTION

The present application claims priority over a prior Applicant's copending application Ser. No. 11/750,138, filed on May 17, 2007, and further presents updated embodiments of the invention in addition to the preferred embodiments described in the prior application identified.

With reference to FIGS. 5-19 of the drawings, exemplary embodiments of the tripod type constant velocity joints of the invention and methods of assembling the joints disclosed in application Ser. No. 11/750,138 are repeated herein below.

Figure 5A:
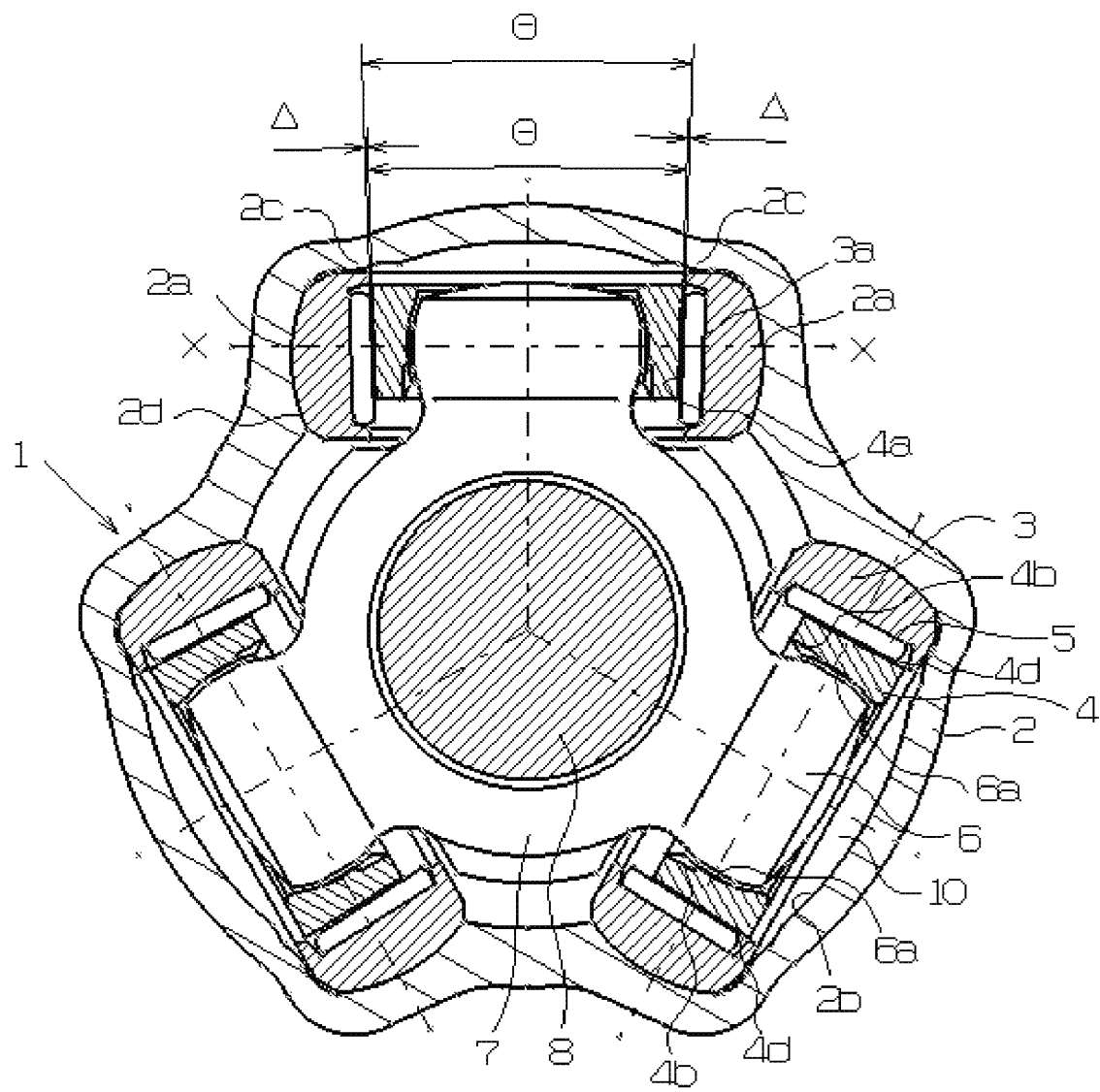
Figure 5B:
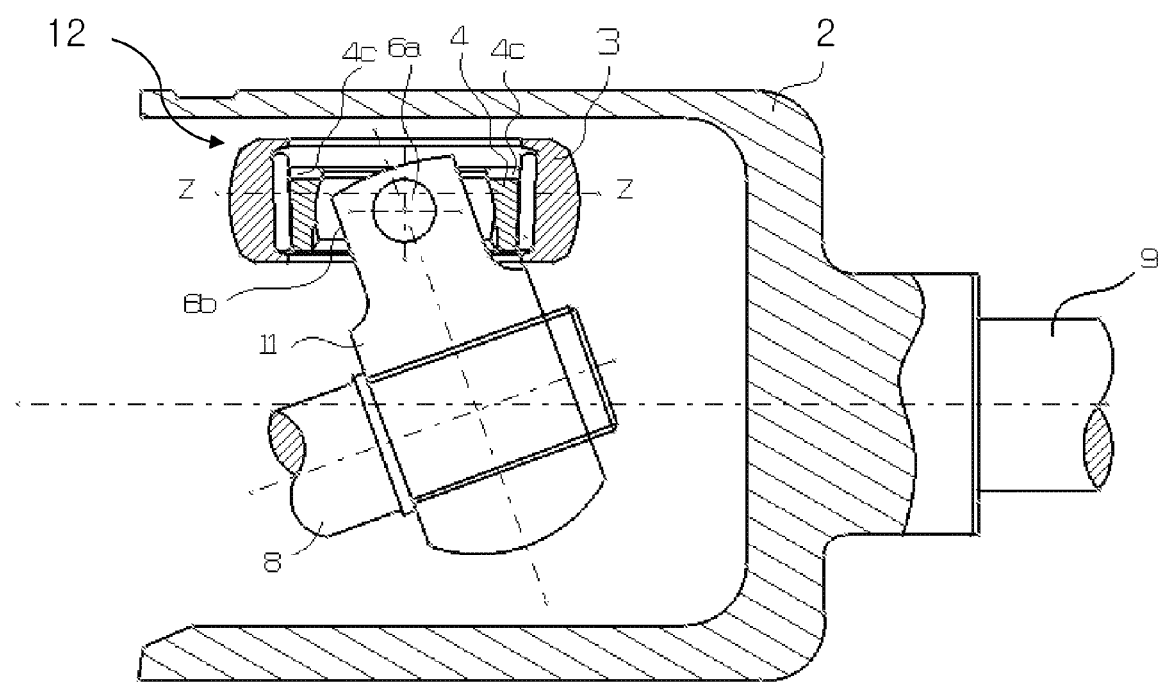

FIG. 5 shows cross-sectional views of a tripod joint constant velocity joint 1 according to the first embodiment of the present invention; in which FIG. 5(a) is a cross-sectional view taken vertical to the second rotating shaft, and FIG. 5(b) is a side cross sectional view taken in an axial direction.

A tripod joint 1 shown in FIG. 5 comprises a hollow cylindrical housing 2 with one end defining an opening, and the other end secured to an end of a first rotating shaft 9 serving as a drive shaft or the like, and a tripod secured at one end of a second rotating shaft 8 which serves as a driven shaft or the like on the wheel side. Three grooves 10 are formed on the inner surface of the housing 2 in a configuration axially extending and equally spaced about the longitudinal axis of the housing. The grooves 10 are recessed from the inner surface outwardly in radial direction of the housing 2.

A tripod 7 is secured at one end of a second rotating shaft 8 with a ring-type boss 11 for supporting the tripod 7 at the second rotating shaft 8. Three trunnions 6 are formed at three equally spaced locations around the boss 11 and extend outwards in a radial direction.

Each of the trunnions 6 has at least one generally flat surface 6b in a circumferential area of the trunnion not receiving a load. More preferably, each trunnion 6 has two opposing flat surfaces 6b in the circumferential area not receiving the load, with the two flat surfaces facing in the Z-Z direction, as shown in FIG. 5(b) and FIG. 6(b).

Each trunnion 6 has two opposing, and generally or at least partially spherical surfaces in the circumferential area receiving the load, namely, with the two spherical surfaces facing in the X-X direction, as shown in FIG. 5(a) and FIG. 6(a). A cylindrical protrusion 6a is formed on each of the generally or at least partially spherical surfaces of the trunnion, with the protrusion extending outwardly (namely, extending in a direction normal to the axis of the trunnion 6) to a distance from the partially spherical surface and with the protrusion having a generally spherical outer surface at its distal end. This generally spherical outer surface corresponds to and in surface-to-surface contact with the generally spherical inner surface of the inner roller 4 of the constant velocity joint of the present invention.

A roller assembly 12 is mounted to each of the trunnion axes. The roller assembly 12 is a double-roller type which has an outer roller 3, an inner roller 4, and needle rollers 5 provided between the outer and inner rollers. The inner roller 4 has a generally spherical inner face which is in contact with the generally spherical surfaces of the cylindrical protrusion 6a as described above. In this manner, the two cylindrical protrusions 6a are projected outwardly from the trunnion 6 in the X-X direction of receiving the load.

The inner roller 4 has a generally cylindrical outer rolling face which is in contact with needle rollers 5. More preferably, as shown in FIG. 5(a), the cylindrical outer face of the inner roller 4 is tapered in the rotational axis direction of the roller, and thereby, includes a tapered or conical outer face 4a with taper angle θ defined by the face.

Figure 9A:
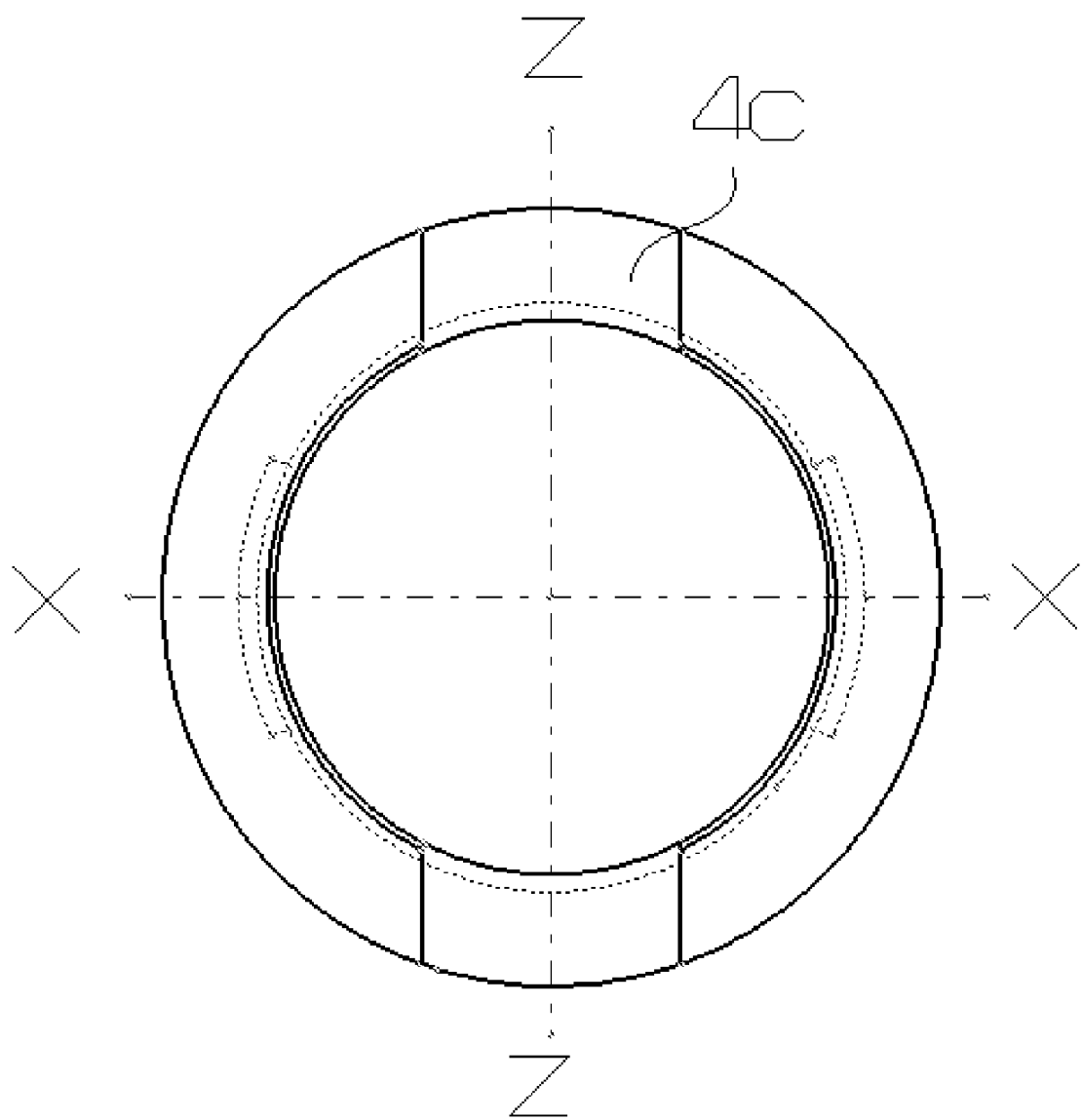
Figure 9B:
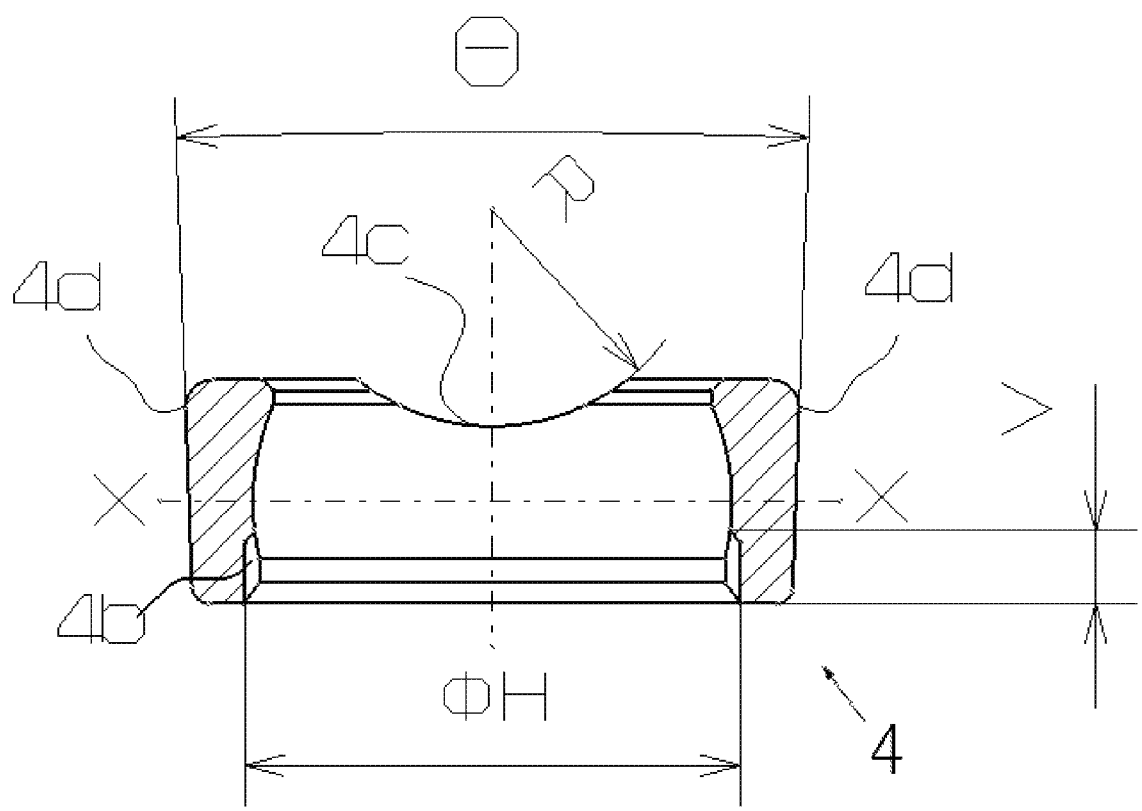

The inner roller 4 preferably further includes two grooves 4b on the bottom portion of the inner roller facing a boss 11, which grooves formed in the X-X direction of receiving a load as shown in FIGS. 5(a), 9(a) and 9(b), in order to have the trunnion 6 assembled into the inner roller 4 through the grooves 4b. The inner roller 4 preferably further includes two grooves 4c formed on the top portion of the inner roller facing the inner face 2b of the housing, which grooves formed in the Z-Z direction of not receiving a load as shown in FIGS. 5(b), 9(a) and 9(b), in order to facilitate assembly of the trunnion 6 with the inner roller 4. Owing to the presence of the top grooves 4c, the inner roller 4 can elastically be bent or deformed to a degree about the two recessed grooves 4c either by applying a gripping pressure inwardly on the upper rim portions 4d (see FIG. 9(b)) of the inner roller or by forcibly widening the opening φH at the lower portion of the inner roller 4, or in combination of the above. This makes the distance between the opposing bottom grooves 4b enlarged and thereby enables the assembly of the trunnion 6 into the inner roller 4.

The outer roller 3 has a generally spherical outer surface which is in contact with the guide grooves 2a of the housing 2. The outer roller 3 preferably includes a tapered inner face 3a with the same taper angle θ as that formed on the outer surface 4a of the inner roller 4 with reference to the axis of the trunnion 6. More space is provided between the inner face the inner roller 4 and the trunnion 6 in a circumferential direction as well as in the axial direction, by adopting a cylindrical protrusion 6a which is protruded along a axis normal to the axis of the trunnion 6 and is positioned to the direction of receiving a load. This configuration enables grease to flow smoothly and easily into and out of the space provided in the circumferential and axial direction and around the cylindrical protrusion 6a of the trunnion 6.

More clearance Δ (as shown in FIG. 5(a)) is provided between the needle rollers 5 and the inner face of the outer roller 3 and the outer face of the inner roller 4 in the radial and the circumferential direction, by providing a tapered face to both the inner face 3a of the outer roller and the outer face 4a of the inner roller. The clearance in a top portion between the needle rollers and the inner roller and the outer roller is preferably bigger than that of the bottom portion facing a boss of the tripod, both in the radial direction and in the circumferential direction, in order to make grease flow more easily in the top portion. This configuration can facilitate an effective initial lubrication to the roller assembly.

The tripod 7 is housed in cylindrical hollow housing 2 through its open end. The inner face of the housing 2 is provided with three guide grooves 10 (formed at locations corresponding to the roller assemblies 12) which extend in the direction of the first rotational shaft 9 and are spaced apart equally in a circumferential direction of the housing 2, thus the grooves 10 spaced apart from each other by about 120° around the housing. Three roller assemblies 12 are rotatably and movably received in their corresponding guide grooves 10 of the housing 2. Each of the guide grooves 10 of the housing has a pair of side face 2a and a bottom portion 2b continuously connected to the side faces 2a. The side faces 2a correspond to the convex arc-shaped or generally spherical outer face of the outer roller 3, and hence are formed as a concave arc-shaped or generally spherical surface of approximately the same dimension as the outer face of the outer roller 3. The side faces 2a extend in the longitudinal direction of the housing or the axial direction of the first rotating shaft 9. Each of the bottom portions 2b of the guide groove is provided with tracking guides (i.e., lateral guide surfaces) 2c for guiding each of the outer rollers in secured rolling contact with an outer spherical end surface of the outer roller. In this way, the side faces 2a of the guide grooves 10 provide a tracking surface on which the outer roller can slide and roll.

Figure 3A:
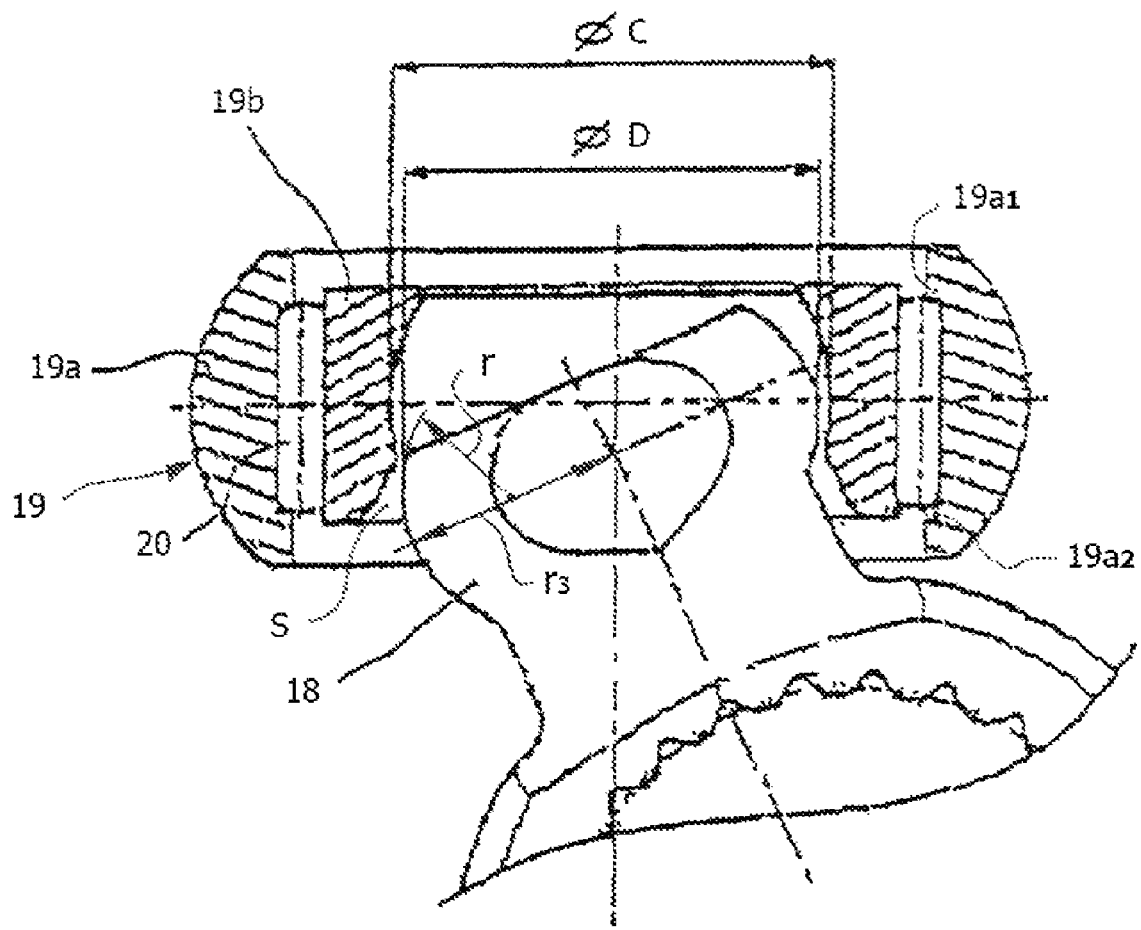
FIG. 3(a) is an explanatory view showing a relationship regarding the location of a conventional axis and inner roller.
Figure 3B:
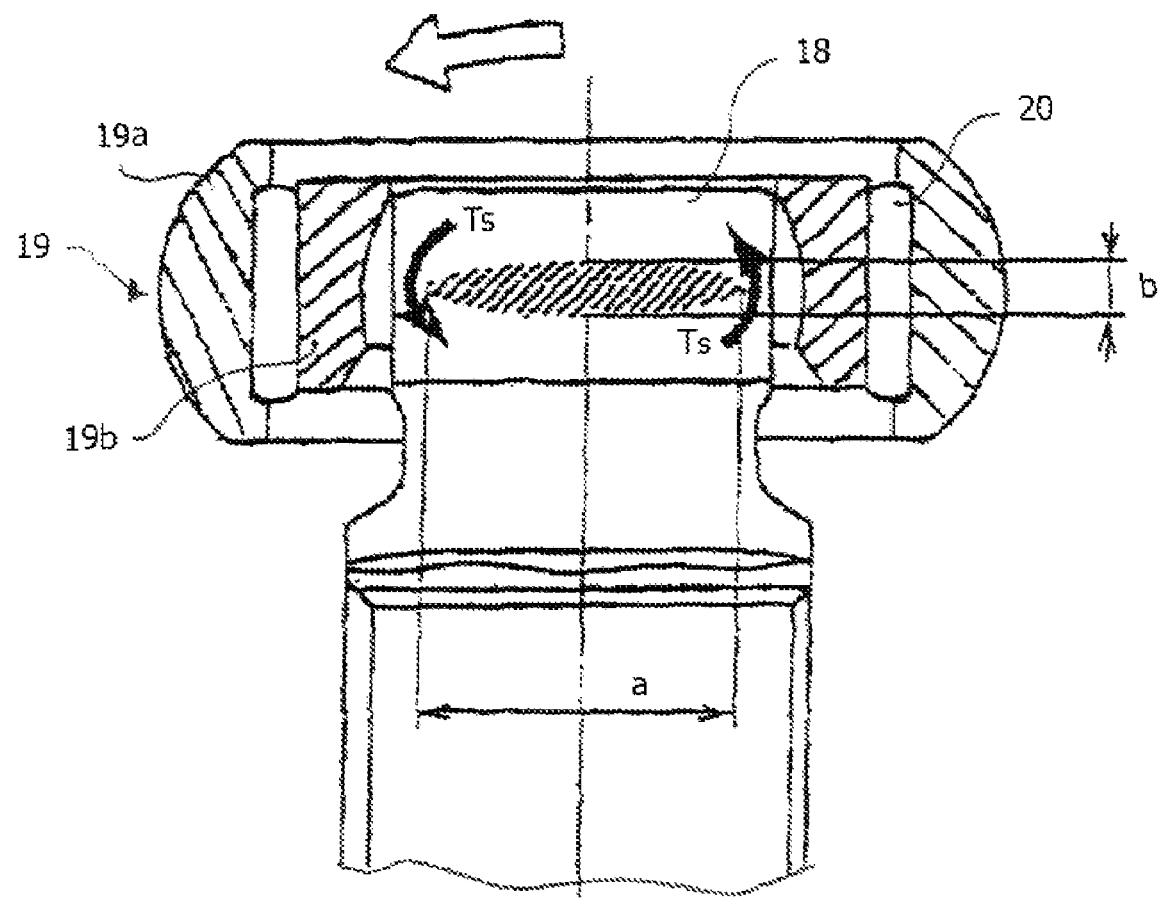
FIG. 3(b) is an explanatory view showing a frictional spinning moment generated in a conventional tripod type constant velocity joint.
Figure 4A:
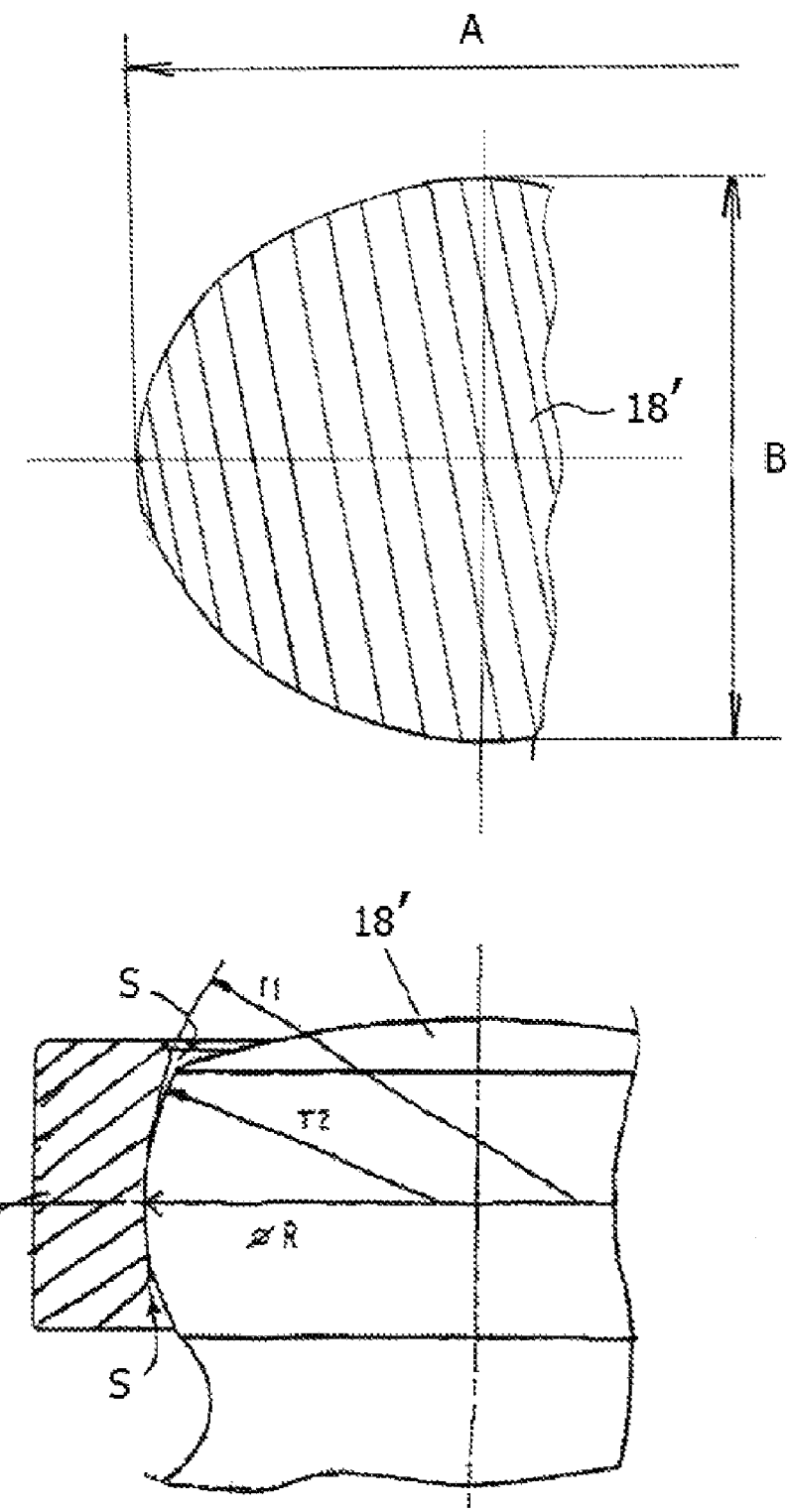
FIG. 4(a) shows both a cross-sectional view of a trunnion and a partial longitudinal cross-sectional view of the trunnion and the inner roller, according to a conventional tripod type constant velocity joint.
Figure 4B:
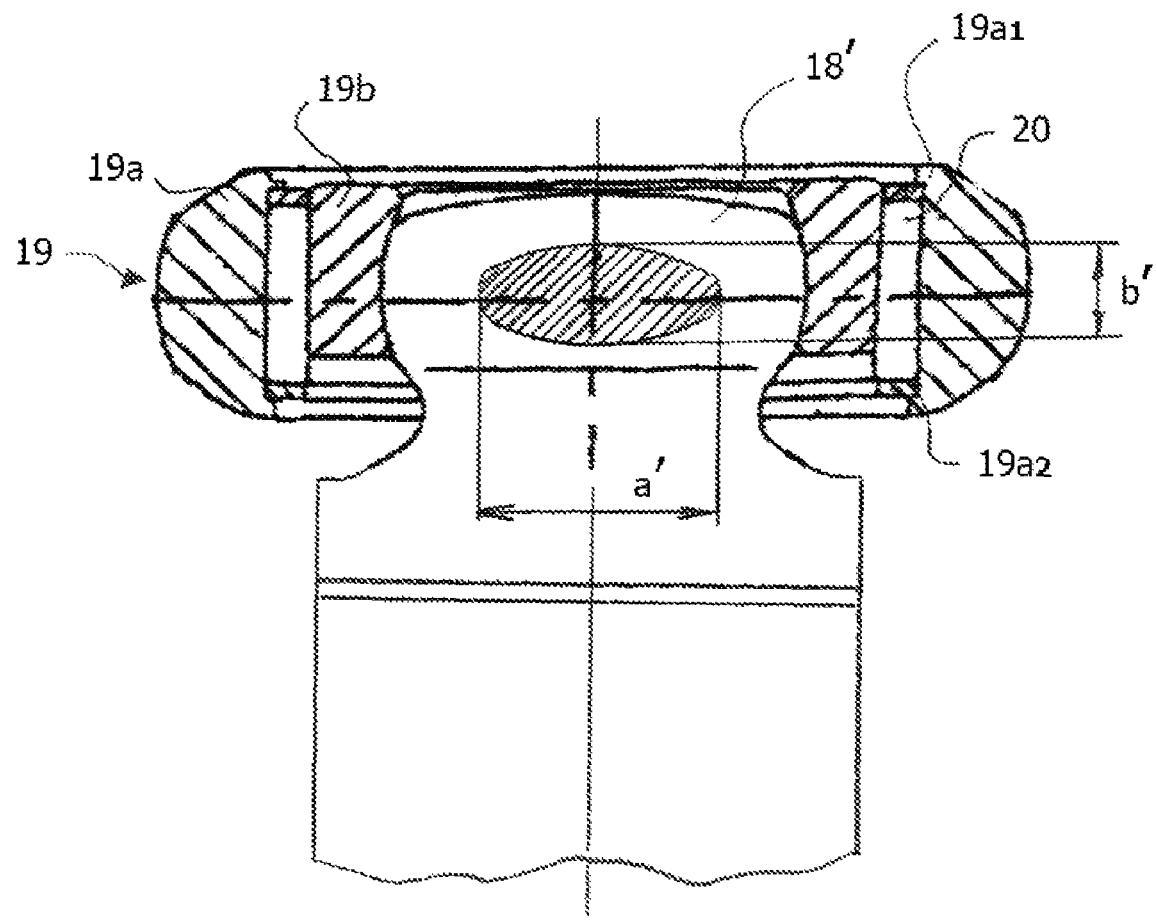
FIG. 4(b) shows an explanatory view showing a frictional spinning moment generated in a conventional tripod type constant velocity joint.

According to the invention as illustrated above with preferable embodiments thereof, the contact area in transmitting torque is defined primarily by the contact surface between the inner spherical face of inner roller 4 and the outer spherical surface of cylindrical protrusion 6a, which is projected to a distance from the trunnion 6, and has a generally circular shape. Thus, unlike the conventional constant velocity joint in which its contact area has an elliptical shape as discussed above (FIG. 3(b)), due to its generally circular contact area between the trunnions and inner roller the joint of the present invention can significantly reduce the conventional fluctuation or shudder problem during rotation which is caused by the pivotal spinning moment of the contact ellipse.

Figure 11:
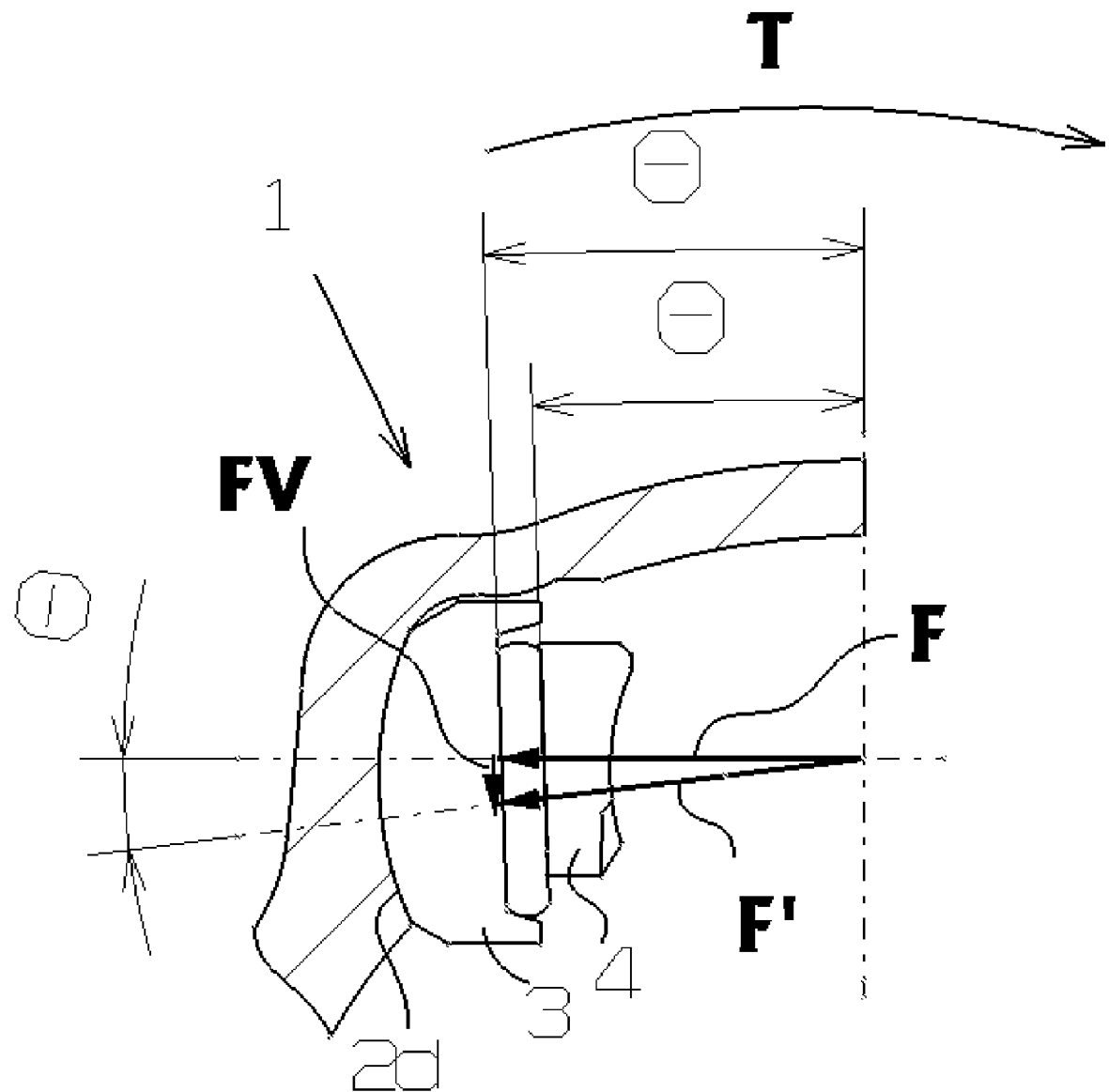
FIG. 11 is an explanatory view showing a load force acting on the roller assembly.

As illustrated in FIG. 11, the transmitting torque is transferred through the contact made between the tapered outer face 4a of the inner roller 4 and needle rollers 5 and between the needle rollers 5 and the tapered inner face 3a of the outer roller, and it causes the roller assembly 12 to be biased toward the inner portion 2d (i.e., toward the boss 11 of the trunnion 6) of the groove guides 10 of the housing 2, by an axial component Fv of a load which is acting in the direction of the axis of the trunnion and toward the boss of the trunnion. Thus this configuration helps the roller assembly 12 to rotate smoothly without any fluctuation during rotation caused by the frictional contact between the lateral side of the outer roller 3 and the lateral tracking guide 2c of the housing 2.

Figure 6:
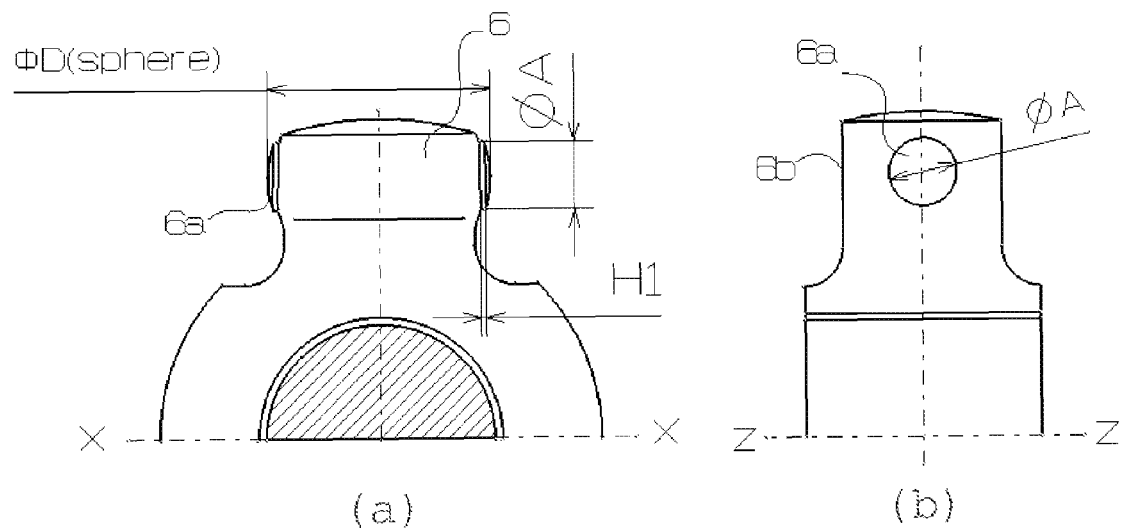

FIG. 6 illustrates a second embodiment of the invention in which each trunnion 6 has a pair of cylindrical protrusions 6a with a diameter φA. The two protrusions 6a are disposed in the X-X direction of receiving a load and respectively protruded along the axis normal to the axis of the trunnion 6 by a height H1. The two protrusions 6a together define a generally spherical end surface with a diameter φD. Each trunnion 6 includes a pair of flat surfaces 6b in the Z-Z direction of not receiving a load, respectively, in order to diminish the spin moment and make grease flow easily in axial and circumferential direction and for enhancing an initial lubrication of the joint.

Figure 7:
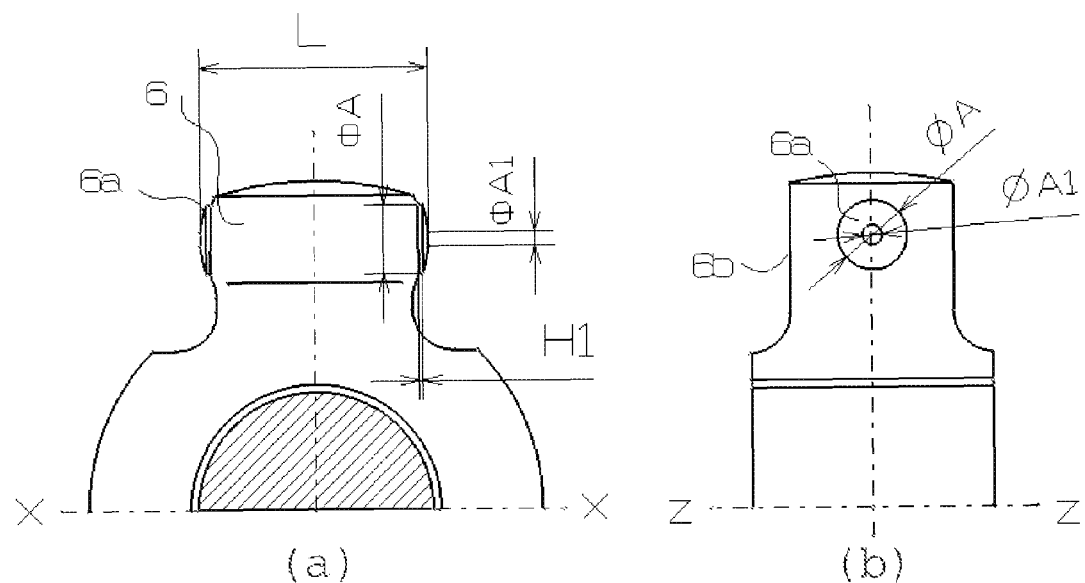

With reference to FIG. 7, the third embodiment is described herein. This embodiment is similar to the first and second embodiments described above. The difference of this embodiment shown in FIG. 7 from the above embodiments is that the central portion (φA1) of the spherical surface of the cylindrical protrusion 6a protruded from the trunnion 6 in the X-X direction of receiving a load is recessed from the surface or otherwise cut out from the trunnion, in order to reduce the contact area formed between the inner roller and the trunnion and make grease flow easily in axial and circumferential direction and also for enhancing an initial lubrication, thereby diminishing the spin moment in the joint.

Figure 8:
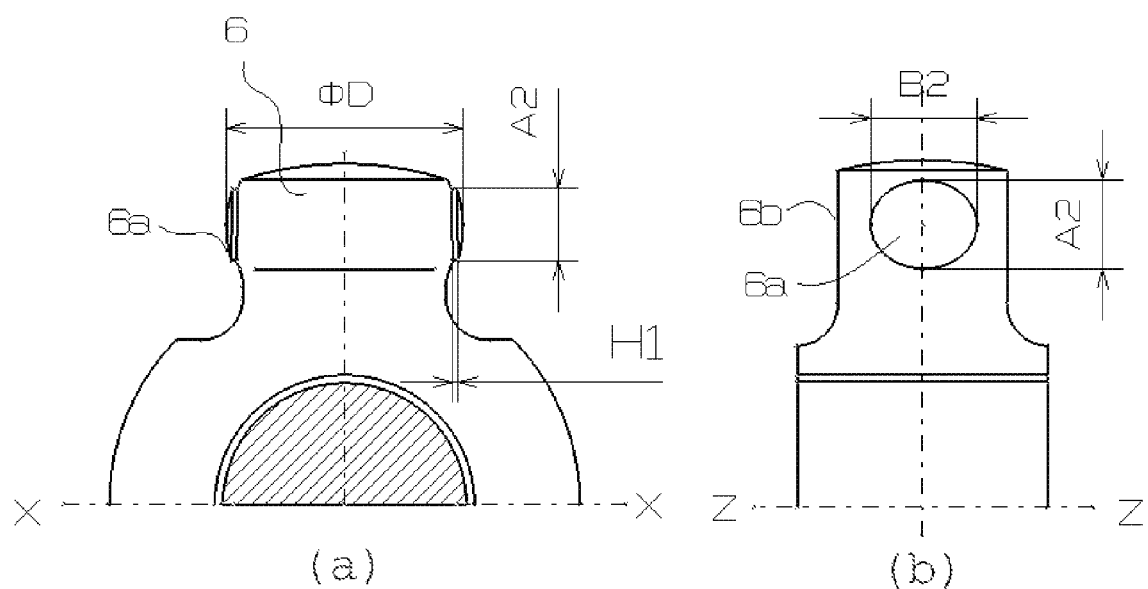

With reference to FIG. 8, the fourth embodiment is described herein. This embodiment is also very similar to the above described embodiment as shown in FIG. 6. The difference of this embodiment from that shown in FIG. 6 is that the trunnion 6 has a cylindrical protrusion 6a in the X-X direction of receiving the load, however, the protrusion 6a having an elliptical shape which defines a longer diameter B2 and shorter diameter A2.

Figure 9C:
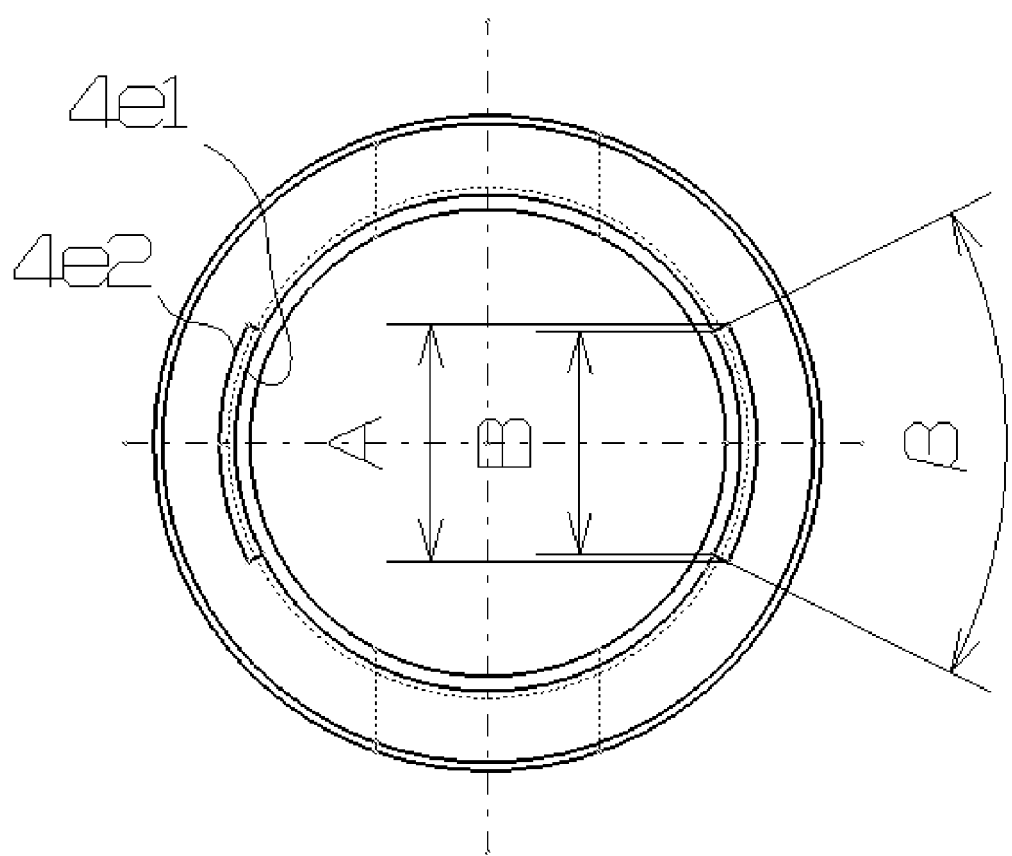

With reference to FIG. 9, the fifth embodiment is described herein. FIG. 9 shows that the inner roller 4 has a generally spherical inner face and has a tapered outer cylindrical face with a taper angle θ, and has two grooves 4b formed on the bottom portion and disposed in the X-X direction, in which the width "B" of each groove at the opening 4e1 is smaller than the width "A" at the bottom 4e2 of the groove. Moreover, the inner roller 4 has two recessed grooves 4c on the top portion and in the Z-Z direction, in order to allow the distance φH between the grooves 4b to expand elastically by making the inner roller bent around the two recessed grooves 4c either by a force applied to the rims 4d of the inner roller on the top portion or by forcing to open the inner opening φH of the inner roller 4. This facilitates assembly of the trunnion into the inner roller as described above.

Figure 10:
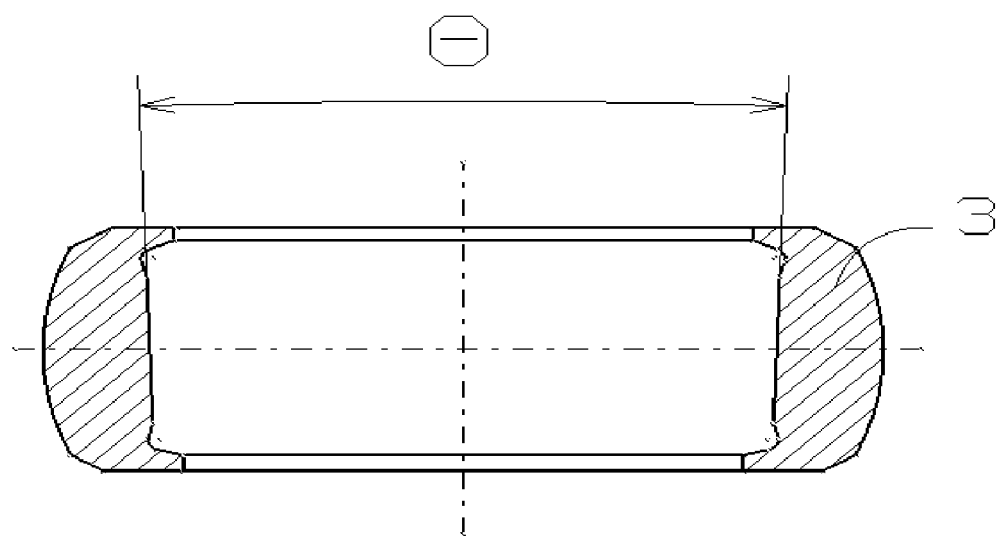
FIG. 10 is a cross-sectional view of the outer roller showing the sixth embodiment of the present invention.

With reference to FIGS. 10 and 11, the sixth embodiment is described herein. FIGS. 10 and 11 illustrate that the outer roller has a generally spherical outer face and has a tapered inner cylindrical face having the same taper angle θ as that formed on the outer surface of the inner roller shown in FIGS. 5 and 9, in order to force the roller assembly 12 to press toward the bottom portion 2d of the groove guides of the housing which faces a boss 11 of the trunnion. As illustrated in FIG. 11, an axial component Fv of a load F is applying in the direction of the axis of the trunnion and toward boss 11 (shown in FIG. 5) of the trunnion, under a torque T acting on the joint 1, where F is T/(3*PCR), and PCR stands for pitch circle radius of the joint, Fv is an axial component of F, and F' is a resultant force of F and Fv. Thus, it is possible to help the roller assembly 12, which is composed of the outer roller 3, the inner roller 4 and the needle rollers 5, to rotate smoothly without any fluctuation during rotation.

Further embodiments and methods of assembly of the joint of the invention are described herein with reference to FIGS. 12-19.

Figure 12A:
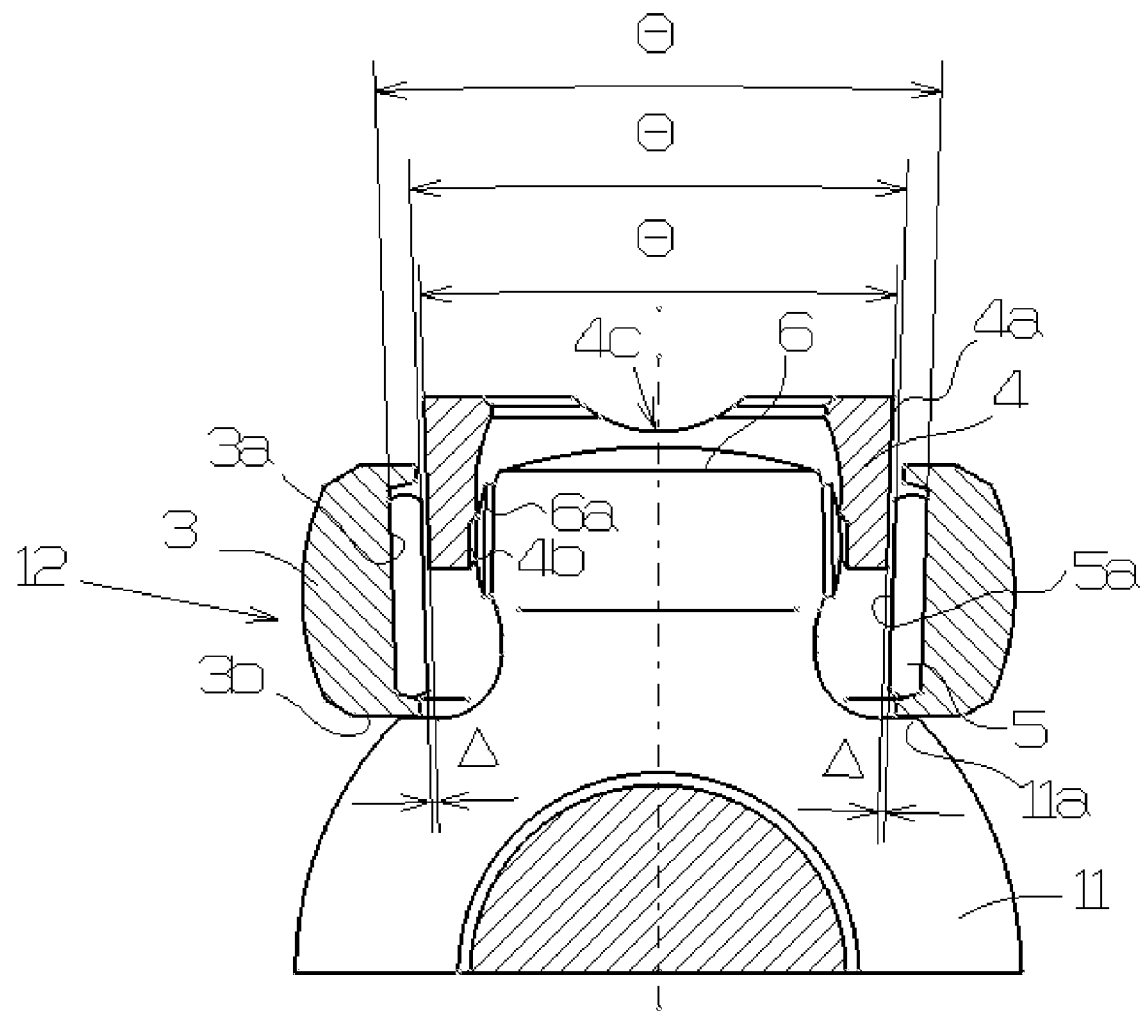
Figure 12B:
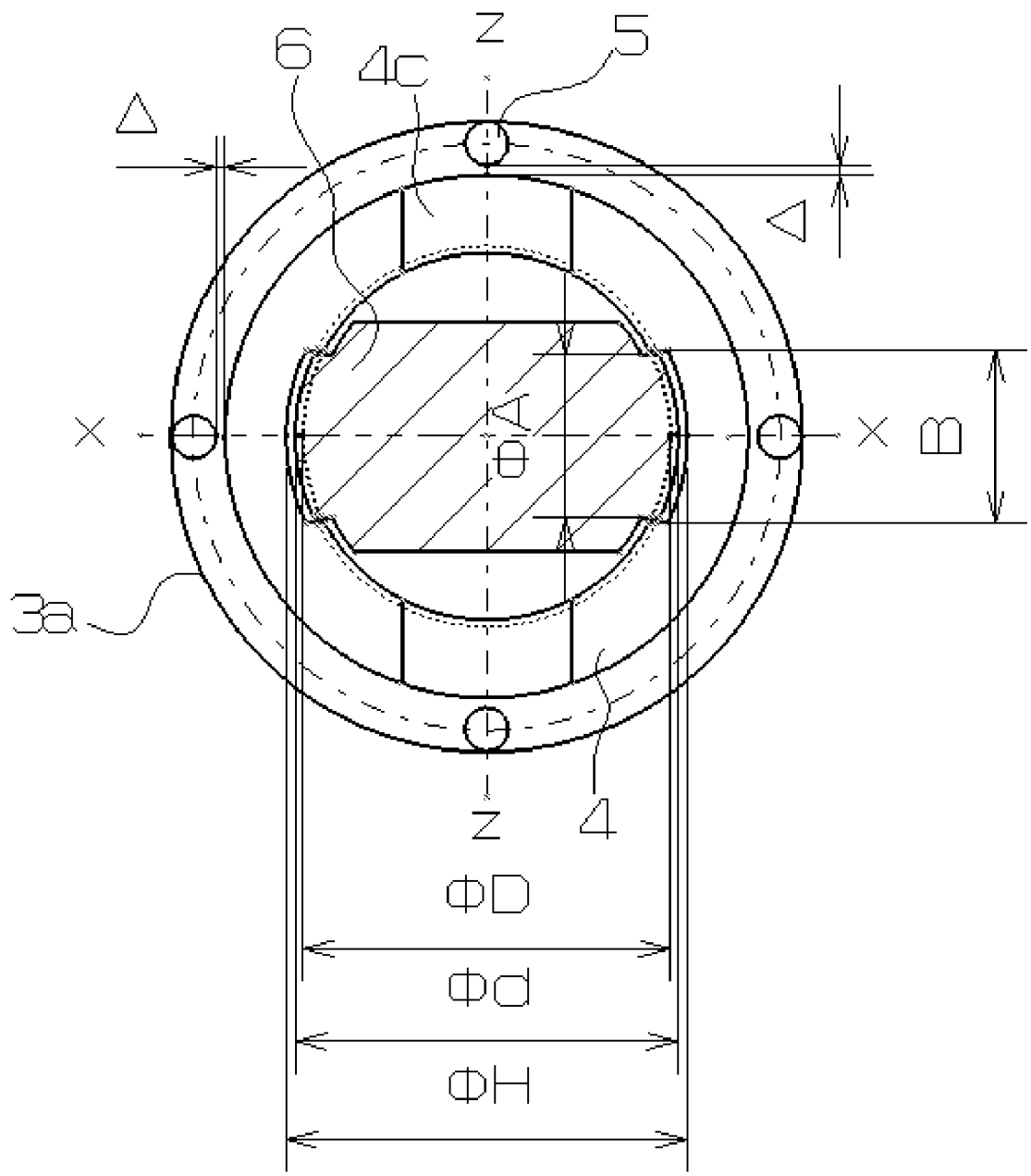
Figure 13A:
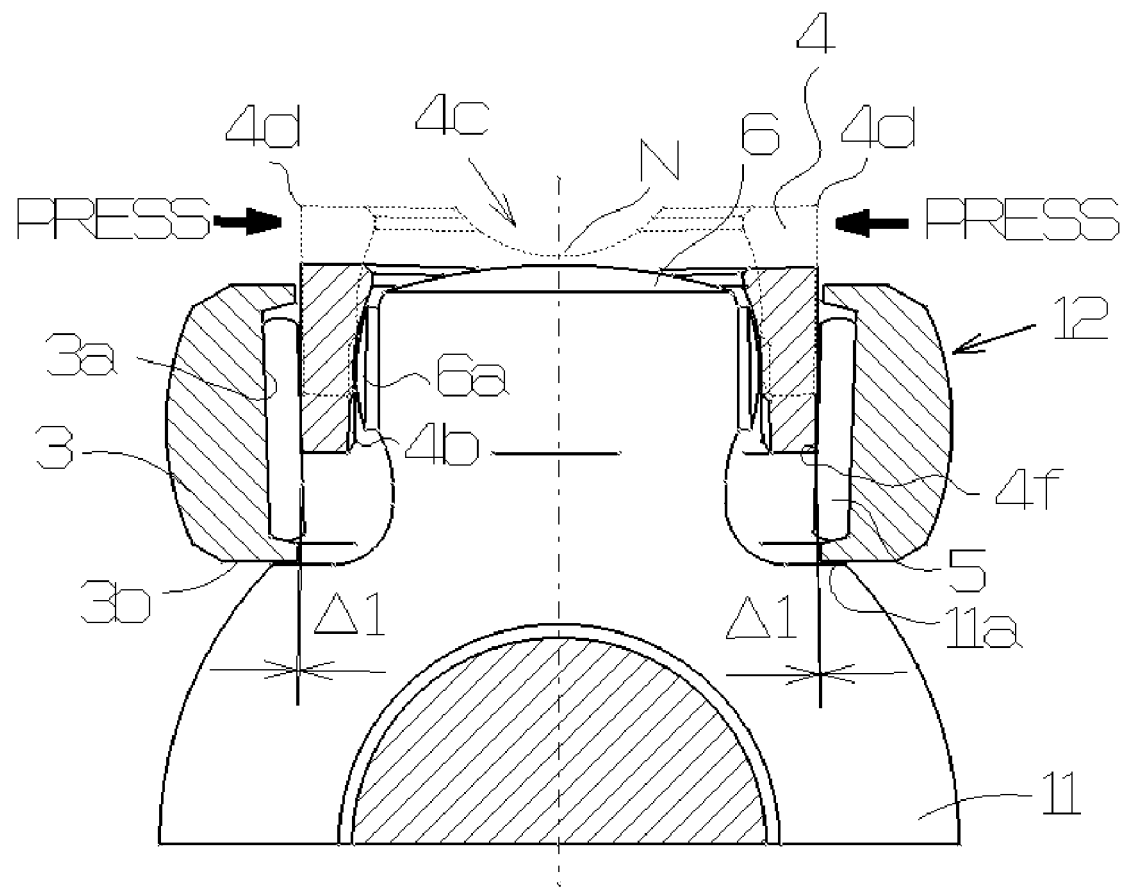
Figure 13B:
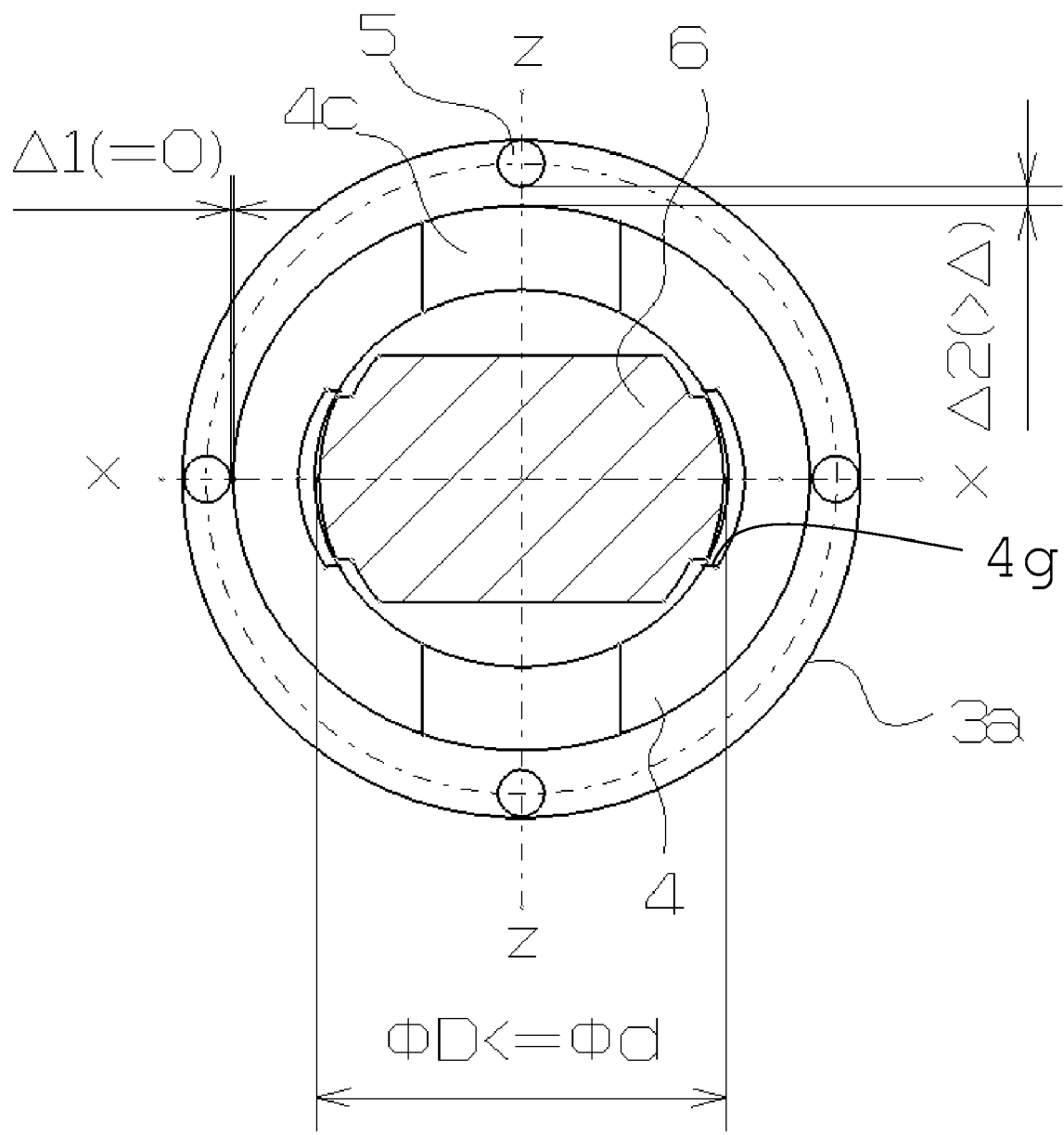

With reference to FIGS. 12 and 13, the seventh embodiment is described herein. FIG. 12 is an explanatory view showing an arrangement made between the roller assembly 12 and the trunnion 6 before fitting the roller assembly 12 into the trunnion 6. The outer roller 3 is mounted on the shoulder 11a of a boss 11 of the tripod, in such a manner that a tapered cylindrical surface 3a on the inner face of the outer roller 3 is converged in the radial direction toward boss 11 of the tripod, with the needle rollers 5 assembled into the tapered cylindrical surface 3a of the inner face of the outer roller 3. The inner roller 4 is placed to the joint in a manner that cylindrical protrusions 6a (which are disposed in the X-X direction of receiving the load and protruded along the axis normal to the axis of the trunnion 6) are fitted in the two opposing grooves 4b on the bottom portion of the inner roller 4 in the X-X direction of receiving the load, as shown in FIG. 12, and that a tapered cylindrical surface 4a formed on the outer face of the inner roller 4 are converged in the radial direction toward the boss 11, in order to secure some radial clearance (Δ) between the tapered outer cylindrical face 4a of the inner roller 4 and the tapered inner cylindrical face 3a of the outer roller 3 and the needle rollers 5. This configuration facilitates the assembly of the roller assembly 12 with the trunnion 6. The diameter φA (FIG. 12(b)) of a cylindrical protrusion 6a with a spherical surface at its end is smaller than the width B of the grooves formed in the X-X direction of receiving the load, and the diameter φd of the protruded spherical surfaces of the cylindrical protrusion 6a disposed in the X-X direction of the trunnion is larger than the diameter φD of the inner roller, in order to not only have the trunnion 6 assembled into the inner roller 4 through the grooves 4b, but also to prevent the trunnion 6 from pulling itself out from the inner roller 4 once they all are assembled, by a difference in dimensions between the diameter φd of the protruded spherical surfaces of the cylindrical protrusion and the diameter φD of the inner roller. Two grooves 4c are recessed on its top portion of the inner face 4, and formed in the Z-Z direction of not receiving the load.

FIG. 13 illustrates a method of assembling the roller assembly 12 with the trunnion 6, to be performed after the previous steps discussed above in connection with FIG. 12. If a force is applied at the opposing upper edges 4d of the inner roller 4 in the X-X direction of receiving the load, two edges 4d get bent around the center N of the grooves 4c formed on the top end and the trunnion 6 gets fitted into the roller assembly 12 by making two bottom edges 4f of the inner roller expanded in the X-X direction until φD becomes equal to φd, within the radial clearance (Δ) provided among the tapered cylindrical outer face 4a of the inner roller 4 and the tapered cylindrical inner face 3a of the outer roller 3 and the needle rollers 5, as secured by the arrangement shown in FIG. 12.

Figure 14A:
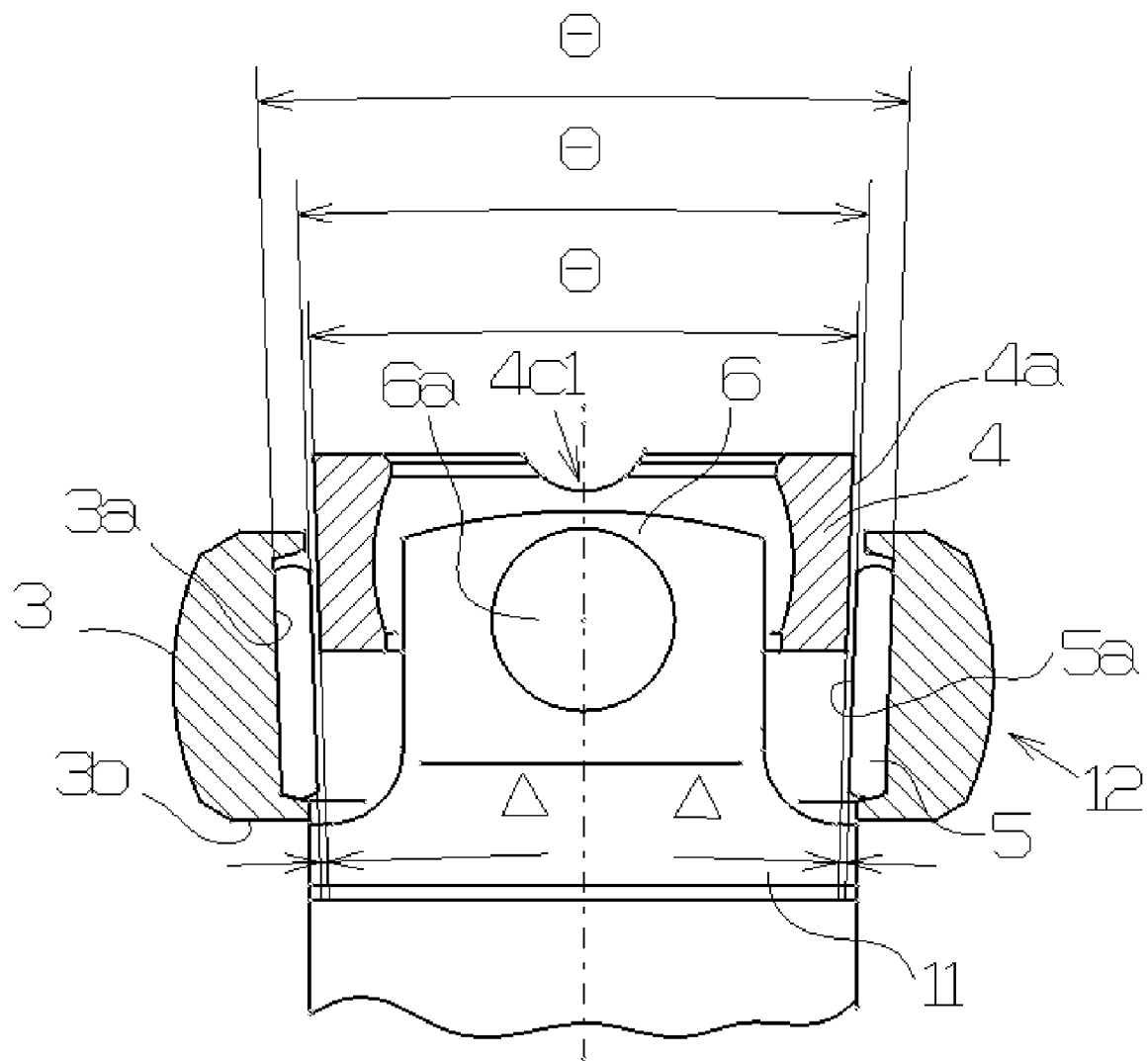
Figure 14B:
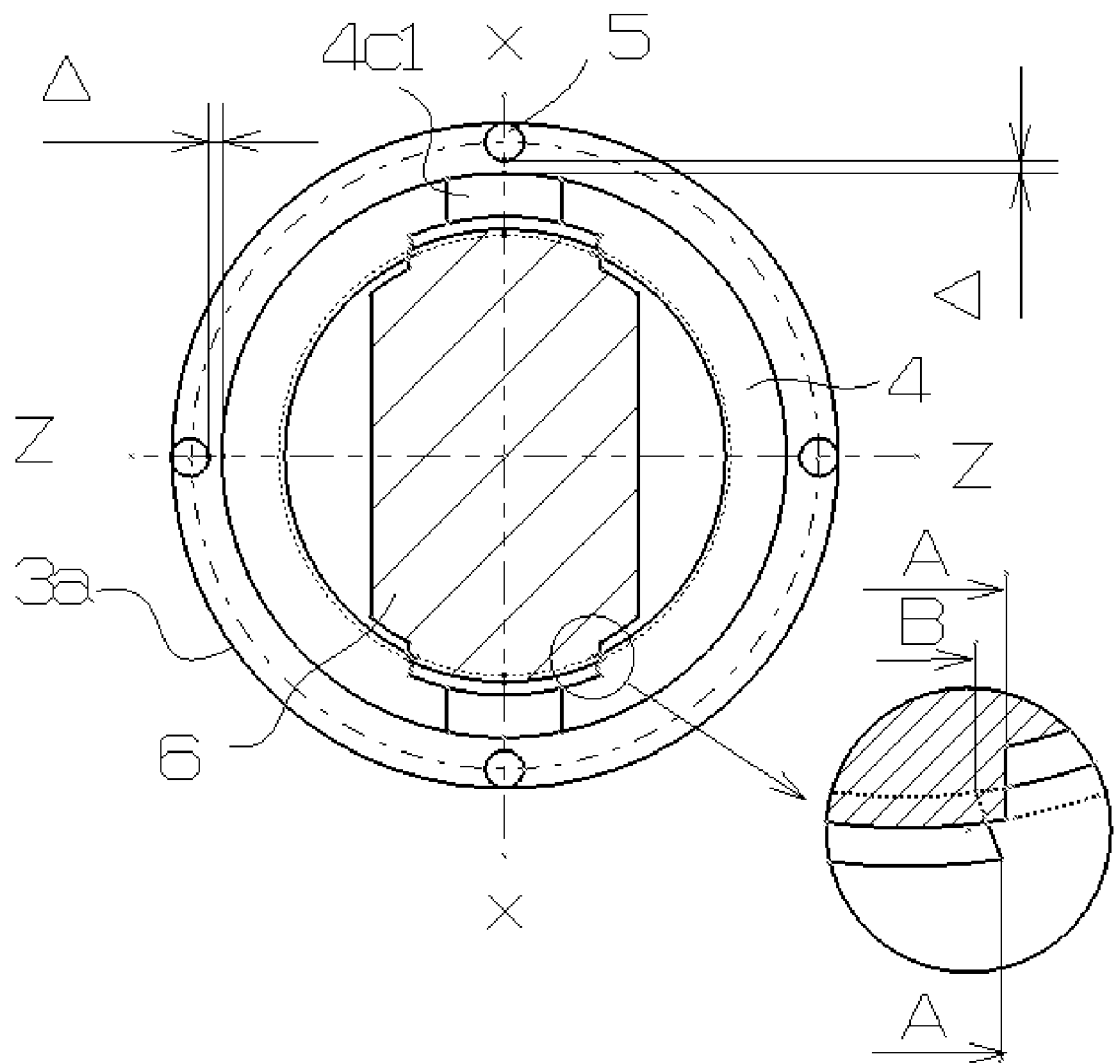
Figure 15A:
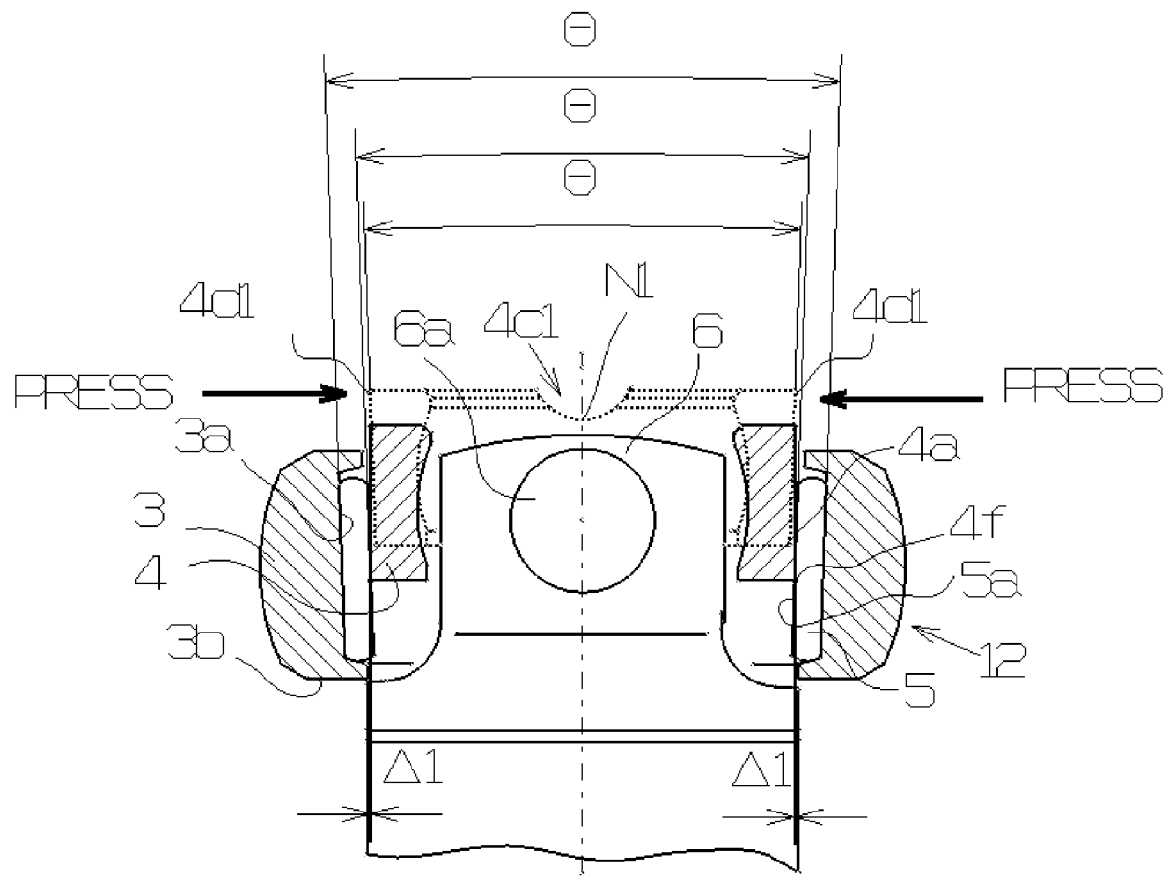
Figure 15B:
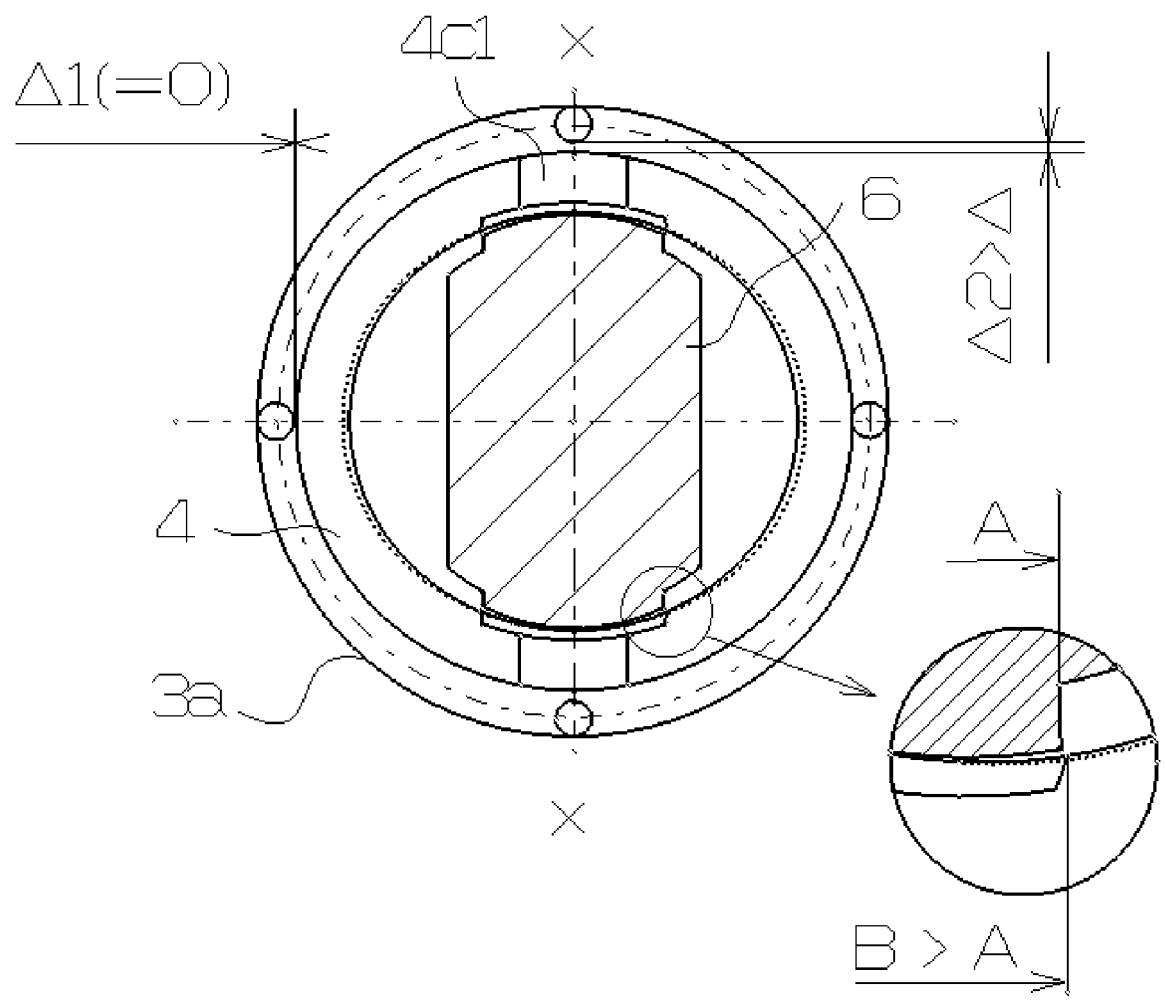

With reference to FIG. 14 and FIG. 15, the eighth embodiment is described, in which FIG. 14 shows an explanatory view showing an arrangement made between the roller assembly 12 and the trunnion 6 before fitting the roller assembly 12 into the trunnion 6. FIG. 15 shows an explanatory view showing how to get the roller assembly 12 into the trunnion 6, based on an arrangement shown in FIG. 14. This embodiment is similar to the seventh embodiment shown in FIG. 12 and FIG. 13. The difference of this embodiment from those shown in FIG. 14 and FIG. 15 is that the diameter φA of the cylindrical protrusion 6a positioned in the X-X direction receiving the load, is larger than the width B at the opening of the grooves and the diameter φd of the protruded spherical surfaces of the cylindrical protrusion 6a positioned in the X-X direction is the same as the diameter φD of the inner roller 4, in order to not only have the trunnion 6 assembled into the inner roller 4 through the grooves 4b, but also to prevent the trunnion 6 from pulling itself out from the inner roller 4 once they all are assembled by a difference in dimensions between the diameter φA of the cylindrical protrusion 6a and the width B at the opening of the grooves. Two grooves 4c1 formed in the X-X direction are recessed on its top end of the inner face 4. If a force is applied at the opposing upper edges 4d1 of the inner roller in the Z-Z direction, two edges 4d1 get bent around the center N1 of the grooves 4c1 formed on the top end and the trunnion 6 fits into the roller assembly 12 by making two edges 4f of the bottom side of the inner roller extended in the X-X direction of receiving the load, until B becomes equal to or larger than φA, within the radial clearance (Δ) provided between the tapered cylindrical outer face 4a of the inner roller 4 and the tapered cylindrical inner face 3a of the outer roller 3 and the needle rollers 5, as secured by the arrangement shown in FIG. 14.

Figure 16A:
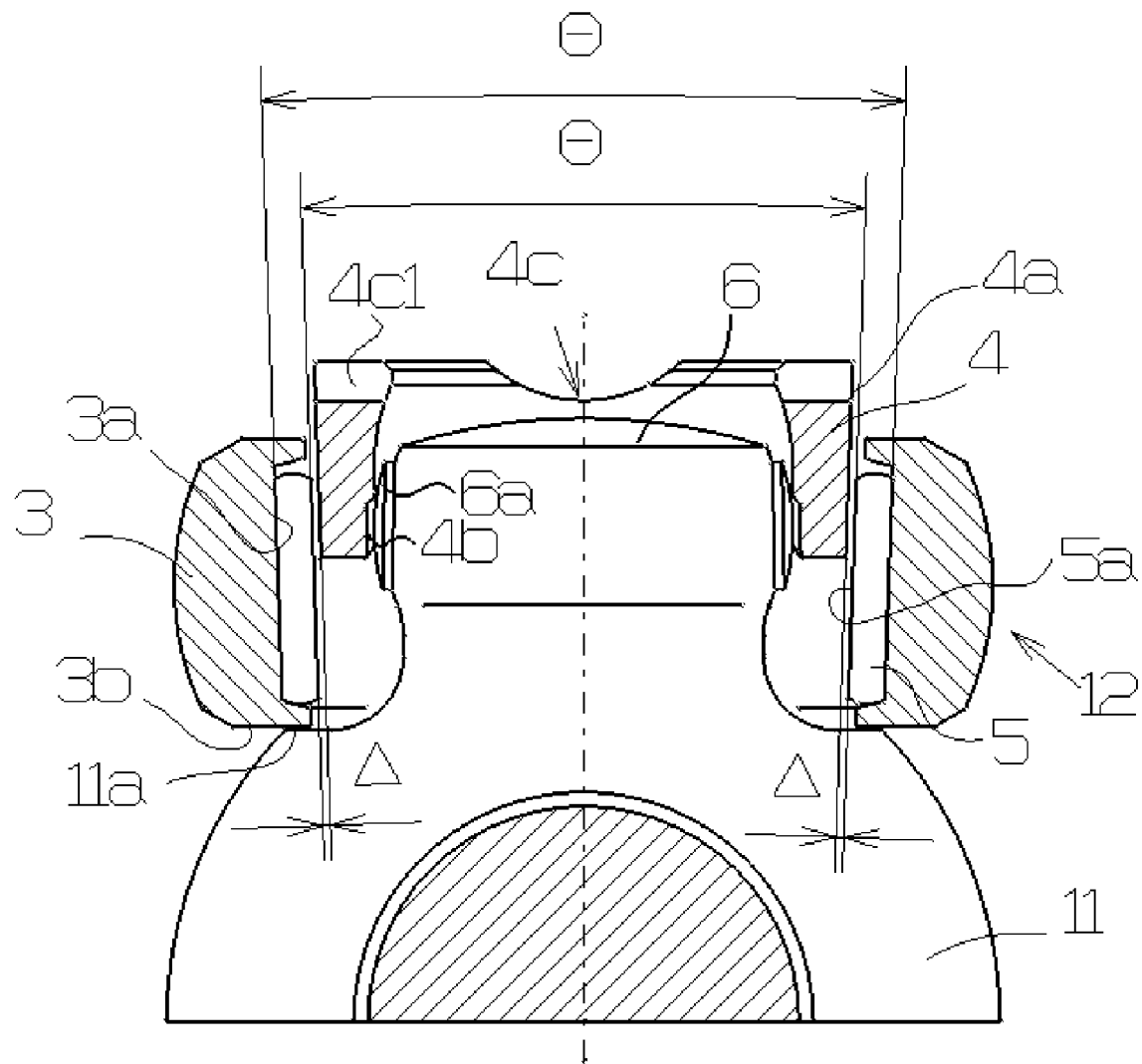
Figure 16B:
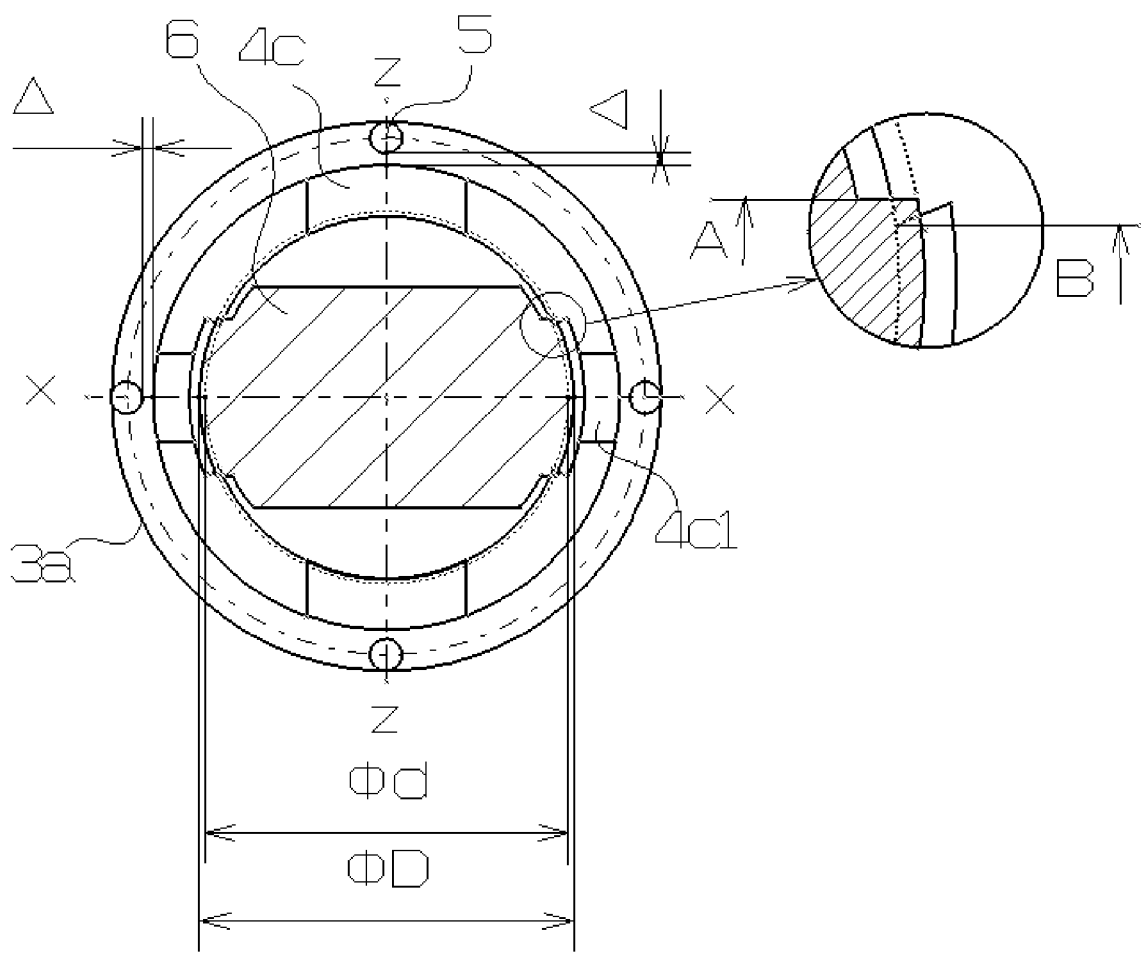
Figure 17A:
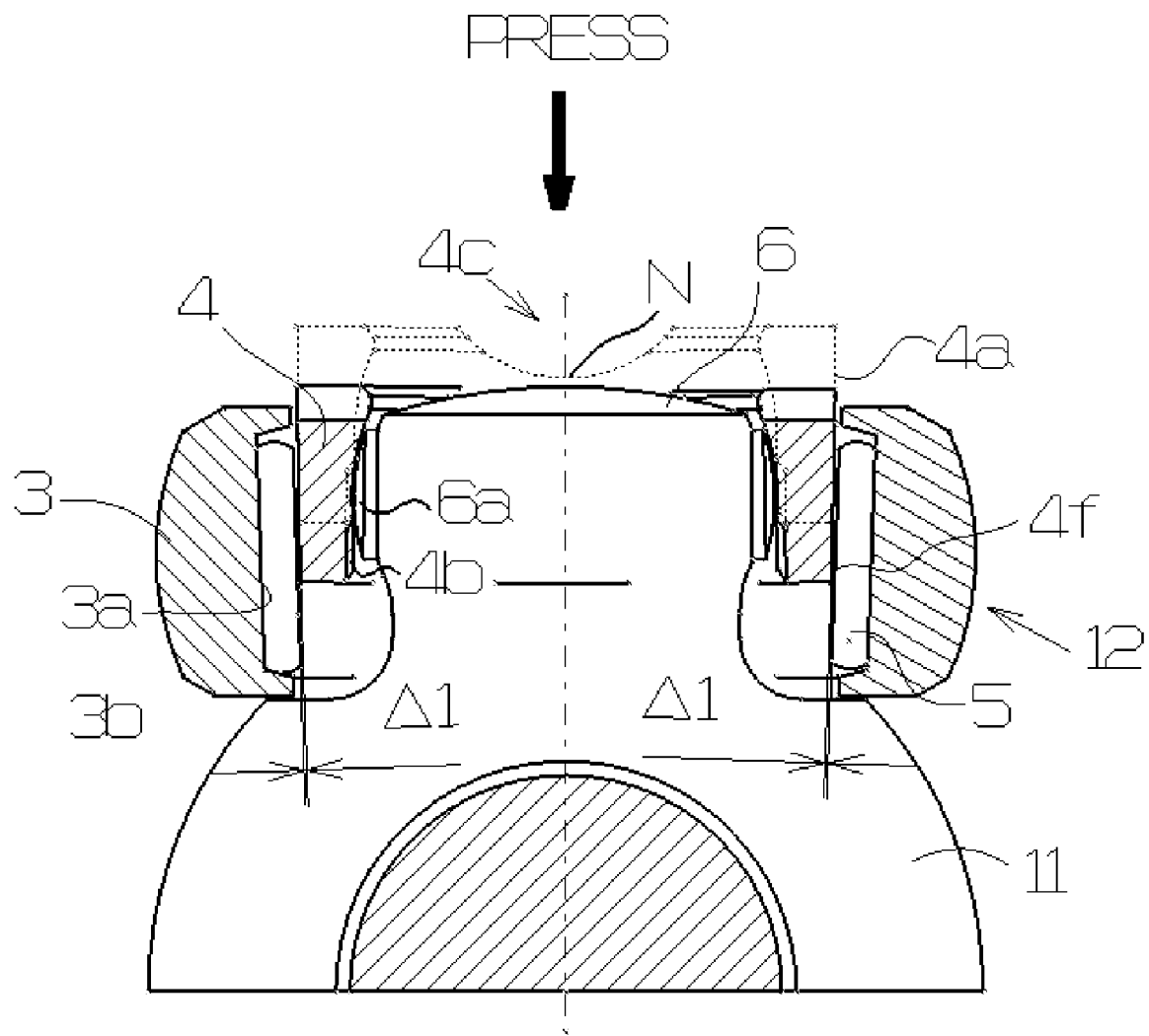
Figure 17B:
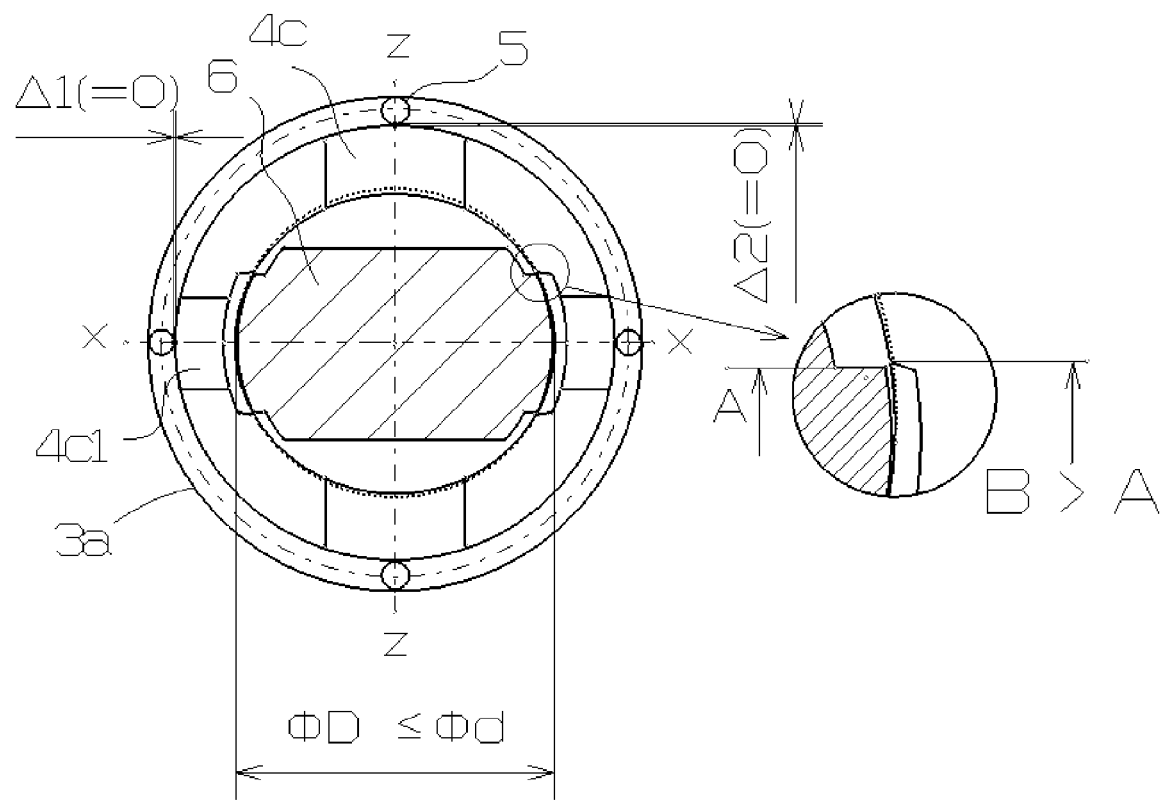

With reference to FIG. 16 and FIG. 17, the ninth embodiment is described, in which FIG. 16 shows an explanatory view showing an arrangement made between the roller assembly 12 and the trunnion 6 before fitting the roller assembly 12 into the trunnion 6, and FIG. 17 shows an explanatory view showing how to get the roller assembly 12 into the trunnion 6, based on an arrangement shown in FIG. 16. This embodiment is a mixture of the seventh embodiment and the eighth embodiment. The difference of the present embodiment from those shown in FIG. 16 and FIG. 17 is that the roller assembly 12 is assembled from the top into the trunnion 6 by a force applied in the axial direction of the trunnion 6. If a force is applied on the top end of the inner roller in the direction stated above, both edges 4d1 and edges 4d get bent both around the center N1 of the grooves 4c1 and around the center N of the grooves 4c formed on the top end of the inner roller, respectively, and then the trunnion 6 gets fitted into the roller assembly 12 by making two bottom edges 4f of the inner roller 4 to be expanded in the X-X direction of receiving a load, until B becomes equal to or larger than φA, and at the same time until φD becomes equal to φd, within the radial clearance Δ provided between the tapered cylindrical outer face 4a of the inner roller 4 and the tapered cylindrical inner face 3a of the outer roller 3 and the needle rollers 5, as secured by the arrangement shown in FIG. 16.

Figure 1:
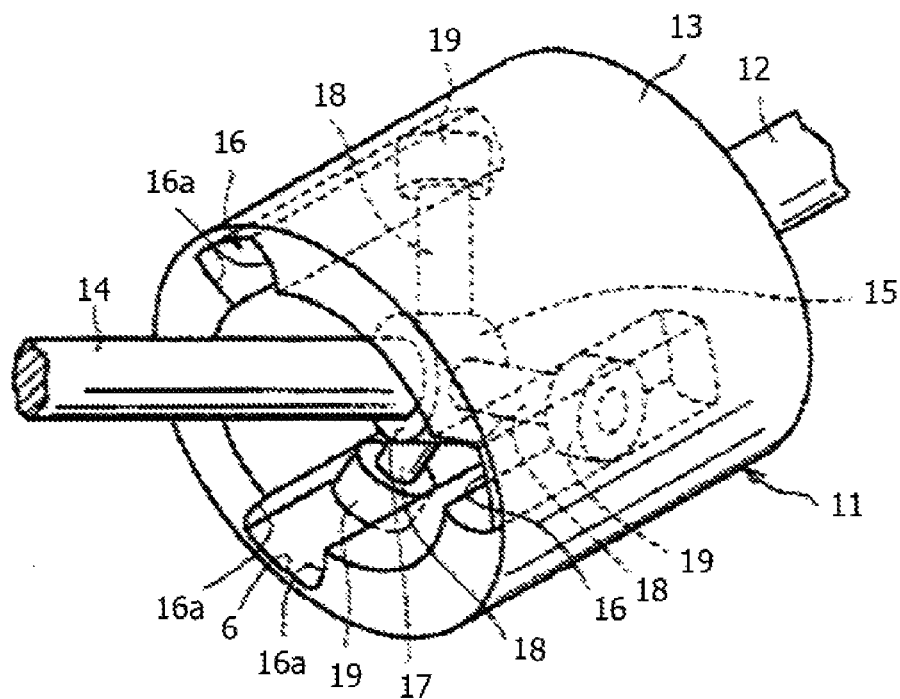
FIG. 1 shows a perspective view of a conventional tripod type constant velocity joint.
Figure 2:
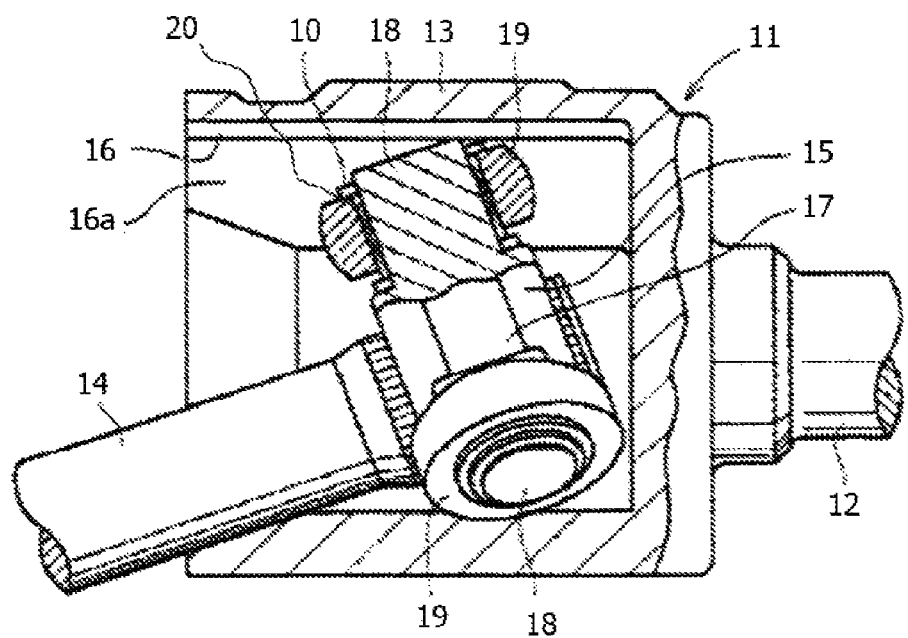
FIG. 2 shows a side cross-sectional view of a conventional tripod type constant velocity joint.
Figure 18:
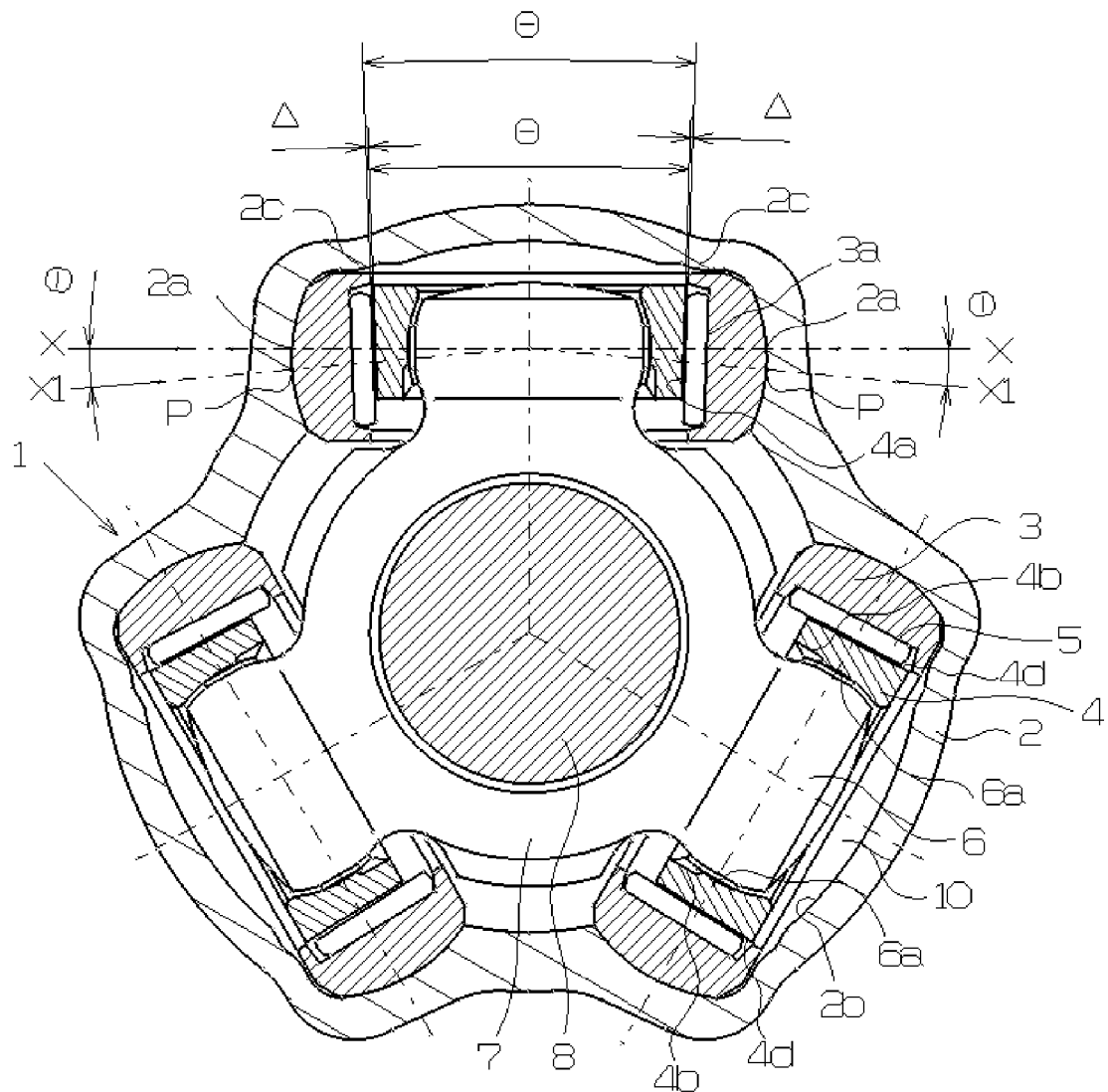
FIG. 18 is a cross-sectional view showing the tenth embodiment of the present invention.

With reference to FIG. 18, the tenth embodiment is described herein. This embodiment is also similar to the first embodiment shown in FIG. 1. The difference of the present embodiment from that shown in FIG. 1 is that a convex spherical surface is formed on the outer face of the outer roller 3, having the center line X1-X1 normal to the same angle θ provided to both the tapered inner cylindrical surface 3a of the outer roller and the tapered outer cylindrical surface 4a of the inner roller.

Figure 19A:
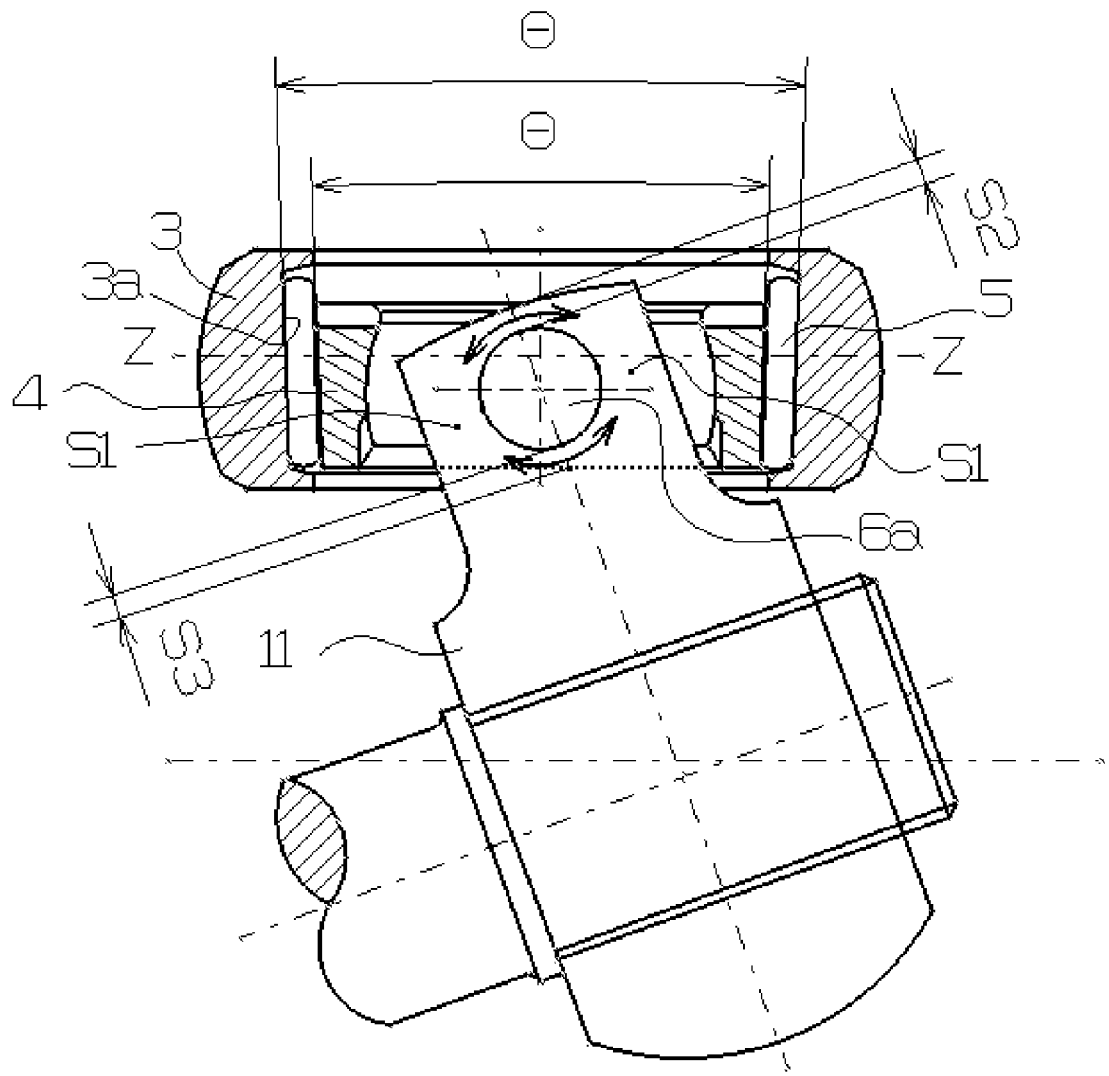
FIG. 19(a) is a longitudinal cross-sectional view at a joint angle and FIG. 19(b) is a side cross-sectional view.
Figure 19B:
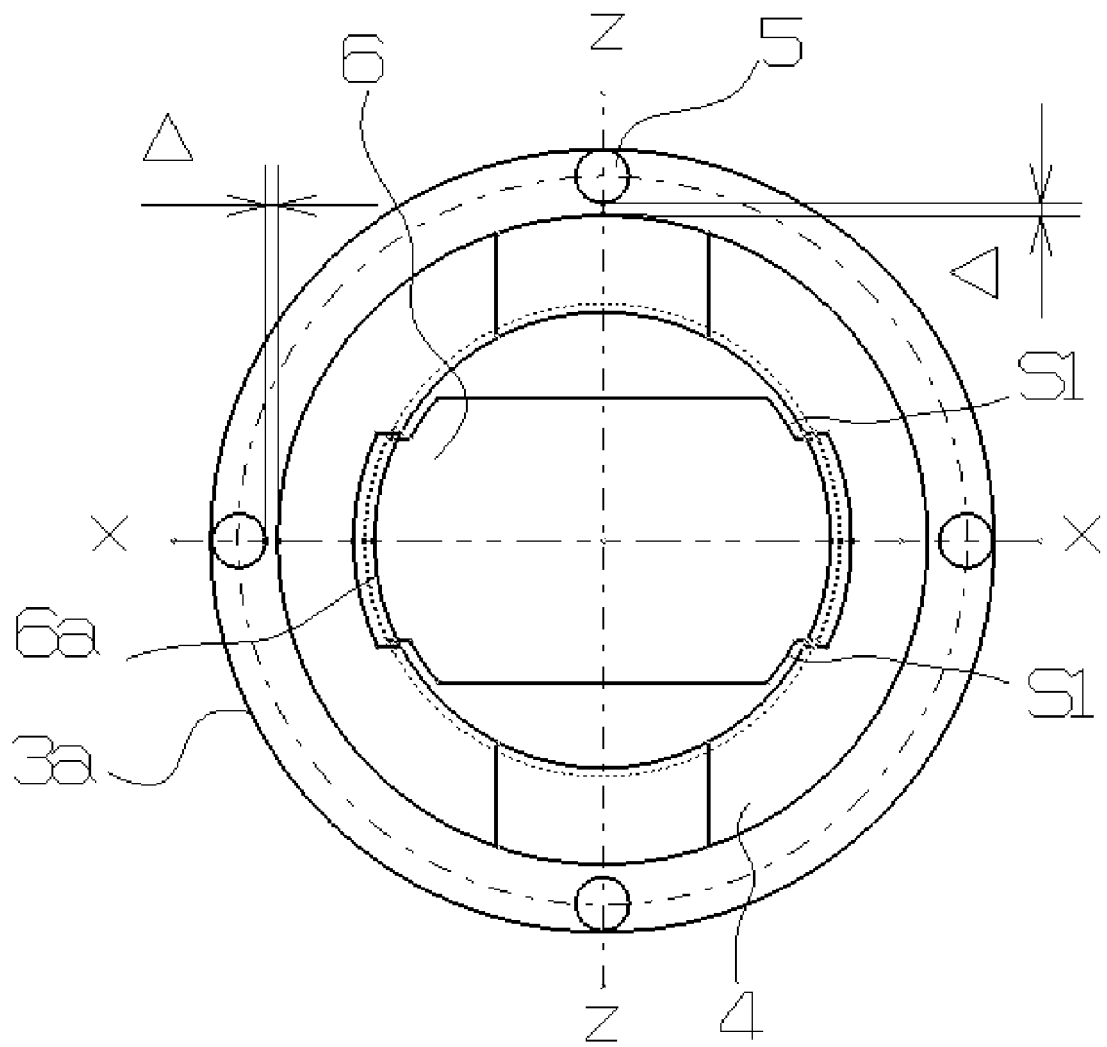
Figure 19C:
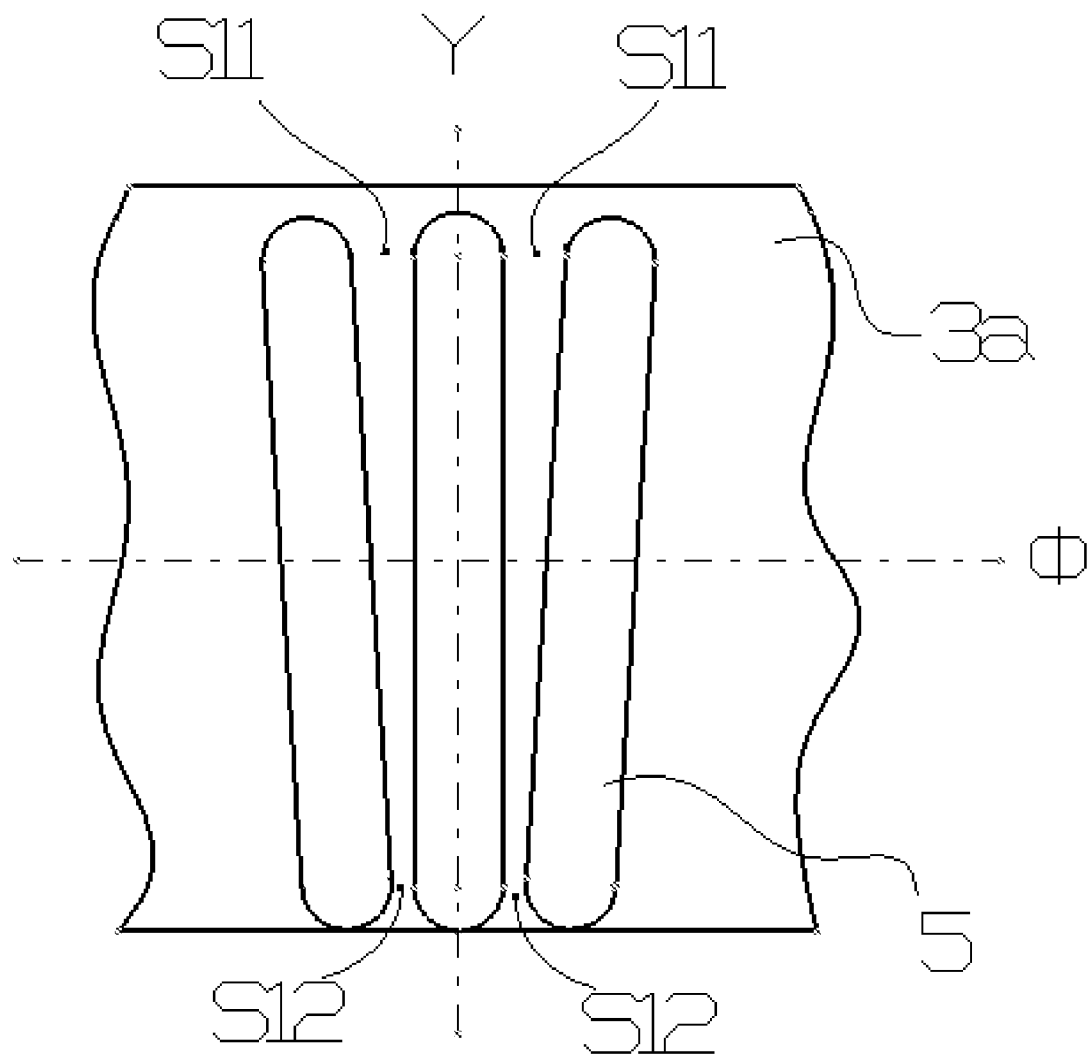
FIG. 19(c) is an explanatory view showing the inner face of the outer roller and needle rollers.

With reference to FIG. 19, the eleventh embodiment is described, in which FIG. 19(a) is a longitudinal cross-sectional view at a joint angle, FIG. 19(b) is a side cross-sectional view, and FIG. 19(c) is an explanatory view showing the inner face of the outer roller and needle rollers. Greater spaces or gaps S1 and S2 are provided between the inner face of the inner roller 4 and the trunnion in a circumferential direction as well as in the axial direction, by adopting a cylindrical protrusion 6a positioned in the direction of receiving a load, having a spherical end surface and protruded along an axis normal to the axis of the trunnion. Thus, this enables grease to flow smoothly into and out of the space provided in the circumferential and axial direction which is secured by a height of a cylindrical protrusion projected from the trunnion and by its shape as described above. More clearance S11 and Δ are provided in between the needle roller 5 and the inner face 3a of the outer roller 3 and the outer face 4a of the inner roller 4, in the radial and the circumferential direction, by providing a tapered cylindrical face θ to both the inner face of the outer roller and the outer face of the inner roller, which clearance S11 in a top portion between the needle rollers and the inner roller and the outer roller is bigger than that S12 in a bottom portion facing a boss of the tripod, both in the radial direction and in the circumferential direction. Thus more clearance in the top portion makes grease more easily flow in and help provide more initial lubrication to the roller assembly.

With reference now to FIGS. 20-25, further exemplary embodiments of the tripod type constant velocity joints of the invention and methods of assembling the joints are described herein.

Figure 20:
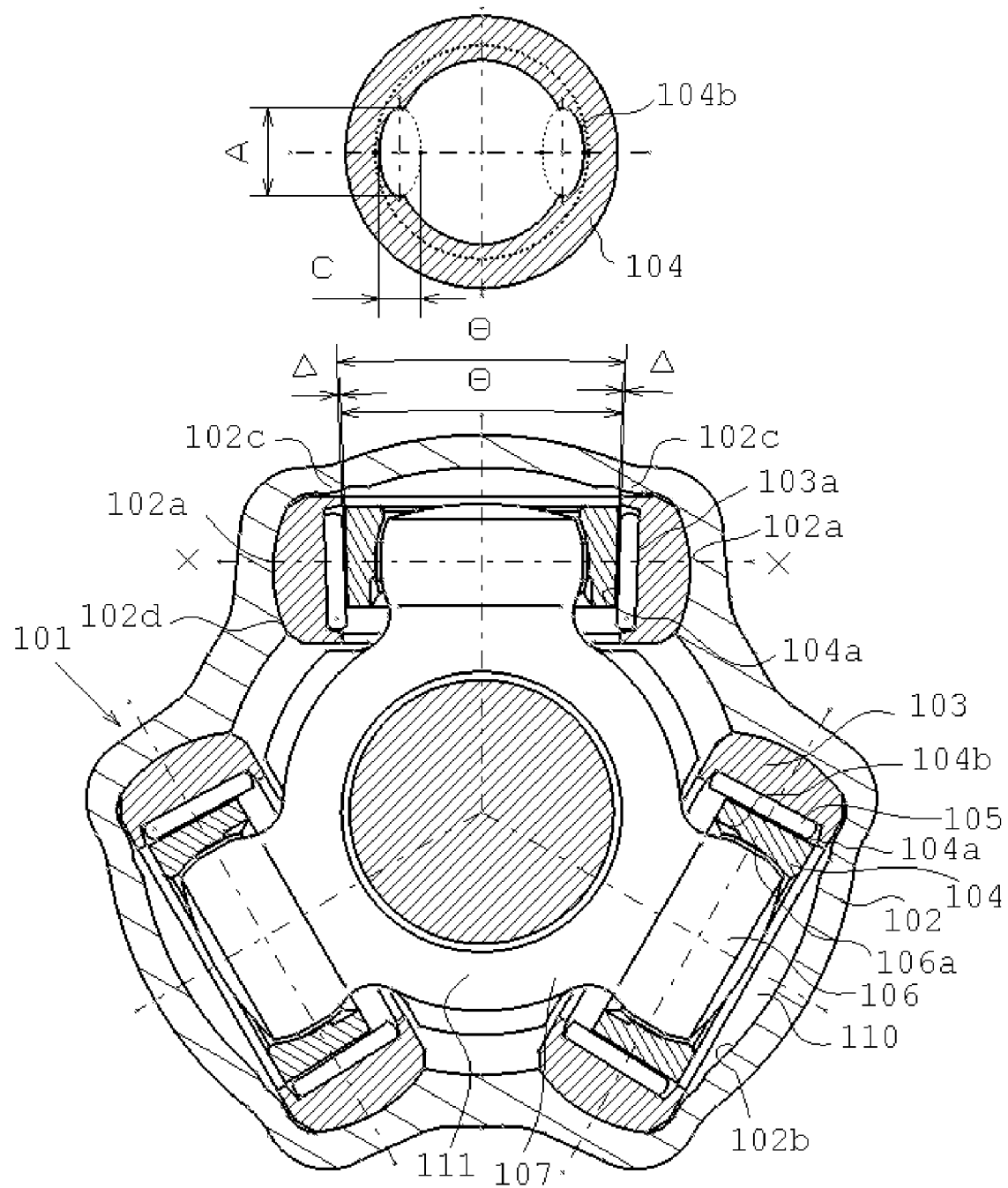
FIG. 20 a cross-sectional view illustrating the twelfth embodiment of the present invention.

Referring to FIG. 20, the twelfth embodiment of the present invention is described herein. Similar to the tripod type constant velocity joints shown in FIGS. 5-19, a tripod joint 101 shown in FIG. 20 includes a hollow cylindrical housing 102 having three grooves 110 formed on the inner surface of the housing 102 and axially extending and equally spaced about the longitudinal axis of the housing. The joint 101 includes a tripod 111 which has three trunnions 106 with two cylindrical protrusions 106a formed at two diametrically opposing and load receiving locations of each trunnion 106 and extending generally perpendicular to the axis of the trunnion 106. Each roller assembly operatively assembled to the respective trunnion 106 has an outer roller 103, an inner roller 104, and needle rollers 105 provided between the outer and inner rollers. The outer roller 103 has a generally spherical outer surface matching the guide grooves 102a of the housing 102, and includes a tapered inner face 103a with taper angle θ defined by the face that mates with needle rollers 105. The inner roller 104 has a generally spherical inner face which mates or corresponds to the spherical outer surface of the cylindrical protrusions 106a, and a tapered or conical outer face 104a with the same taper angle θ as that formed on the inner surface 103a of the outer roller 103 with respect to the axis of the trunnion 106.

According to the present embodiment of the invention as illustrated, a pair of elliptical grooves 104b (i.e., a pair of grooves of semi-ellipse shape) are formed on the inner wall on the bottom portion of the inner roller 104 at two diametrically opposing areas facing a boss 107, in which the ellipse shape of the grooves has a long diameter A and a short diameter C as shown. As will be described in further details below, the elliptical-shaped grooves 104b have a function to effectively relieve a stress-concentration that would otherwise be occurred during the assembly process on the edges portions of the grooves for receiving the cylindrical protrusions 106a, for instance, on the groove edges 4g (see FIG. 13(b)) if the grooves have a uniform depth as in the previous embodiments shown in FIGS. 5-19. Thus, they function to reduce a potential plastic deformation of the inner roller 104 that would otherwise occur during the assembly process of pressing the cylindrical protrusions 106a of the trunnion 106 into the inner roller 104 owing typically to an improper tooling or imprecise dimension control of inner roller 103 and/or trunnion 106. Accordingly, an extra manufacturing cost typically required for the press fitting process in the previous embodiments can be reduced due to the two elliptical grooves 104b which facilitate insertion of the trunnion 106 into the inner face of the inner roller 104 smoothly without applying an excessive pressure, as the assembly process is performed while tilting the inner roller 104 about the trunnion 106 until the elliptical grooves 104b of the inner roller 104 coincide with the outer surface of the cylindrical protrusion 106a. This is possible because the circular outer surface of each cylindrical protrusion 106a becomes an elliptical shape which corresponds to the corresponding elliptical groove 104b when the cylindrical protrusion 106a is projected from the tilted axis of the inner roller 104, which is described below in further details.

Figure 21A:
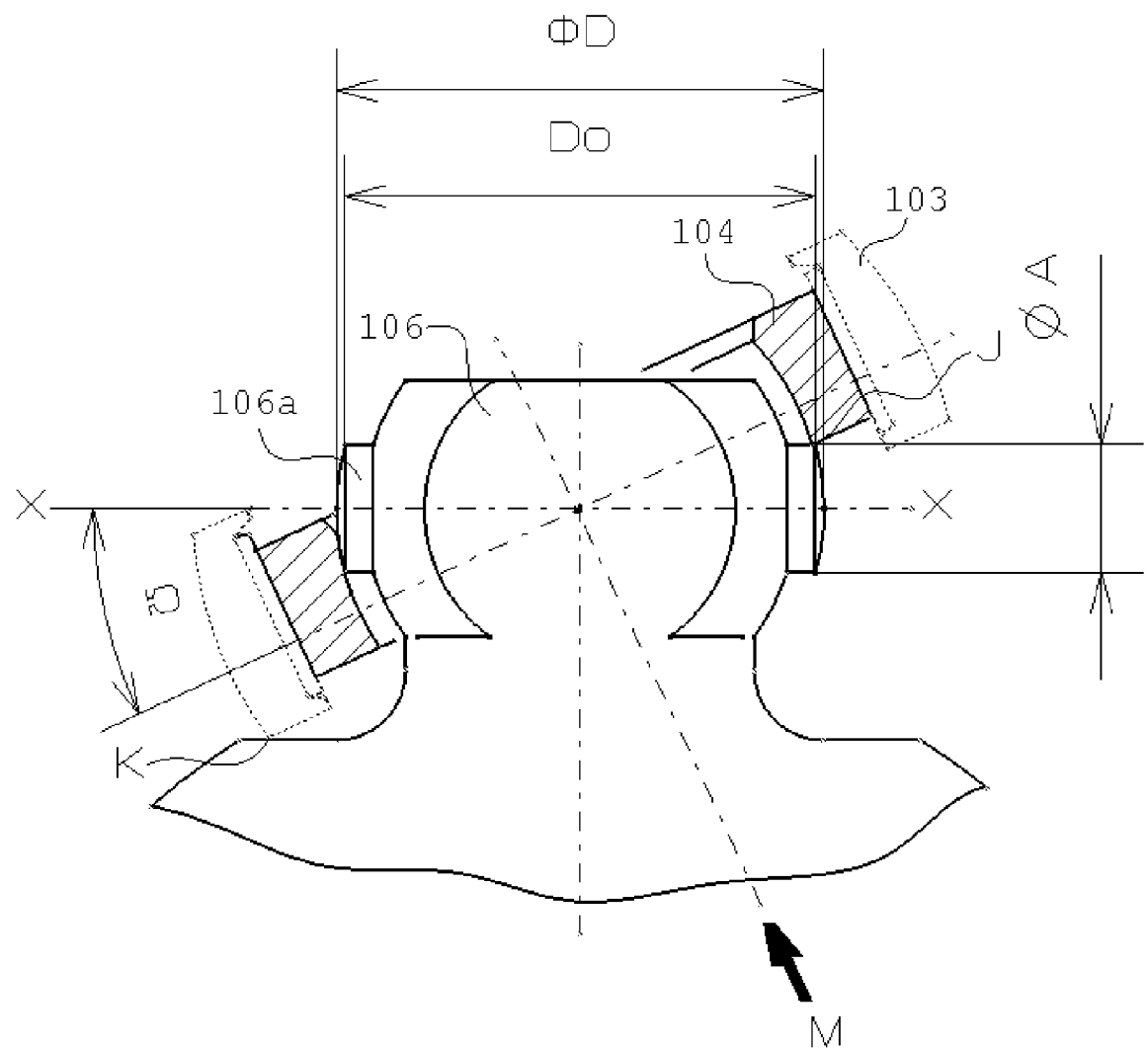
Figure 21B:
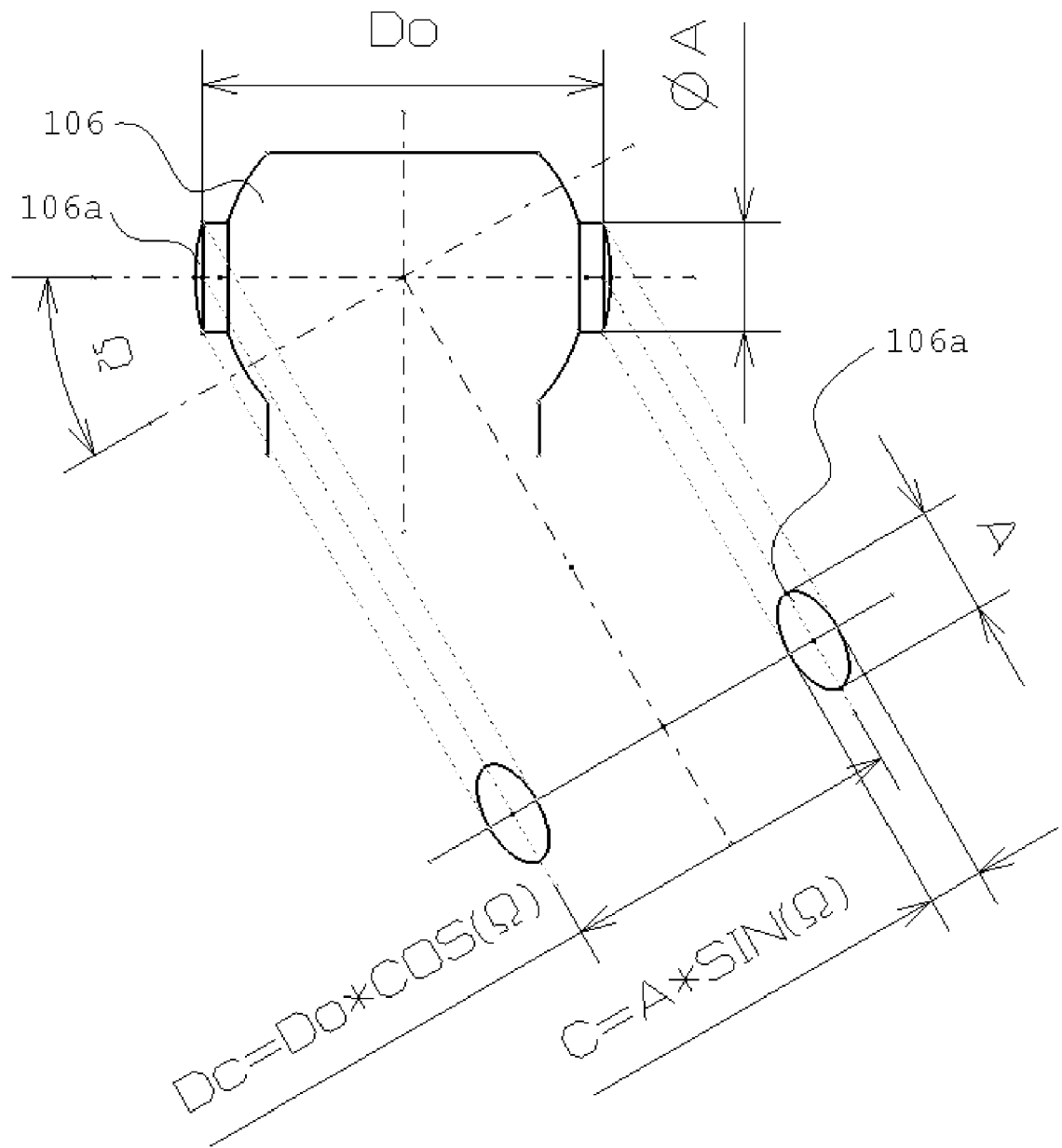
Figure 21C:
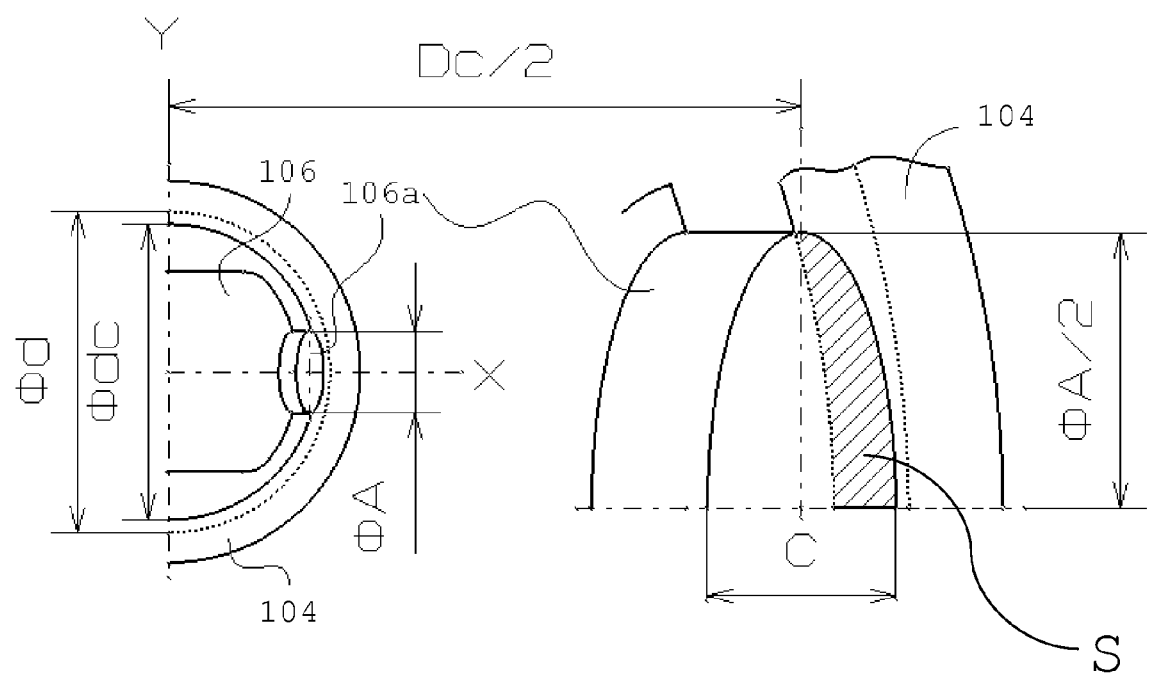
Figure 21D:
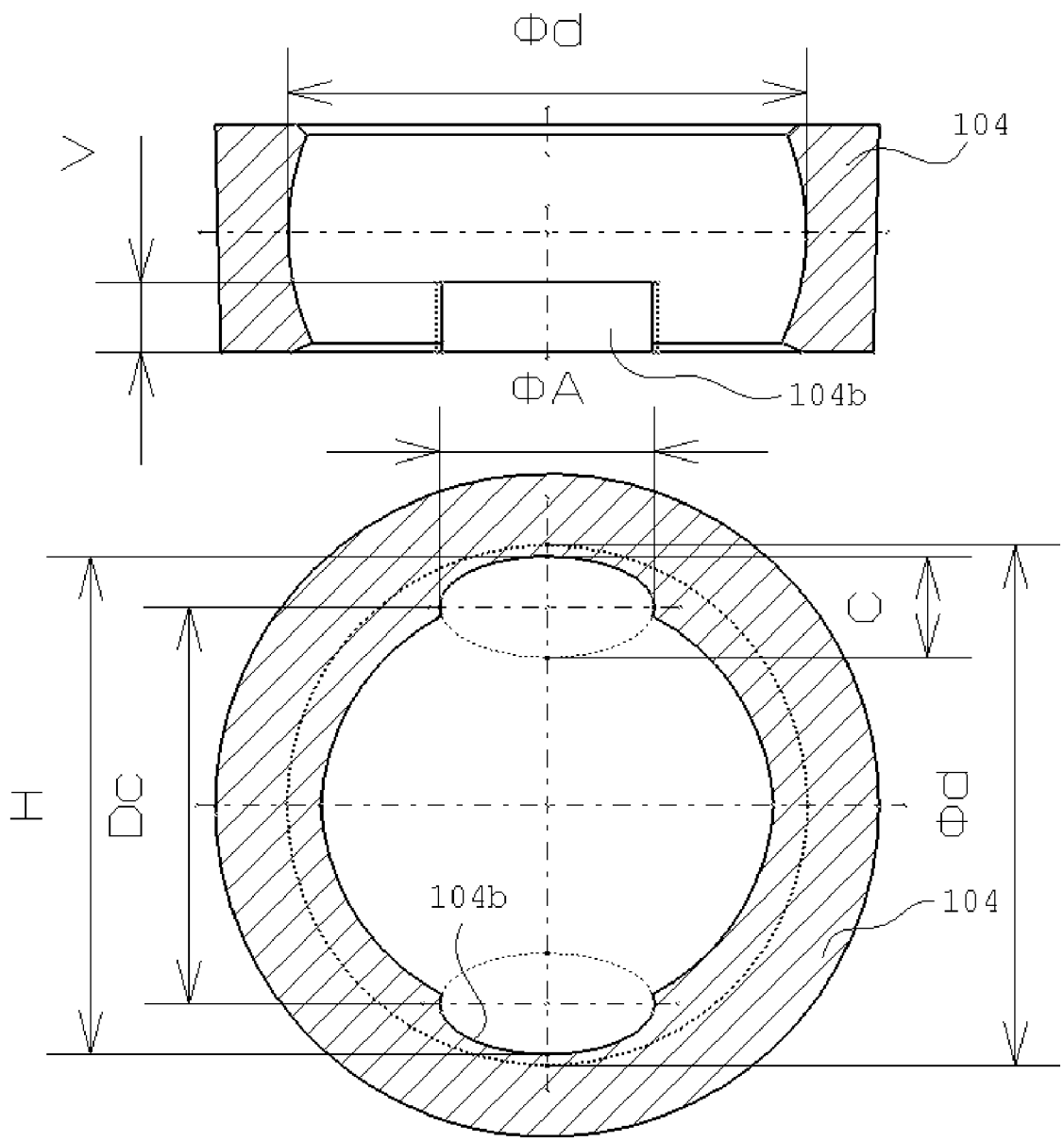

FIG. 21(a) illustrates a state in which the inner roller 104 without grooves on the bottom portion of the roller is first placed on the center line X-X of the trunnion 106, and thereafter, is inclined until the bottom of the outer roller 103 contacts against the shoulder K of the boss, while the bottom edge on the inner face of the inner roller 104 hangs on the top edge portion of cylindrical protrusion 106a. FIGS. 21(b) and 21(c) illustrate that both the inner race 104 and the trunnion 106 are projected from the direction M in FIG. 21(a). In this arrangement, the spherical shape of the outer face of each cylindrical protrusion 106a is viewed into an ellipse which is defined by the following equations:

$$(X \pm Dc/2)^2/(C/2)^2 + Y^2/(A/2)^2 = 1 \quad (1)$$

$$C = A \sin \Omega \quad (2)$$

$$Dc = Do \cos \Omega \quad (3)$$

where Dc represents the distance between the centers of the two elliptical grooves, Do represents the base height between the two opposing cylindrical protrusions, which is the entire height between the two opposing cylindrical protrusions minus the length of two spherical surface portions of the two opposing cylindrical protrusions, A represents a long diameter of the ellipse shape, which equals to the cylinder diameter of the cylindrical protrusions, C represents a short diameter of the ellipse shape, and $\Omega$ represents the inclining degree of the inner roller with respect to the trunnion. The hatched area S is determined by the ellipse shape represented by the equation (1) and an inner diameter $d_c$ on the bottom portion of the inner roller 104, as an amount of interference between the bottom portion of the inner roller 104 and each cylindrical protrusion 106a. In other words, the cylindrical protrusion 106a can be assembled into the inner roller 104 without interference if the hatched area S of elliptical shape is carved out from the bottom portion of the inner roller. FIG. 21(d) shows such elliptical grooves formed on the bottom portion of the inner roller 104 that is identical to the hatched area S shown in FIG. 21(c).

Figure 21E:
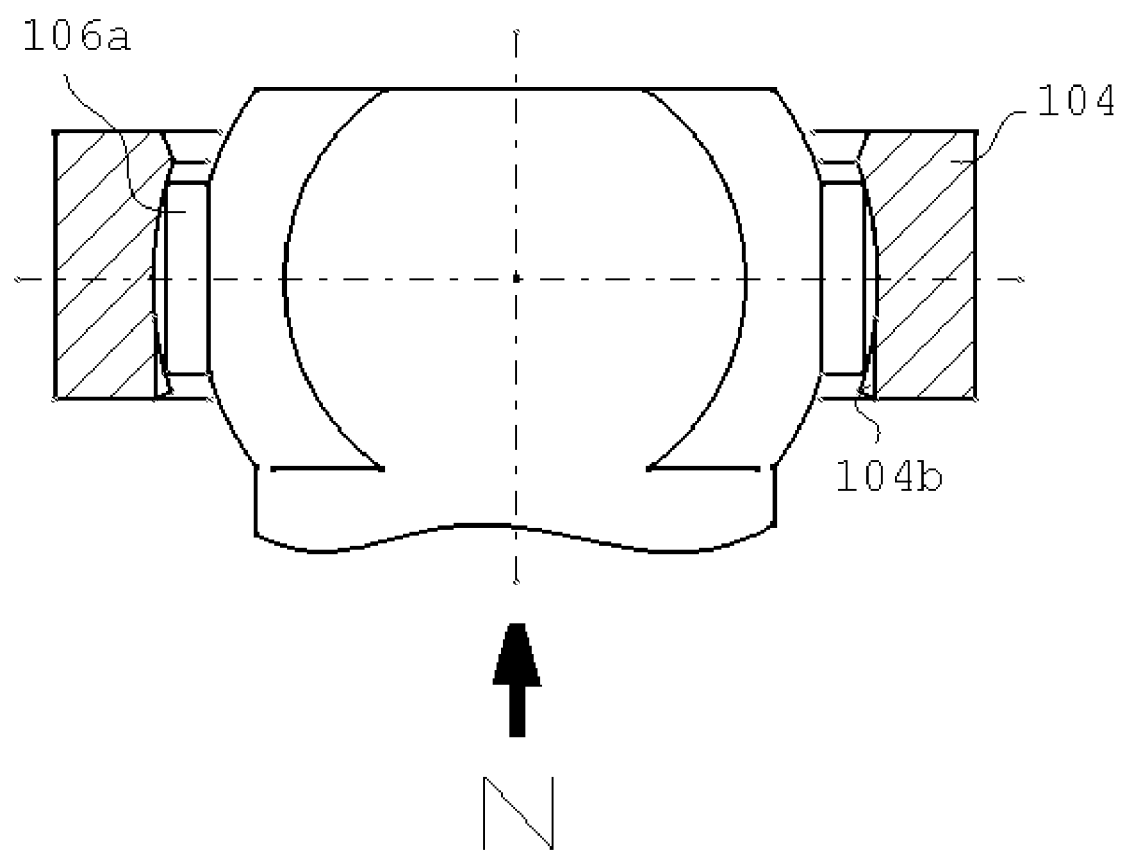
Figure 21F:
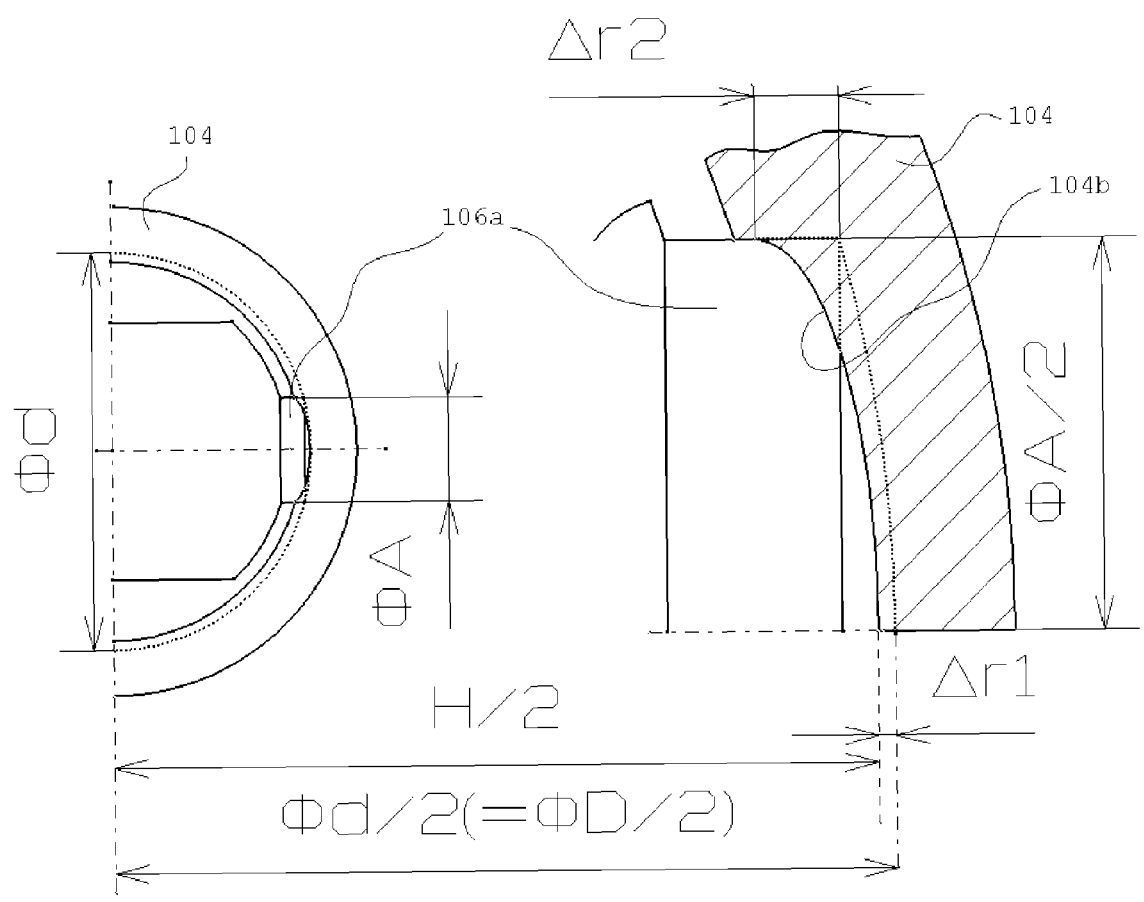

FIG. 21(e) illustrates a state that the inner roller 104 is returned to a normal position after the trunnion 106 was assembled into the inner roller 104 through the bottom grooves 104b with the inner roller inclined as described above. FIG. 21(f) is partial views of the inner roller and trunnion viewed from a direction of N shown in FIG. 21(e), in which the cylindrical protrusions 106a are securely received in the elliptical grooves 104b such that they can not be pulled out of the groove 104b under a normal operating condition since the cylindrical protrusions 106a have a height larger than the depth of the bottom grooves 104b of the inner roller 104, by the difference of $\Delta$r1 at the center to $\Delta$r2 at the edge $\phi$A. Accordingly, the grooves 104b formed on the bottom portion of the inner roller 104 as showed in FIGS. 21(a)-21(f), are provided not only to enable the trunnion 106 to be easily assembled into the inner race 104, but also to prevent the trunnion 106 from pulling out of the inner roller 104 once it is assembled into the inner roller 104. Thus, the present embodiment is effective to reduce an extra manufacturing cost, such as a special tooling cost, typically required for the assembling methods in the previous embodiments as discussed above in connection with FIGS. 12-19.

Figure 22A:
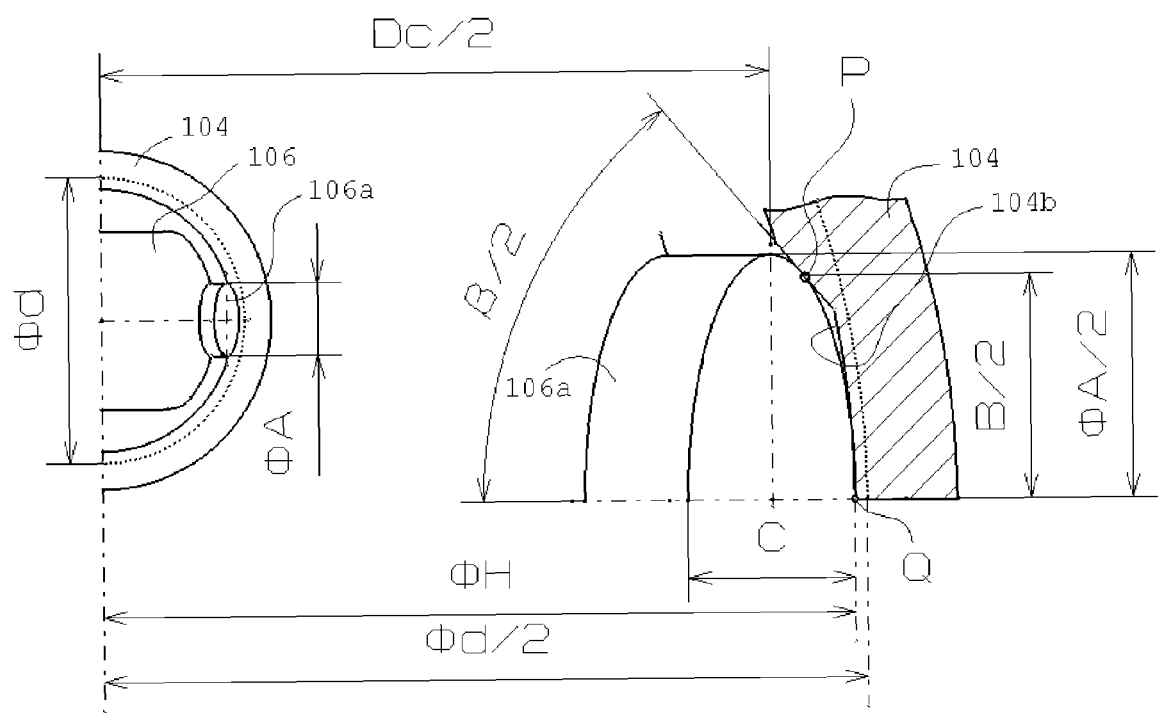
Figure 22B:
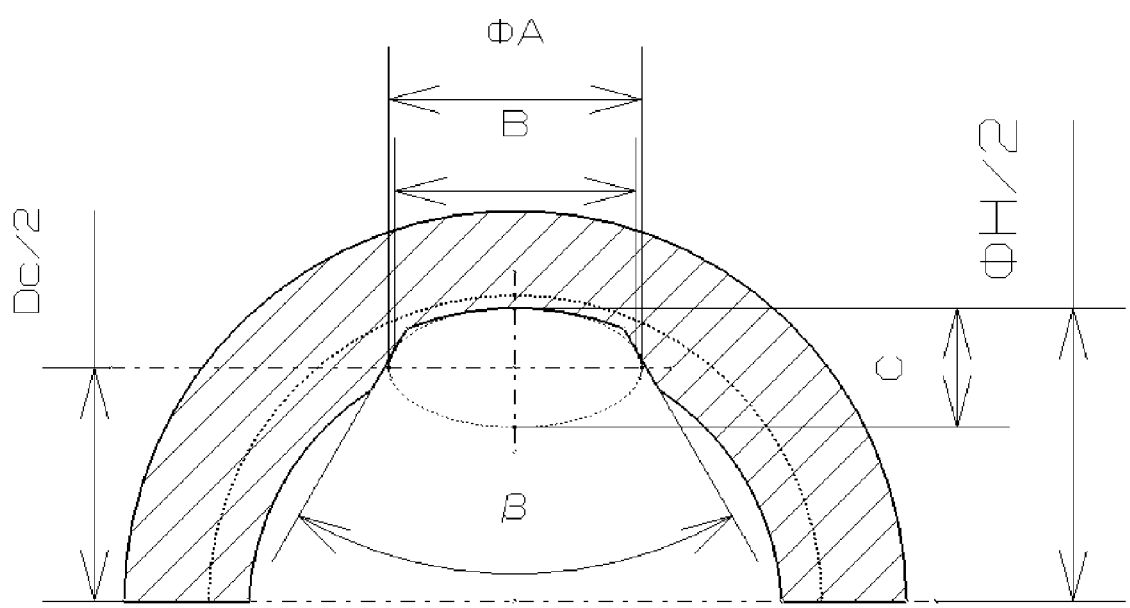
Figure 22C:
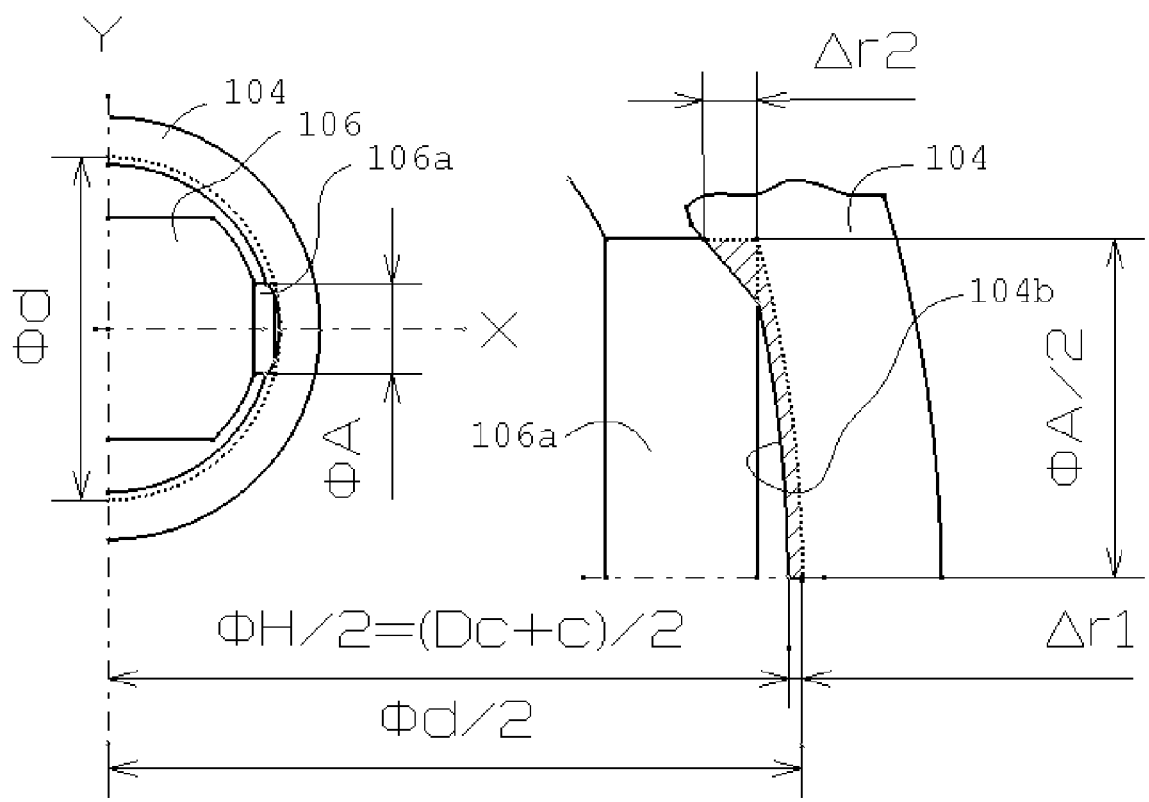

With reference to FIGS. 22(a)-22(c), the thirteenth embodiment of the present invention is described herein. This embodiment is similar to the twelfth embodiment described above. The difference of this embodiment from the above embodiment shown in FIGS. 20-21 is that each groove 104b formed on the bottom portion of the inner roller 104 is composed of a circular groove portion with a diameter $\Phi$ H that coincides with the elliptically projected surface size of cylindrical protrusion 106a at a point Q and two peripheral planar groove portions with surface angle β formed tangential to the elliptically projected surface of cylindrical protrusion 106a at a point P as shown in FIGS. 22(a)-22(b). FIG. 22(c) depicts partial views of the inner roller 104 and trunnion 106 from the same direction N as shown in FIG. 21(e), in which the cylindrical protrusions 106a are securely received in the inner roller 104 so as not to be pulled out of the grooves 104b due to the oversize represented by the hatched area, since the cylindrical protrusions 106a have a size larger than the bottom groove 104b of the inner roller 104, by the difference of $\Delta$ r1 at the center to $\Delta$ r2 at the edge $\Phi$ A. Accordingly, the bottom groove 104b of the inner roller, as showed in FIGS. 22(a)-22(c), is provided not only to enable the trunnion to be easily assembled into the inner race but also to prevent the trunnion from disengaging out of the inner roller 104 once it is assembled into the inner roller. Thus, this embodiment can also reduce the extra manufacturing cost required for the assembling process.

Figure 23A:
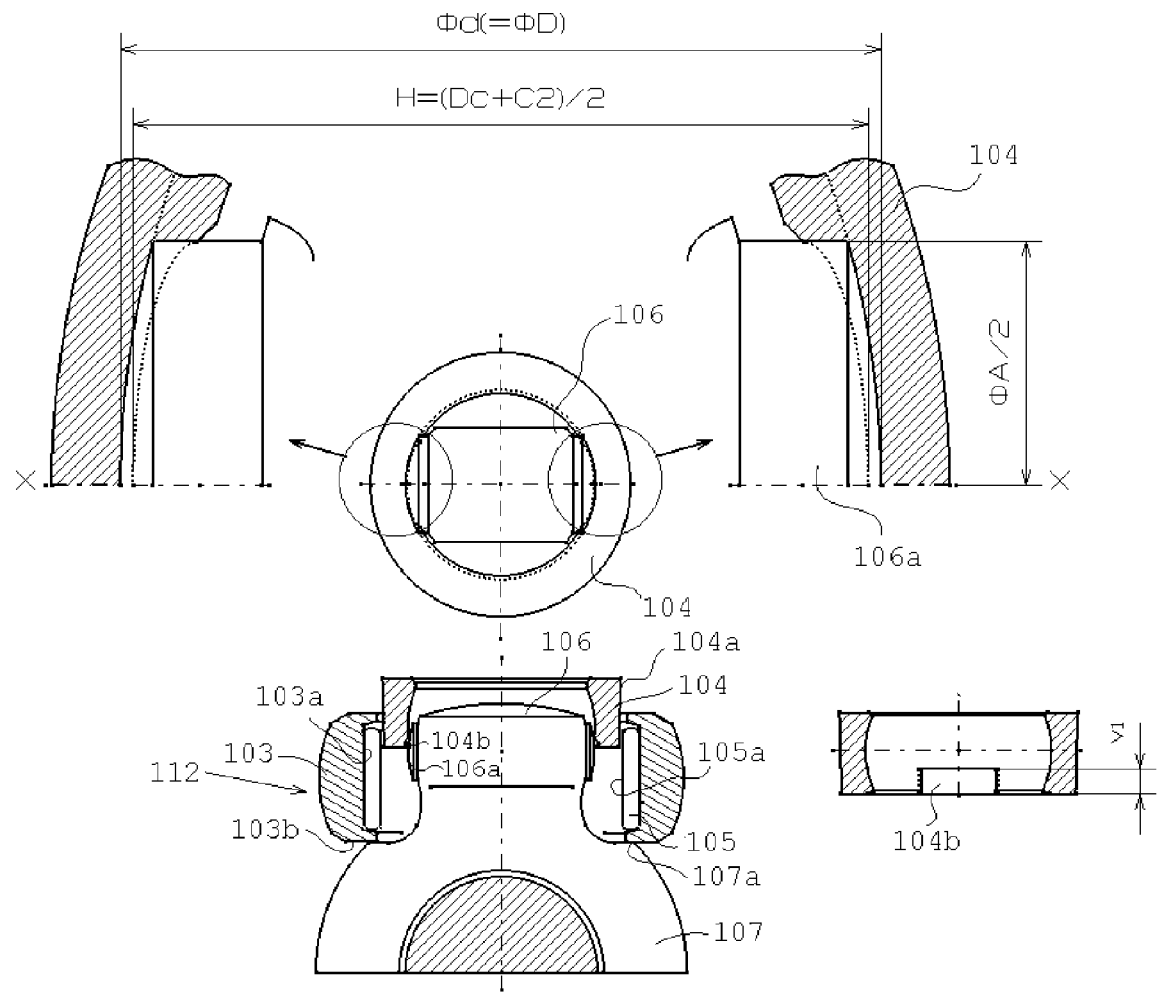
Figure 23B:
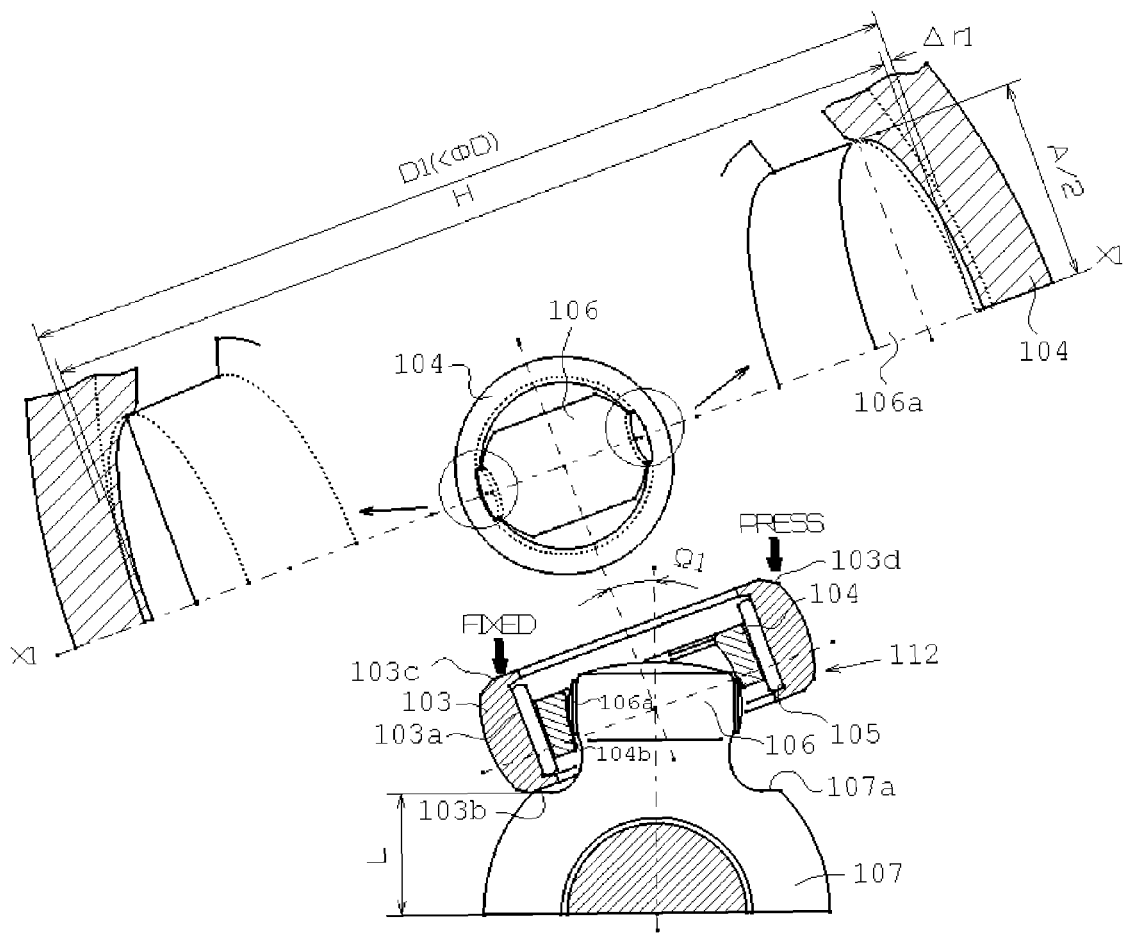

With reference to FIGS. 23(a) and 23(b), one preferred assembling method of the tripod joints of the type shown in FIGS. 20-22 is described herein. FIG. 23(a) includes explanatory and partial sectional views illustrating an initial arrangement made between the roller assembly 112 and the trunnion 106 before fitting the roller assembly 112 into the trunnion 106. The outer roller 103 is mounted on the shoulder 107a of a boss 107 of the tripod, in such a manner that a tapered cylindrical surface 103a on the inner face of the outer roller 103 is converged in the radial direction toward boss 107 of the tripod, with the needle rollers 105 assembled into the tapered cylindrical surface 103a of the inner face of the outer roller 103. The inner roller 104 is placed over the trunnion 106 of the joint such that a tapered cylindrical surface 104a formed on the outer face of the inner roller 104 is converged in the radial direction toward the boss 111. Then, the inner roller 104 is pushed to the trunnion 106 so that the cylindrical protrusions 106a (which are disposed in the direction receiving the load and protruded along the axis normal to the axis of the trunnion 106) are partially fitted in the pair of bottom grooves 104b of the inner roller 104 which are disposed in the direction receiving the load, as shown in FIG. 23(a). By this arrangement, some radial clearance is maintained between the tapered outer cylindrical face 104a of the inner roller 104 and the tapered inner cylindrical face 103a of the outer roller 103 and the needle rollers 105. In this embodiment, the distance D between the spherical end surfaces of two cylindrical protrusions 106a and the inner diameter $\phi$d of the inner roller 104 is larger than the opening size H of the bottom groove 104b of the inner roller, and the axial length V1 of the groove 104b is smaller that the distance from the bottom face to the center line of the inner roller 104.

FIG. 23(b) illustrates a method of assembling the roller assembly 112 to the trunnion 106, to be performed after the previous steps discussed above in connection with FIG. 23(a). While slightly pressing the inner roller 104 downwardly to maintain the partial engagement between the inner roller 104 and the cylindrical protrusions 106a of the trunnion, the outer roller 103 (with the needle rollers assembled therein) is lifted to the level of the inner roller 104, and thereby provides the roller assembly 112 which is positioned at the level of the partially engaged inner roller 104. Then, the roller assembly 112 (with the inner and outer rollers and the needle bearings assembled) is inclined onto the trunnion 106 until the bottom 103b of the outer roller contacts with the shoulder 107a of the boss having height L. Here, in this embodiment, the dimension of the elliptically projected surfaces of the two cylindrical protrusions 106a is particularly designed to be still larger than the opening size H of the grooves 104b formed on the bottom of the inner roller by Δ r1 on the center line of X1-X1. Then, a force of predetermined amount (e.g., a force of manually applicable magnitude in that no equipment for the pressing is required) is applied on the upper side 103d of the top portion of the outer roller, with the lower side 103c abutting against the shoulder 103b of the boss, in order to allow a slight elastic expansion of the inner roller for easy assembly. Optionally, the inner roller may further include a pair of grooves formed on the top portion of the inner roller and in a direction perpendicular to the pair of grooves formed on the bottom portion of the inner roller in order to facilitate the elastic expansion of the inner roller about the pair of top grooves, as in the previous embodiments shown in FIGS. 9 and 12, for example. Accordingly, this assembly method can reduce manufacturing or tooling cost typically required for the assembling process as in the previous embodiments described with FIGS. 12-19.

Figure 24A:
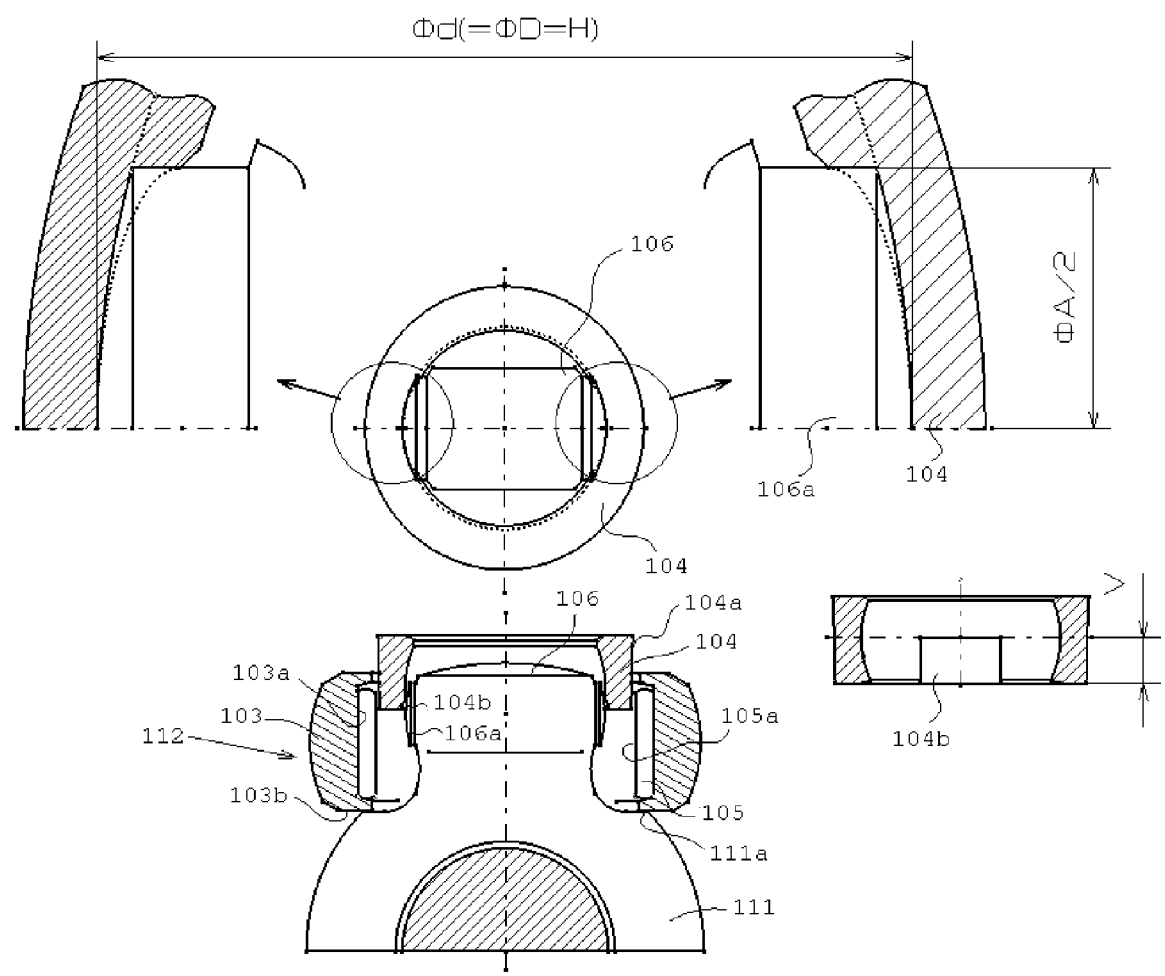
Figure 24B:
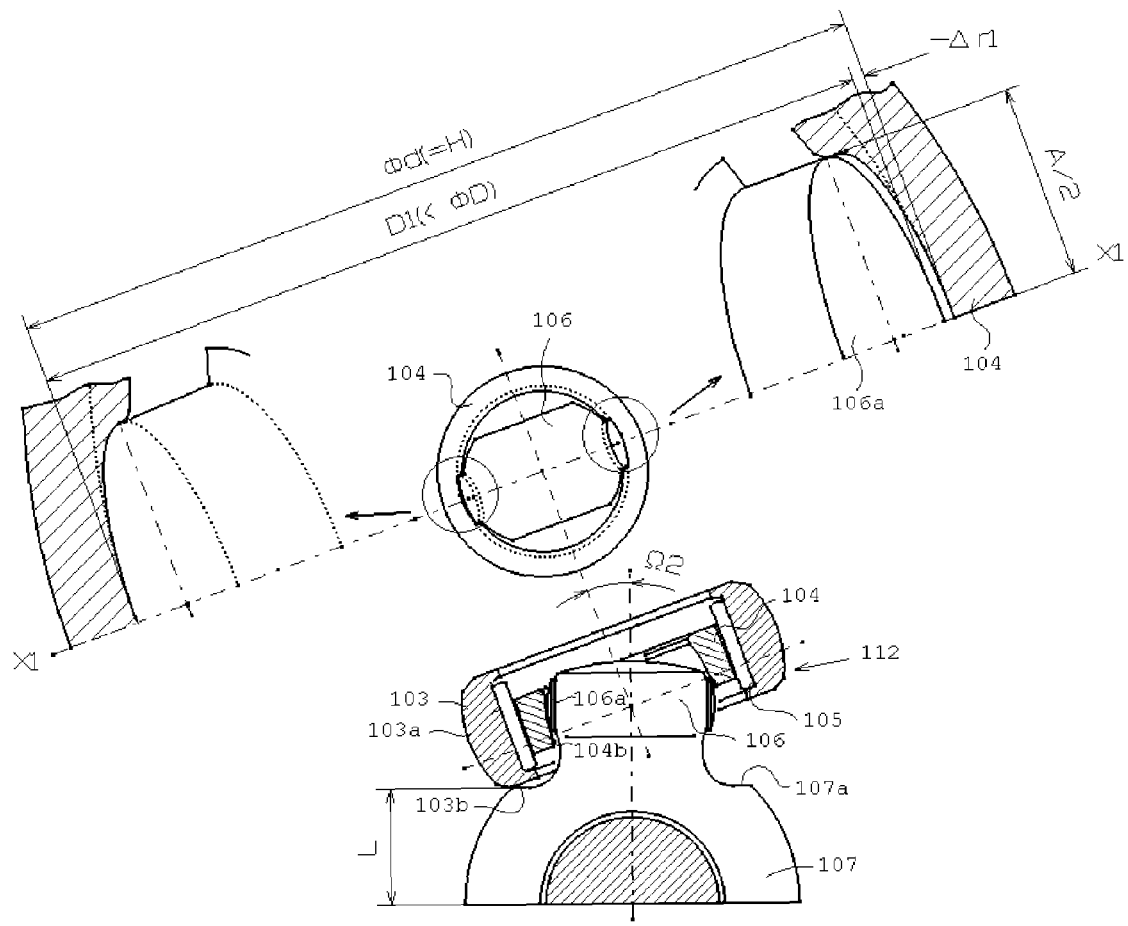

With reference to FIG. 24(a) and FIG. 24(b), another preferred assembling method of the tripod joints of the type shown in FIGS. 20-22 is described, in which FIG. 24(a) shows an explanatory view illustrating an initial arrangement made between the roller assembly 112 and the trunnion 106 before fitting the roller assembly 112 into the trunnion 106, and FIG. 24(b) shows an explanatory view illustrating the method of assembling the roller assembly 112 into the trunnion 106, which is performed after the arrangement shown in FIG. 24(a). This embodiment is similar to the previous method shown in FIG. 23(a) and FIG. 23(b). The difference of the present method from that shown in FIG. 23(a) and FIG. 23(b) is that the grooves 104b on the bottom portion of the inner roller 104 are formed up to the center line of the inner roller, with the groove length V, and that the pair of cylindrical protrusions 106a of the trunnions are configured to have the height between the two spherical end surfaces of the cylindrical protrusions 106a about the same (i.e., of less than 1 mm difference or allowing a typical machining tolerance) as an opening size between the pair of grooves. This makes the dimension of the elliptically projected surfaces of the opposing cylindrical protrusions 106b to be smaller than the opening size H of the bottom grooves 104b of the inner roller by the space of −Δ r1 at the center line of X1-X1, when the inner roller 104 is inclined with respect to the trunnion 106 as the bottom 103b of the outer roller abuts against the shoulder 107a of the boss 107 having height L. Therefore, it enables the trunnion to be readily assembled into the inner roller (which is inclined during the assembly process) without applying an external force of considerable amount typically required for the joint assembly as in the previous embodiments of FIGS. 13-17, for example. Thus, the present embodiment can reduce the extra manufacturing cost typically required for the assembling process.

Figure 25A:
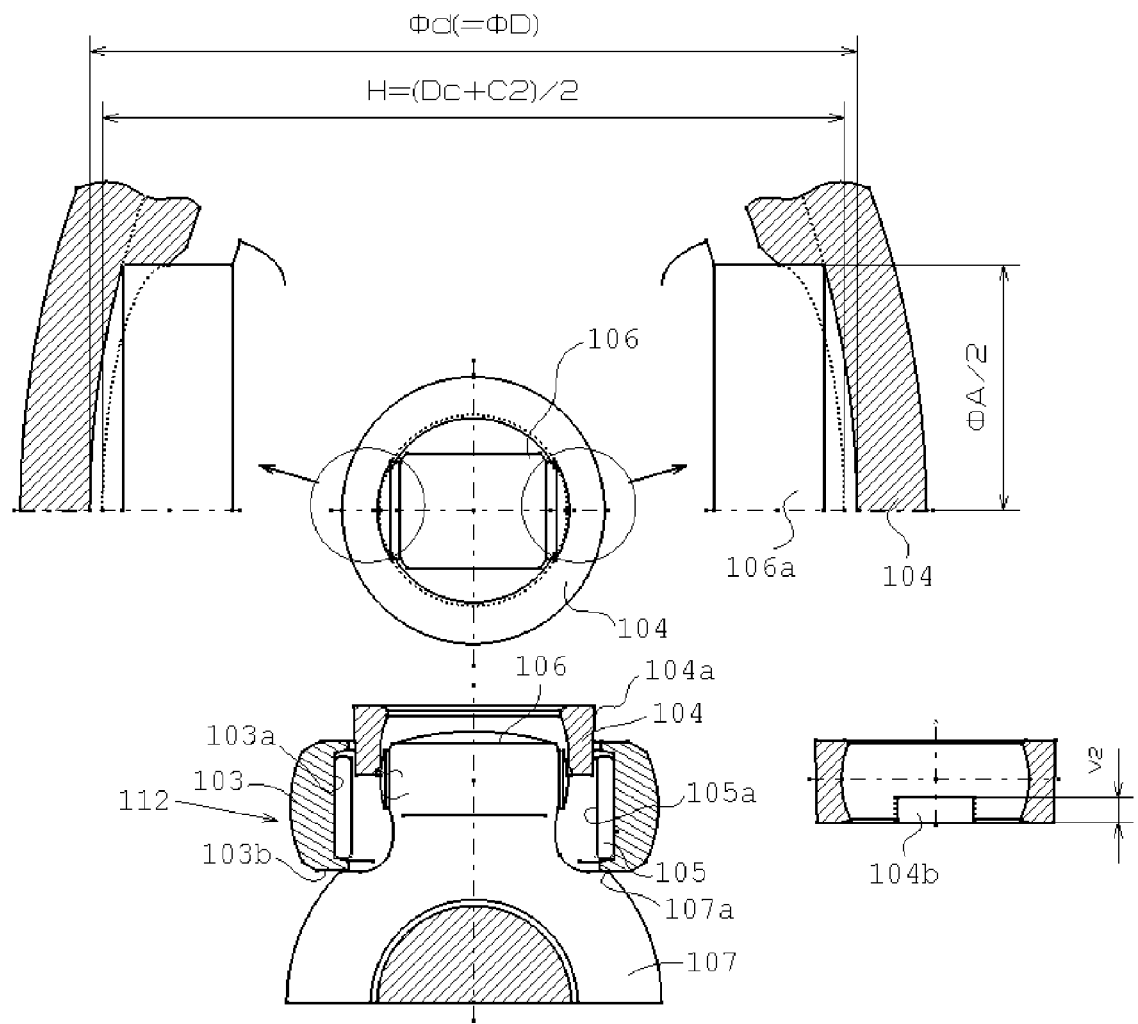
Figure 25B:
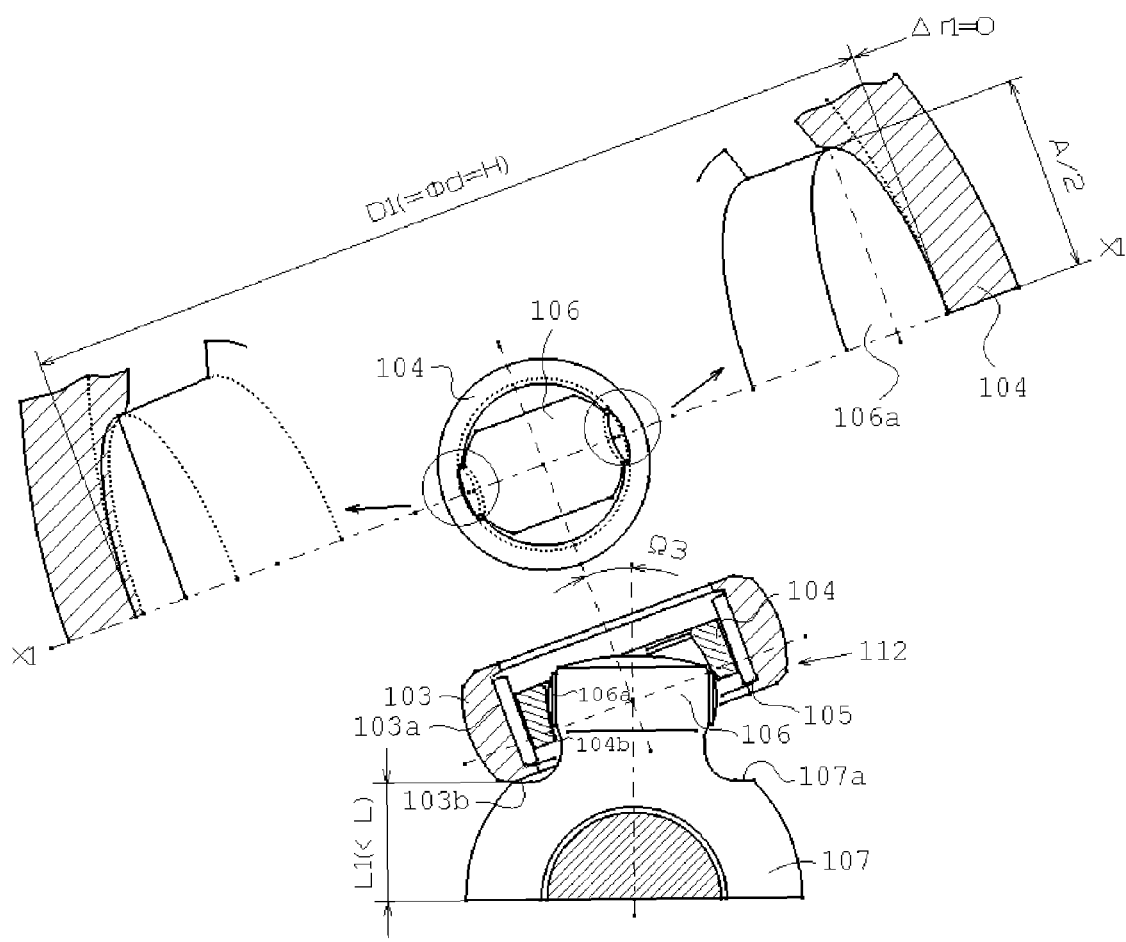

With reference to FIG. 25(a) and FIG. 25(b), another preferred assembling method of the tripod joints of the type shown in FIGS. 20-22 is described, in which FIG. 25(a) shows an explanatory view illustrating an arrangement made between the roller assembly 112 and the trunnion 106 before fitting the roller assembly 112 into the trunnion 106, and FIG. 25(b) shows an explanatory view illustrating the method of assembling the roller assembly 112 into the trunnion 106, which is performed after the arrangement shown in FIG. 25(a). This embodiment is similar to the previous method shown in FIG. 23(a) and FIG. 23(b). The difference of the present method from that shown in FIG. 23(a) and FIG. 23(b) is that the height L1 of the shoulder is smaller than that shown in FIGS. 23(a) and 6(b), and that the dimension of the elliptically projected surfaces of the cylindrical protrusions 106b is identical to or about the same as the opening size H of the bottom grooves 104b of the inner roller 104 at the center line of X1-X1 when the inner roller 104 is inclined onto the trunnion 106 until the bottom 103b of the outer roller hits the shoulder 107a of the boss 107 having height L1. Therefore, it enables the trunnion 106 to be readily assembled into the inner roller, without applying an external force of considerable amount, and thereby, reducing the extra manufacturing cost typically required for the assembling process.

In the above embodiments described in connection with FIGS. 20-25, the protrusions 106a of the trunnions 106 have a cylindrical cross section and spherical end surfaces. However, they are not limited thereto, and the protrusions 106a can have an elliptical or oval cross section as illustrated in FIG. 8, or they may include a central recess portion as illustrated in FIG. 7. Similarly, the entire features described with the previous embodiments associated with FIGS. 5-19 may also be adopted.

As described above with exemplary embodiments thereof, the tripod type constant velocity joint of the present invention utilizes trunnions each having two diametrically projected, cylindrical projections of reduced size, together with particularly adapted roller assemblies for suitable mating with the trunnions. Accordingly, the present invention can maintain a low frictional spinning moment, and enables the roller assembly to rotate smoothly without fluctuations, thus reducing the problematic shudders typical in the vehicle operation. In addition, the present invention also provides effective methods of assembling the constant velocity joint of the invention.

The above disclosed embodiments are representatives of a presently preferred form of the invention, but are intended to be illustrative rather than definitive thereof. Accordingly, those skilled in the art will appreciate or recognize that various modifications and substitutions can be made thereto without departing from the spirit and scope of the present invention as set forth in the appended claims.

What is claimed is:

1. A constant velocity joint for a drive system having a first rotating shaft and a second rotating shaft coupled with the constant velocity joint, the constant velocity joint comprising:

a hollow housing having an opening at one end, and a closing at its opposite end fixed to an end of the first rotating shaft, an inner face of the housing including a plurality of guide grooves extending in an axial direction of the housing and spaced equally apart in a circumferential direction of the housing, each groove having a pair of side faces opposing to each other;

a tripod disposed at an end of the second rotating shaft, having a plurality of trunnions each positioned in a corresponding one of the guide grooves and being spaced equally apart in a circumferential direction of and at an angle normal to the second rotating shaft; and an inner roller having a spherical inner face for receiving an outer end portion of each of the trunnions therein, an outer roller mounted on an outer face of each inner roller with needle rollers engaged between the inner and outer rollers, and allowing the outer face of each outer roller to roll and move in the corresponding one of the guide grooves and for transmitting a load between the first and second rotating shafts to drive the driving system;

wherein each of the trunnions includes a pair of cylindrical protrusions opposingly disposed and protruded to a distance from an outer surface of the trunnion in a direction normal to the axis of the trunnion, each of the cylindrical protrusions including a spherical surface at its distal end for surface-to-surface contact with the spherical inner face of the inner roller while defining a gap around the cylindrical protrusion and between the surface of the trunnion and the spherical inner face of the inner roller;

wherein each of the inner rollers includes a pair of grooves each formed in a diametric direction and on the bottom portion of the inner roller facing a boss of the tripod, the pair of grooves sized for receiving the pair of cylindrical protrusions of the trunnion while inclining the inner roller to a predetermined degree with respect to the trunnion for assembly.

2. The constant velocity joint of claim 1, wherein each of the pair of grooves formed on the bottom portion of the inner roller has an elliptical groove shape corresponding to an elliptical shape of the pair of cylindrical protrusions when projected from the inner roller inclined to the predetermined degree with respect to the trunnion.

3. The constant velocity joint of claim 2, wherein the ellipse shape of the pair of grooves formed on the bottom portion of the inner roller are defined by the equation of:

$$(X \pm Dc/2)^2/(C/2)^2 + Y^2/(A/2)^2 = 1;$$

$$C = A \sin \Omega;$$

$$Dc = Do \cos \Omega;$$

where Dc represents the distance between the centers of the two elliptical grooves, Do represents the base height between the two opposing cylindrical protrusions, which is the entire height between the two opposing cylindrical protrusions minus the length of two spherical surface portions of the two opposing cylindrical protrusions, A represents a long diameter of the ellipse shape, which equals to the cylinder diameter of the cylindrical protrusions, C represents a short diameter of the ellipse shape, and $\Omega$ represents the inclining degree of the inner roller with respect to the trunnion.

4. The constant velocity joint of claim 2, wherein the cylindrical protrusions are securely received in the elliptical grooves such that, after assembly, they can not be pulled out of the grooves under a normal operating condition because the cylindrical protrusions have a height larger than the depth of the bottom grooves of the inner roller.

5. The constant velocity joint of claim 2, wherein each of the inner rollers has a generally cylindrical outer surface tapered in an axial direction of the inner roller, and each of the outer rollers has a generally cylindrical inner surface tapered in an axial direction of the outer roller with the same taper angle and in the same direction of the tapered outer surface of the inner roller, and wherein both the outer surface of said inner rollers and the inner surface of said outer rollers have said tapered surfaces which are converged toward the boss of said tripod.

6. The constant velocity joint of claim 1, wherein the gap around the cylindrical protrusion of the respective trunnion allows a lubricant to introduce in the gap for lubrication.

7. The constant velocity joint of claim 1, wherein the outer surface of each of the trunnions includes a spherical surface disposed in area subjecting to a load, and two flat surfaces disposed in area not subjecting to the load and thereby providing larger space between the flat surface and the spherical inner face of the respective inner roller, the space allowing a lubricant to introduce therein for lubrication.

8. The constant velocity joint of claim 1, wherein each of the grooves of the inner roller comprises a central circular groove portion and two peripheral groove portions disposed lateral to the central circular groove portion.

9. The constant velocity joint of claim 8, wherein the central circular groove portion has a radius defined by the elliptically projected surface size of the cylindrical protrusions and the two peripheral groove portions are generally planar with a taper angle tangential to the elliptically projected surface of the cylindrical protrusions.

10. A method of assembling a roller assembly of a constant velocity joint onto a trunnion of the joint, comprising:

providing a roller assembly for a constant velocity joint, the roller assembly including: an outer roller with a tapered cylindrical surface formed on the inner face of the outer roller; an inner roller with a tapered cylindrical surface formed on the outer face of the inner roller and with at least partially spherical inner face, the tapered outer cylindrical surface of the inner roller having a same taper angle with the tapered inner cylindrical surface of the outer roller, the inner roller including a pair of grooves diametrically disposed on a bottom portion of the inner face of the inner roller; and needle rollers for receiving between the inner and outer rollers;

providing a constant velocity joint having a tripod with at least one trunnion, the trunnion including a pair of cylindrical protrusions protruded normal to the axis of the trunnion to a predetermined height from an outer surface of the trunnion, each of the cylindrical protrusions having a generally spherical end surface for contacting with the at least partially spherical inner face of the inner roller;

mounting the outer roller on a shoulder portion of the tripod disposed below the trunnion in such a manner that the tapered inner cylindrical surface of the outer roller is converged in a radial direction facing a boss of the tripod, the outer roller having the needle rollers assembled in the tapered inner cylindrical surface of the outer roller;

placing the inner roller onto the trunnion and partially introducing the pair of cylindrical protrusions of the trunnion in the corresponding pair of grooves formed on the bottom portion of the inner roller;

tilting the inner and outer rollers with one side of the outer roller abuts against the shoulder portion of the trunnion such that one of the pair of cylindrical protrusions is thoroughly received in the inner face of the inner roller through a corresponding one of the pair of grooves of the inner roller and the other one of the pair of cylindrical protrusions is still partially introduced in the other one of the pair of grooves of the inner roller, and allowing the inner and outer rollers to be inclined by a predetermined degree with respect to the trunnion; and pushing an upper side of the inclined outer roller down to the shoulder portion of the trunnion until the other one of the pair of cylindrical protrusions is completely received in the inner face of the inner roller through the other one of the pair of grooves of the inner roller.

11. The method of claim 10, wherein said providing the roller assembly step and said providing the constant velocity joint step provide the inner roller having the pair of grooves each with an axial length smaller than a distance from the bottom face of the inner roller to the center line of the inner roller, and provide the trunnion having the pair of cylindrical protrusions with a distance between the two spherical end surfaces of the pair of cylindrical protrusions larger than an opening size between the pair of grooves and with a distance between the two spherical end surfaces of the pair of cylindrical protrusions, when projected from the axis of the inner roller inclined by said tilting step, still larger than the opening size between the pair of grooves; and wherein said pushing step is performed while applying a force of predetermined amount on the upper side of the inclined outer roller with a lower side of the inclined outer roller abutting against the shoulder portion of the trunnion for allowing an elastic expansion of the inner roller for assembly.

12. The method of claim 11, wherein the inner roller includes a pair of grooves formed on the top portion of the inner roller and in a direction perpendicular to the pair of grooves formed on the bottom portion of the inner roller for facilitating the elastic expansion of the inner roller about the pair of grooves formed on the top portion of the inner roller.

13. The method of claim 10, wherein said providing the roller assembly step and said providing the constant velocity joint step provide the inner roller having the pair of grooves each with an axial length about the same as a distance from the bottom face of the inner roller to the center line of the inner roller, and provide the trunnion having the pair of cylindrical protrusions with a distance between the two spherical end surfaces of the pair of cylindrical protrusions about the same as an opening size between the pair of grooves and with a distance between the two spherical end surfaces of the pair of cylindrical protrusions, when projected from the axis of the inner roller inclined by said tilting step, smaller than the opening size between the pair of grooves; and wherein said pushing step is performed without applying an external force of considerable amount on the upper side of the inclined outer roller with a lower side of the inclined outer roller abutting against the shoulder portion of the trunnion for assembly.

14. The method of claim 10, wherein said providing the roller assembly step and said providing the constant velocity joint step provide the inner roller having the pair of grooves each with an axial length smaller than a distance from the bottom face of the inner roller to the center line of the inner roller, and provide the trunnion having the pair of cylindrical protrusions with a distance between the two spherical end surfaces of the pair of cylindrical protrusions larger than an opening size between the pair of grooves and with a distance between the two spherical end surfaces of the pair of cylindrical protrusions, when projected from the axis of the inner roller inclined by said tilting step, about the same as the opening size between the pair of grooves; and wherein said pushing step is performed without applying an external force of considerable amount on the upper side of the inclined outer roller with a lower side of the inclined outer roller abutting against the shoulder portion of the trunnion for assembly.

* * * * *